(12) United States Patent
Kraimer et al.

(10) Patent No.: US 9,122,276 B2
(45) Date of Patent: Sep. 1, 2015

(54) WEARABLE WIRELESS REMOTE CONTROL DEVICE FOR USE WITH A MATERIALS HANDLING VEHICLE

(71) Applicant: Crown Equipment Corporation, New Bremen, OH (US)

(72) Inventors: James V. Kraimer, Haimhausen (DE); Jay G. Pollack, Sidney, OH (US); Timothy A. Wellman, Coldwater, OH (US); Michael P. Gallagher, Greenville, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 14/448,418

(22) Filed: Jul. 31, 2014

(65) Prior Publication Data

US 2014/0343758 A1 Nov. 20, 2014

Related U.S. Application Data

(63) Continuation-in-part of application No. 11/855,310, filed on Sep. 14, 2007, and a continuation-in-part of (Continued)

(51) Int. Cl.
*G05D 1/00* (2006.01)
*B66F 9/075* (2006.01)
(Continued)

(52) U.S. Cl.
CPC .......... *G05D 1/0016* (2013.01); *B66F 9/07568* (2013.01); *B66F 9/07581* (2013.01);
(Continued)

(58) Field of Classification Search
CPC .............. G05D 1/0016; B66F 9/07581; B66F 9/07568
USPC ............................................................ 701/2
See application file for complete search history.

(56) References Cited

U.S. PATENT DOCUMENTS

| 1,835,808 A | 12/1931 | Pitts |
| 2,959,260 A | 11/1960 | Johnson et al. |

(Continued)

FOREIGN PATENT DOCUMENTS

| DE | 10033857 | 1/2002 |
| EP | 0406070 A1 | 1/1991 |

(Continued)

OTHER PUBLICATIONS

Masashi Honda; International Preliminary Report on Patentability and Written Opinion of the International Searching Authority; International Application No. PCT/US2007/078455; Mar. 17, 2009; International Bureau of WIPO; Geneva Switzerland.

(Continued)

*Primary Examiner* — Redhwan k Mawari
(74) *Attorney, Agent, or Firm* — Stevens & Showalter LLP

(57) ABSTRACT

A supplemental remote control system for a materials handling vehicle includes a wireless remote control device that is useable by an operator interacting with the materials handling vehicle. Actuation of a travel control on the remote control device causes a wireless transmitter on the device to transmit a travel request to the vehicle. The remote control system further includes a receiver for receiving transmissions from the wireless transmitter at the vehicle and a controller at the vehicle in communication with the receiver for implementing the travel request. The wireless remote control device further includes an input component, wherein actuation of the input component causes the wireless transmitter to wirelessly transmit a second type of request to the receiver on the vehicle requesting the controller to implement a second vehicle function other than to advance the vehicle.

46 Claims, 32 Drawing Sheets

Related U.S. Application Data application No. 13/011,366, filed on Jan. 21, 2011, now Pat. No. 8,970,363, and a continuation-in-part of application No. 13/798,232, filed on Mar. 13, 2013, application No. 14/448,418, which is a continuation-in-part of application No. PCT/US2007/078455, filed on Sep. 14, 2007, and a continuation-in-part of application No. PCT/US2012/022011, filed on Jan. 20, 2012, and a continuation-in-part of application No. PCT/US2014/020979, filed on Mar. 6, 2014.

(60) Provisional application No. 60/825,688, filed on Sep. 14, 2006.

(51) Int. Cl.
  *G08C 17/02* (2006.01)
  *G07C 9/00* (2006.01)

(52) U.S. Cl.
  CPC .......... *G05D1/0033* (2013.01); *G07C 9/00309* (2013.01); *G08C 17/02* (2013.01); *G05D 2201/0216* (2013.01); *G07C 9/00896* (2013.01); *G07C 9/00944* (2013.01); *G08C 2201/20* (2013.01)

(56) References Cited

U.S. PATENT DOCUMENTS

| | | | |
|---|---|---|---|
| 3,016,973 A | 1/1962 | Williamson | |
| 3,047,783 A | 7/1962 | Van Oort et al. | |
| 3,587,784 A | 6/1971 | Tait | |
| 3,825,130 A | 7/1974 | Lapham | |
| 3,968,893 A | 7/1976 | Lapham | |
| 4,074,120 A | 2/1978 | Allred et al. | |
| 4,252,495 A | 2/1981 | Cook | |
| 4,258,825 A | 3/1981 | Collins | |
| 4,287,966 A | 9/1981 | Frees | |
| 4,384,695 A | 5/1983 | Nohmi et al. | |
| 4,476,954 A | 10/1984 | Johnson et al. | |
| 4,527,651 A | 7/1985 | Thiermann, Sr. | |
| 4,546,840 A | 10/1985 | Yukishige et al. | |
| 4,551,059 A | 11/1985 | Petoia | |
| 4,644,237 A | 2/1987 | Frushour et al. | |
| 4,665,487 A | 5/1987 | Ogawa et al. | |
| 4,714,140 A | 12/1987 | Hatton et al. | |
| 4,716,980 A | 1/1988 | Butler | |
| 4,727,492 A | 2/1988 | Reeve et al. | |
| 4,785,664 A | 11/1988 | Reebs | |
| 4,954,817 A | 9/1990 | Levine | |
| 5,023,790 A | 6/1991 | Luke, Jr. | |
| 5,036,935 A | 8/1991 | Kohara | |
| 5,044,472 A | 9/1991 | Dammeyer et al. | |
| 5,107,946 A | 4/1992 | Kamimura et al. | |
| 5,141,381 A | 8/1992 | Kato et al. | |
| 5,170,351 A | 12/1992 | Nemoto et al. | |
| 5,245,144 A | 9/1993 | Stammen | |
| 5,307,271 A | 4/1994 | Everett, Jr. et al. | |
| 5,402,257 A | 3/1995 | Hasselmann et al. | |
| 5,502,638 A | 3/1996 | Takenaka | |
| 5,652,486 A | 7/1997 | Mueller et al. | |
| 5,709,523 A | 1/1998 | Ware | |
| 5,778,327 A | 7/1998 | Simmons et al. | |
| 5,816,741 A | 10/1998 | Troppman, III | |
| 5,892,855 A | 4/1999 | Kakinami et al. | |
| 5,913,919 A | 6/1999 | Bauer et al. | |
| 5,928,292 A | 7/1999 | Miller et al. | |
| 5,938,710 A | 8/1999 | Lanza et al. | |
| 5,939,986 A | 8/1999 | Schiffbauer et al. | |
| 5,964,313 A | 10/1999 | Guy | |
| 6,030,169 A | 2/2000 | Rossow et al. | |
| 6,112,839 A * | 9/2000 | Ostler et al. | 180/53.4 |
| 6,157,892 A | 12/2000 | Hada et al. | |
| 6,173,215 B1 | 1/2001 | Sarangapani | |
| 6,276,485 B1 * | 8/2001 | Eriksson et al. | 180/332 |
| 6,285,925 B1 | 9/2001 | Steffen | |
| 6,382,359 B1 | 5/2002 | Lohmann | |
| 6,464,025 B1 | 10/2002 | Koeper et al. | |
| 6,548,982 B1 * | 4/2003 | Papanikolopoulos et al. | 318/568.11 |
| 6,587,787 B1 * | 7/2003 | Yokota | 701/532 |
| 6,595,306 B2 | 7/2003 | Trego et al. | |
| 6,686,951 B1 | 2/2004 | Dickson et al. | |
| 6,748,292 B2 * | 6/2004 | Mountz | 700/214 |
| 6,784,800 B2 | 8/2004 | Orzechowski | |
| 6,809,680 B2 | 10/2004 | Tojima | |
| 6,810,319 B2 | 10/2004 | Manaka | |
| 6,961,561 B2 * | 11/2005 | Himmel et al. | 455/419 |
| 7,017,689 B2 * | 3/2006 | Gilliland et al. | 180/19.1 |
| 7,025,727 B2 | 4/2006 | Brockway et al. | |
| 7,076,366 B2 | 7/2006 | Simon et al. | |
| 7,099,764 B2 | 8/2006 | Seto et al. | |
| 7,266,477 B2 | 9/2007 | Foessel | |
| 7,610,121 B2 | 10/2009 | Nishira et al. | |
| 7,711,464 B2 | 5/2010 | Kaufmann | |
| 7,734,419 B2 | 6/2010 | Kondoh | |
| 7,765,066 B2 | 7/2010 | Braeuchle et al. | |
| 7,860,653 B2 | 12/2010 | Joe et al. | |
| 8,027,029 B2 | 9/2011 | Lu et al. | |
| 8,060,400 B2 | 11/2011 | Wellman | |
| 8,170,787 B2 | 5/2012 | Coats et al. | |
| 8,180,561 B2 | 5/2012 | Osanai | |
| 8,195,344 B2 | 6/2012 | Song et al. | |
| 8,386,146 B2 | 2/2013 | Shirai | |
| 2001/0035729 A1 | 11/2001 | Graiger et al. | |
| 2002/0163495 A1 | 11/2002 | Doynov | |
| 2002/0178830 A1 * | 12/2002 | Kazerooni et al. | 73/760 |
| 2003/0014162 A1 | 1/2003 | Sadano | |
| 2003/0029648 A1 | 2/2003 | Trego et al. | |
| 2003/0205433 A1 | 11/2003 | Hagman | |
| 2003/0216854 A1 | 11/2003 | Katakura et al. | |
| 2004/0193363 A1 | 9/2004 | Schmidt et al. | |
| 2004/0193374 A1 | 9/2004 | Hac et al. | |
| 2005/0052412 A1 | 3/2005 | McRae et al. | |
| 2005/0073433 A1 | 4/2005 | Gunderson et al. | |
| 2005/0216124 A1 | 9/2005 | Suzuki | |
| 2005/0244259 A1 | 11/2005 | Chilson et al. | |
| 2006/0125806 A1 * | 6/2006 | Voyles et al. | 345/184 |
| 2006/0238156 A1 * | 10/2006 | Kim | 318/568.12 |
| 2006/0250255 A1 | 11/2006 | Flanagan | |
| 2007/0002808 A1 * | 1/2007 | Twitchell, Jr. | 370/338 |
| 2007/0016341 A1 | 1/2007 | Nagasawa | |
| 2007/0056157 A1 | 3/2007 | Hirata et al. | |
| 2007/0088477 A1 | 4/2007 | Brewer et al. | |
| 2007/0194882 A1 * | 8/2007 | Yokota et al. | 340/5.61 |
| 2008/0071429 A1 * | 3/2008 | Kraimer et al. | 701/2 |
| 2008/0129445 A1 | 6/2008 | Kraimer et al. | |
| 2008/0189005 A1 | 8/2008 | Chilson | |
| 2008/0202243 A1 | 8/2008 | Gross | |
| 2009/0076664 A1 | 3/2009 | McCabe et al. | |
| 2010/0114405 A1 * | 5/2010 | Elston et al. | 701/2 |
| 2010/0145551 A1 | 6/2010 | Pulskamp et al. | |
| 2011/0018699 A1 | 1/2011 | Chen et al. | |
| 2011/0035086 A1 | 2/2011 | Kim et al. | |
| 2011/0118903 A1 * | 5/2011 | Kraimer et al. | 701/2 |
| 2011/0166721 A1 | 7/2011 | Castaneda et al. | |

FOREIGN PATENT DOCUMENTS

| | | | | |
|---|---|---|---|---|
| EP | 1462880 A2 | 9/2004 | | |
| EP | 2036763 A2 | 3/2009 | | |
| FR | 2764091 A1 | 12/1998 | | |
| GB | 1002825 | 9/1965 | | |
| GB | 2197799 A | 6/1988 | | |
| GB | 2360500 | 9/2001 | | |
| JP | 02152898 | 6/1990 | | |
| JP | 07138000 A | 5/1995 | | |
| JP | 2002104800 | 4/2002 | | |
| JP | 2002104800 A | * | 4/2002 | B66F 9/24 |
| JP | 2005094425 A | 4/2005 | | |
| WO | 199215977 | 9/1992 | | |
| WO | 9639679 A1 | 12/1996 | | |

(56) References Cited

FOREIGN PATENT DOCUMENTS

| WO | 2004057553 | | 7/2004 |
|---|---|---|---|
| WO | 2010065864 | A2 | 6/2010 |
| WO | 2011002478 | A2 | 1/2011 |

OTHER PUBLICATIONS

Gregory Garcia; B.O.S.S. A Battery Operated Smart Servant; EEL 5666c; Intelligent Machines Design Lab; Sensor Presentation; Center for Intelligent Machines and Robotics; University of Florida; Aug. 17, 2006.
Weber et al; "Ein tragbares Funk-Fernsteuergerat fur Gewinnungsmaschinen", Gluckauf, Minova Carbo Tech Gmbh; Jul. 13, 1967; pp. 375-378; XP002093388; ISSN; 0340-7896; Essen DE.
Emery, Carole; Invitation to Pay Additional Fees and Partial International Search; International Application No. PCT/US2007/078455; Sep. 3, 2008; European Patent Office.
Pham, Phong; International Search Report and Written Opinion of the International Searching Authority; International Application No. PCT/US2007/078455; Dec. 29, 2008; European Patent Office.
Application No. PCT/US2007/078455, filed Sep. 14, 2007, entitled "Systems and Methods of Remotely Controlling a Materials Handling Vehicle".
Application No. PCT/US2009/066789, filed Dec. 4, 2009, entitled "Multiple Zone Sensing for Materials Handling Vehicles".
Application No. PCT/US2009/069839, filed Dec. 30, 2009, entitled "Apparatus for Remotely Controlling a Materials Handling Vehicle".
Application No. PCT/US2009/069833, filed Dec. 30, 2009, entitled "Steer Correction for a Remotely Operated Materials Handling Vehicle".
Redhwan K. Mawari; Office Action-Final Rejection in U.S. Appl. No. 11/855,310; Sep. 1, 2010; U.S. Patent and Trademark Office; Alexandria, VA.
Photograph 1; AirMouse; http://theairmouse.com/; Deanmark Ltd; Ontario, Canada; First publication date unknown, and first discovered by the inventors on Jan. 28, 2010.
Photograph 2; TINYOM Hand Free Scanning; http://txcom.com/public/?page=tinyom; First publication date unknown, and first discovered by the inventors on Aug. 10, 2009.
Photograph 3; RS409 Wearable Ring Scanner; http://www.motorola.com/business/v/index.jsp?vgnextoid=5dbee90e3ae95110VgnVCM10; First publication date unknown, and first discovered by the inventors on Oct. 30, 2008.
Photograph 4; Peregrine; http://www.theperegrine.com/; First publication date unknown, and first discovered by the inventors on Nov. 23, 2009.
U.S. Appl. No. 12/649,815, filed Dec. 30, 2009, entitled "Steer Correction for a Remotely Operated Materials Handling Vehicle".
Lalinde, Rafael; International Search Report and Written Opinion of the International Searching Authority; International Application No. PCT/US2009/066789; Dec. 16, 2010; European Patent Office.
Lalinde, Rafael; International Search Report and Written Opinion of the International Searching Authority; International Application No. PCT/US2009/069833; Dec. 2, 2010; European Patent Office.
Bourdon, G. et al.; Instantaneous Fuzzy Modelling for Obstacle Avoidance; Systems, Man and Cybernetics; Intelligent Systems for the 21st Century; IEEE International Conference; vol. 3; Oct. 22, 1995; pp. 2546-2551; New York, NY; USA.
Kovacs, S. et al.; Interpolation-based Fuzzy Logic Controller, as a Simplified Way for Constructing the Fuzzy Rulebase of the Path Tracking and Collision Avoidance Strategy of an AGV; Systems, Man and Cybernetics; IEEE International Conference; vol. 2; Oct. 11, 1998; pp. 1317-1322; New York, NY; USA.
Lalinde, Rafael; International Search Report and Written Opinion of the International Searching Authority; International Application No. PCT/US2009/069839; Mar. 16, 2011; European Patent Office.
http://www.cajunbot.com/technology; 2011; CajunBot Labs.
http://www.cajunbot.com; 2011; CajunBot Labs.
Urban Challenge; http://www.darpa.mil/grandchallenge/index.asp; Nov. 3, 2007.
CajunBot Wiki; http:cajunbot.com/wiki/Main_Page; Apr. 18, 2010.
Vano Gea, Joaquin; International Search Report and Written Opinion of the International Searching Authority; International Application No. PCT/US2012/022011; Jun. 30, 2012; European Patent Office.
Pitard, Jacqueline; Invitation to Pay Additional Fees and Communication Relating to the Results of the Partial International Search; International Application No. PCT/US2012/025849; Jul. 16, 2012; European Patent Office.
Desyllas, Dimitri; International Search Report and Written Opinion; International Application No. PCT/US2012/025849; Sep. 12, 2012; European Patent Office.
Khatib, Rami; Non-final Office Action in U.S. Appl. No. 12/631,007; Nov. 30, 2012; U.S. Patent and Trademark Office; Alexandria, VA.
To, Tuan; Non-final Office Action in U.S. Appl. No. 12/649,815; Aug. 29, 2012; U.S. Patent and Trademark Office; Alexandria, VA.
To, Tuan; Final Office Action in U.S. Appl. No. 12/649,815; Dec. 13, 2012; U.S. Patent and Trademark Office; Alexandria, VA.
Fei, Jordan S.; Non-Final Office Action in U.S. Appl. No. 12/649,738; Apr. 12, 2013; U.S. Patent and Trademark Office; Alexandria, VA.
Fei, Jordan S.; Non-Final Office Action in U.S. Appl. No. 12/649,738; Aug. 1, 2013; U.S. Patent and Trademark Office; Alexandria, VA.
Khatib, Rami; Non-Final Office Action in U.S. Appl. No. 13/738,016; Jul. 17, 2013; U.S. Patent and Trademark Office; Alexandria, VA.
Khatib, Rami; Non-Final Office Action in U.S. Appl. No. 13/738,060; Jul. 18, 2013; U.S. Patent and Trademark Office; Alexandria, VA.
Khatib, Rami; Non-Final Office Action in U.S. Appl. No. 13/738,097; Jul. 18, 2013; U.S. Patent and Trademark Office; Alexandria, VA.

* cited by examiner

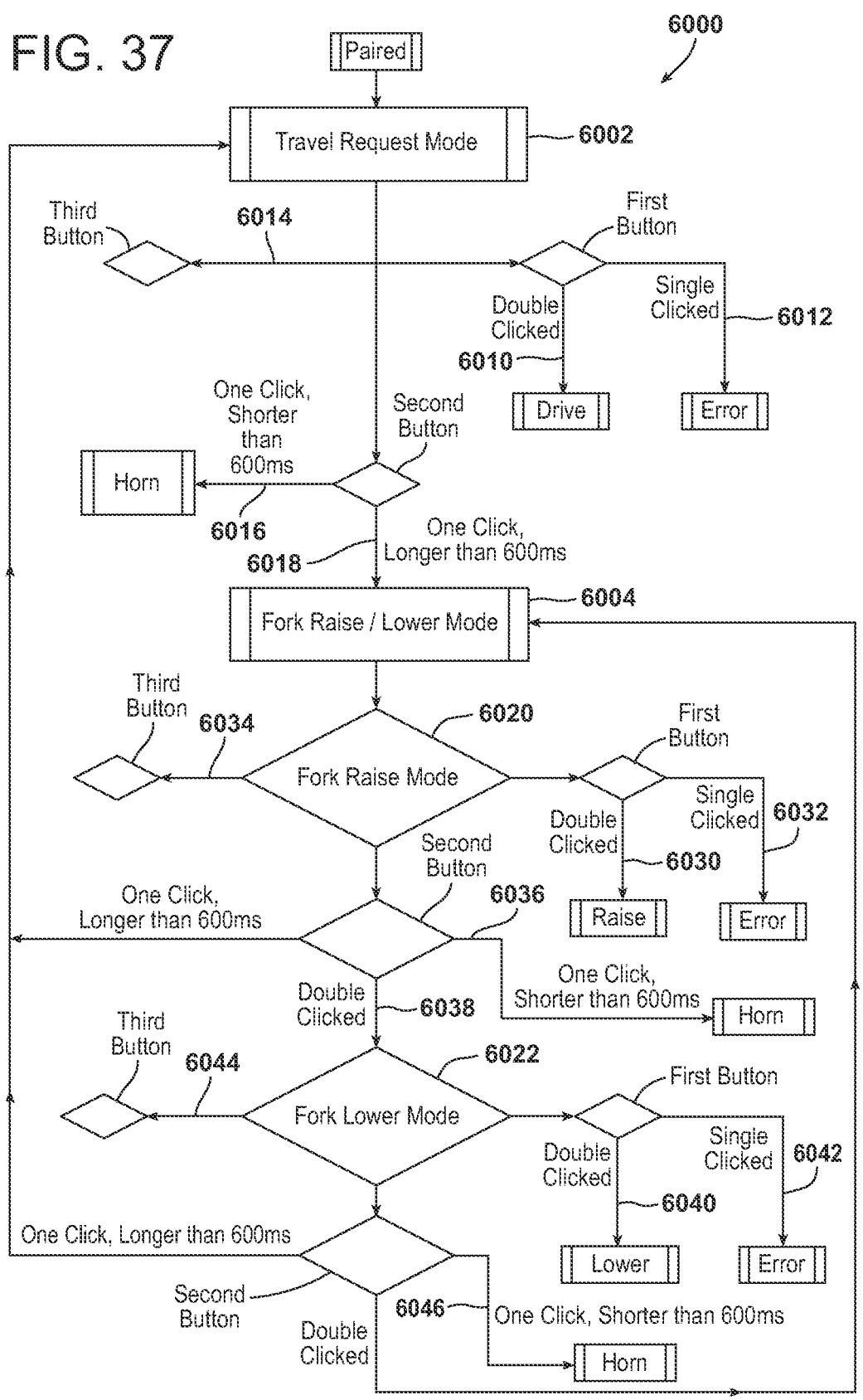

WEARABLE WIRELESS REMOTE CONTROL DEVICE FOR USE WITH A MATERIALS HANDLING VEHICLE

CROSS REFERENCE TO RELATED APPLICATIONS

This application is a continuation in part of U.S. patent application Ser. No. 11/855,310, filed Sep. 14, 2007 and entitled "SYSTEMS AND METHODS OF REMOTELY CONTROLLING A MATERIALS HANDLING VEHICLE," Ser. No. 13/011,366, filed Jan. 21, 2011 and entitled "SYSTEMS AND METHODS OF REMOTELY CONTROLLING A MATERIALS HANDLING VEHICLE," and Ser. No. 13/798,232, filed Mar. 13, 2013 and entitled "WEARABLE WIRELESS REMOTE CONTROL DEVICE FOR USE WITH A MATERIALS HANDLING VEHICLE," which each claim the benefit of U.S. Provisional Patent Application Ser. No. 60/825,688, filed Sep. 14, 2006, entitled "SYSTEMS AND METHODS OF REMOTELY CONTROLLING A MATERIALS HANDLING VEHICLE," the entire disclosures of each of which are hereby incorporated by reference herein. This application is also a Continuation-In-Part of International Application Nos. PCT/US2007/078455, filed Sep. 14, 2007 and entitled "SYSTEMS AND METHODS OF REMOTELY CONTROLLING A MATERIALS HANDLING VEHICLE," PCT/US2012/022011, filed Jan. 20, 2012 and entitled "SYSTEMS AND METHODS OF REMOTELY CONTROLLING A MATERIALS HANDLING VEHICLE," and PCT/US2014/020979, filed Mar. 6, 2014 and entitled "WEARABLE WIRELESS REMOTE CONTROL DEVICE FOR USE WITH A MATERIALS HANDLING VEHICLE," the entire disclosures of which are each hereby incorporated by reference.

BACKGROUND OF THE INVENTION

The present invention relates in general to materials handling vehicles, and more particularly, to supplemental wearable wireless remote control devices for use with materials handling vehicles for improved operation thereof.

Low level order picking trucks are commonly used for picking stock in warehouses and distribution centers. Such order picking trucks typically include load carrying forks, a power unit and a platform upon which an operator may step and ride while controlling the truck. The power unit has a steerable wheel and corresponding traction and steering control mechanisms, e.g., a movable steering arm that is coupled to the steerable wheel. A control handle attached to the steering arm typically includes the operational controls necessary for operating the truck, such as controls for raising and lowering the forks and for controlling the speed and direction (forward or reverse) of the truck.

In a typical stock picking operation, an operator fills orders from available stock items that are located in storage areas provided on both sides of a plurality of aisles of a warehouse or distribution center. The operator drives a low lever order picking truck to a first location where item(s) on a first order are to be picked. In a pick process, the operator retrieves the ordered stock item(s) from their associated storage area(s) and places the picked stock on a pallet, collection cage or other support structure carried by the forks of the order picking truck. The operator then advances the order picking truck to the next location where item(s) are to be picked. The above process is repeated until all stock items on the order(s) have been picked.

The operator normally steps onto the truck platform to ride on the order picking truck when the distance between consecutive picks is longer, for example twenty or more feet (approximately 6.1 meters). Correspondingly, the operator walks alongside the truck when the distance along the route between consecutive picks is short. Accordingly, some order picking trucks include jog switches located on the truck in the vicinity of the forks and/or on or near the control handle. The jog switches can be used by an operator walking alongside the order picking truck to accelerate the truck to a walking speed, typically between approximately 1.6 miles per hour (3.3 kilometers per hour) to around 3.5 miles per hour (5.6 kilometers per hour) to move from one stock pick location to the next stock pick location without the need to step onto the platform of the order picking truck. However, for such actions, the operator is required to interrupt picking while the order picking truck is relocated to the next location. Thus, the operator may be required to move out of a desired working position or modify a desired walking route to reach the jog switches.

It is not uncommon for an operator to be required to repeat the pick process several hundred times per order. Moreover, the operator may be required to pick numerous orders per shift. As such, the operator may be required to spend a considerable amount of time relocating and repositioning the order picking truck, which reduces the time available for the operator to spend picking stock.

SUMMARY OF THE INVENTION

In accordance with a first aspect of the present invention, a supplemental remote control system is provided for a materials handling vehicle. The supplemental remote control system comprises a wearable wireless remote control device that is donned by an operator interacting with the materials handling vehicle and comprises a docking area, a detachably mountable communications device, and a travel control. The communications device temporarily docks to the docking area during use of the supplemental remote control system to control movement of the materials handling vehicle and includes a wireless transmitter. The travel control is communicably coupled to the wireless transmitter, wherein actuation of the travel control causes the wireless transmitter to wirelessly transmit a travel request as a first type signal requesting the materials handling vehicle to move across a floor surface in a first direction.

The communications device and the travel control may be components of electronic hardware of the remote control device. The electronic hardware may also include a wire providing communication between the travel control and the wireless transmitter. The travel control and the wire of the electronic hardware may be detachably mountable to a garment of the remote control device, and the docking area may also be detachably mountable to the garment. The docking area, the travel control, and the wire may be provided as an integral unit. The garment may comprise a glove, in which case the travel control may comprise a button on a finger of the glove, or the garment may comprise a strap that is worn on a wrist or arm of the operator, in which case the travel control may comprise a button that is wearable over a finger of the operator.

Wireless communication may be provided between the communications device and the travel control.

In accordance with a second aspect of the present invention, a supplemental remote control system is provided for a materials handling vehicle. The supplemental remote control system comprises a wearable wireless remote control device that is donned by an operator interacting with the materials handling vehicle and comprises a garment, a docking area that is detachably mountable to the garment, and electronic hardware. The electronic hardware comprises a detachably mountable communications device, a travel control, and structure that provides communication between the travel control and a wireless transmitter of the communications device. The communications device temporarily docks to the docking area during use of the supplemental remote control system to control movement of the materials handling vehicle, wherein actuation of the travel control causes the wireless transmitter to wirelessly transmit a travel request as a first type signal requesting the materials handling vehicle to move across a floor surface in a first direction.

In accordance with a third aspect of the present invention, a supplemental remote control system is provided for a materials handling vehicle. The supplemental remote control system comprises a wearable wireless remote control device that is donned by an operator interacting with the materials handling vehicle and comprises a garment, a docking area associated with the garment, and electronic hardware. The electronic hardware comprises a detachably mountable communications device, a travel control, and a wire. The communications device temporarily docks to the docking area during use of the supplemental remote control system to control movement of the materials handling vehicle and comprises a wireless transmitter. The wire provides communication between the travel control and the wireless transmitter, and the travel control and the wire of the electronic hardware are detachably mountable to the garment. Actuation of the travel control causes the wireless transmitter to wirelessly transmit a travel request as a first type signal requesting the materials handling vehicle to move across a floor surface in a first direction.

The garment may comprise one of a strap that is worn on a wrist or arm of the operator and a glove, wherein the communications device is selectively mountable to a respective docking area on the strap and the glove with no modification of the communications device.

In accordance with a fourth aspect of the present invention, a supplemental remote control system is provided for a materials handling vehicle. The remote control system comprises a wireless remote control device that is useable by an operator interacting with the materials handling vehicle. The wireless remote control device comprises a wireless transmitter and a travel control communicably coupled to the wireless transmitter, wherein actuation of the travel control causes the wireless transmitter to wirelessly transmit a travel request as a first type signal requesting the vehicle to advance in a first direction. The remote control system further comprises a receiver for receiving transmissions from the wireless transmitter at the vehicle and a controller that is communicably coupled to the receiver and to a traction control system of the vehicle. The controller is responsive to receipt of the first type signal by the receiver to evaluate at least one vehicle condition, to decide whether to implement the travel request based upon the evaluation of the at least one vehicle condition, and to cause the fraction control system to advance the vehicle if the controller decides to implement the travel request based upon the evaluation of the at least one vehicle condition. The wireless remote control device further comprises an input component communicably coupled to the wireless transmitter, wherein actuation of the input component causes the wireless transmitter to wirelessly transmit a second type of request to the receiver on the vehicle requesting the vehicle to perform a second vehicle function other than to advance the vehicle.

The input component may comprise one of the button on the garment portion and another button on the wireless remote control device, and the second vehicle function may comprise the controller implementing one of a fork raise and a fork lower operation to raise or lower forks on the vehicle.

The same button may be usable to both request the controller to advance the vehicle and to request the controller to implement the one of the fork raise and the fork lower operation.

Switching between a travel request mode that is used to request the controller to advance the vehicle and a fork raise/lower request mode that is used to request the controller to implement the one of the fork raise and the fork lower operation may be accomplished by an appropriate operation of the wireless remote control device.

The remote control system may further comprise indication structure on the vehicle for at least one of audibly and visibly distinguishing when the vehicle is in a travel request mode that is used to request the controller to advance the vehicle from when the vehicle is in a fork raise/lower request mode that is used to request the controller to implement the one of the fork raise and the fork lower operation.

In accordance with a fifth aspect of the present invention, a method is provided for operating a supplemental remote control system for a materials handling vehicle. A wireless remote control device is provided that is useable by an operator interacting with the materials handling vehicle, the wireless remote control device having a wireless transmitter and a travel control communicably coupled to the wireless transmitter, wherein actuation of the travel control causes the wireless transmitter to wirelessly transmit a travel request as a first type signal requesting the vehicle to advance in a first direction. A receiver is provided for receiving transmissions from the wireless transmitter at the vehicle, and a controller is provided that is communicably coupled to the receiver and to a traction control system of the vehicle. The controller is responsive to receipt of the first type signal by the receiver to evaluate at least one vehicle condition, to decide whether to implement the travel request based upon the evaluation of the at least one vehicle condition, and to cause the traction control system to advance the vehicle if the controller decides to implement the travel request based upon the evaluation of the at least one vehicle condition. The wireless remote control device further comprises an input component communicably coupled to the wireless transmitter, wherein actuation of the input component causes the wireless transmitter to wirelessly transmit a second type of request to the receiver on the vehicle requesting the vehicle to perform a second vehicle function other than to advance the vehicle.

The controller may be configured to cause the traction control system to advance the vehicle for as long as maintained actuation of the travel control on the wearable wireless remote control device is detected.

In accordance with a sixth aspect of the present invention, a supplemental remote control system is provided for a materials handling vehicle. The remote control system comprises a wireless remote control device that is useable by an operator interacting with the materials handling vehicle, the wireless remote control device comprising a wireless transmitter and a travel control communicably coupled to the wireless transmitter, wherein actuation of the travel control causes the wireless transmitter to wirelessly transmit a travel request as a first type signal requesting the vehicle to advance in a first direction. The remote control system further comprises a receiver for receiving transmissions from the wireless transmitter at the vehicle and a controller that is communicably coupled to the receiver and to a traction control system of the vehicle. The controller is responsive to receipt of the first type signal by the receiver to implement the travel request to cause the vehicle to move in the first direction. The wireless remote control device further comprises an input component communicably coupled to the wireless transmitter, wherein actuation of the input component causes the wireless transmitter to wirelessly transmit a second type of request to the receiver on the vehicle requesting the controller to implement a second vehicle function other than to advance the vehicle.

BRIEF DESCRIPTION OF THE SEVERAL VIEWS OF THE DRAWINGS

The following description of the preferred embodiments of the present invention can be best understood when read in conjunction with the following drawings, where like structure is indicated with like reference numerals, and in which:

FIG. 37 is a flow chart illustrating an exemplary method of remotely controlling traction and fork raise/lower operations of the truck illustrated in FIG. 36 in response to wireless remote commands according to various embodiments of the present invention.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Various aspects of the present invention relate to wireless remote control arrangements that include a wireless remote control that is worn or otherwise secured to an operator for wireless remote operation of features of a materials handling vehicle such as a lift truck. Further, various aspects of the present invention relate to systems provided on a materials handling vehicle for responding to wireless remote control commands. Still further, synchronization and use operations are described to facilitate user interaction and wireless remote control of a materials handling vehicle according to various aspects of the present invention.

Figure 1:
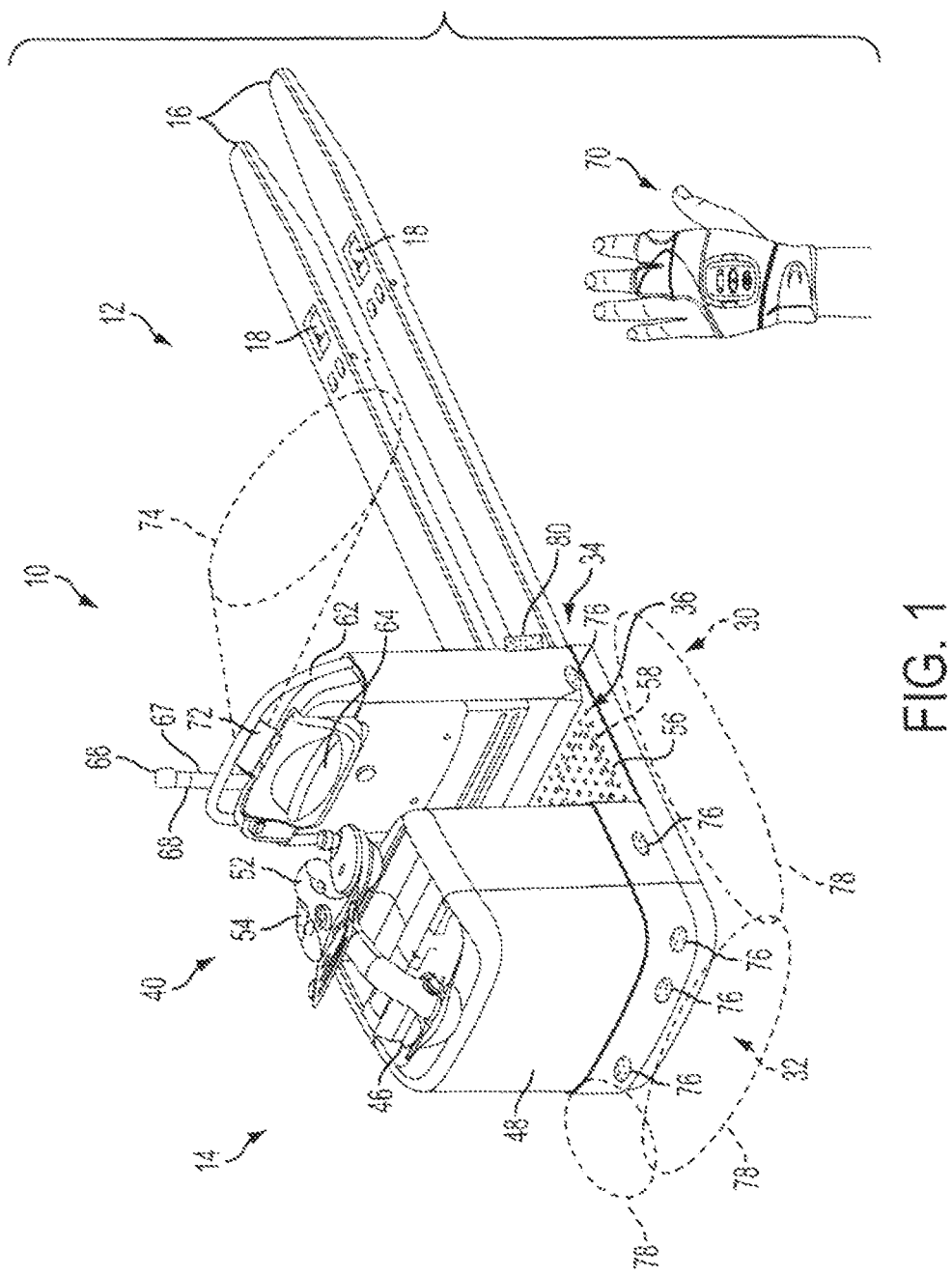
FIG. 1 is a perspective view of a low level order picking truck according to various embodiments of the present invention.

Referring now to the drawings, and particularly to FIG. 1, a materials handling vehicle, which is illustrated as a low level order picking truck 10 includes in general, a load handling assembly 12 that extends from a power unit 14. The load handling assembly 12 includes a pair of forks 16, each fork 16 having a load supporting wheel assembly 18. The load handling assembly 12 may include other load handling features in addition to, or in lieu of the illustrated arrangement of the forks 16, such as a load backrest, scissors-type elevating forks, outriggers and separate height adjustable forks, a mast, a load platform, collection cage or other support structure carried by the forks 16 or otherwise provided for handling a load supported and carried by the truck 10.

The illustrated power unit 14 comprises an operator's area 30 having a first end section 32 positioned opposite the forks 16, a second end section 34 positioned adjacent to the forks 16 and a step-through operator's station 36 dividing the first end section 32 from the second end section 34. A first work area is provided towards the first end section 32 of the power unit 14 and includes a control area 40 for driving the truck 10 and for controlling the features of the load handling assembly 12. The first end section 32 may also optionally comprise a first storage area 46, e.g., for securing loose items that a corresponding truck operator may wish to keep track of. The first end section 32 also defines a compartment 48 for containing a battery, control electronics and motor(s), such as a traction motor, steer motor and lift motor for the forks (not shown).

As shown for purposes of illustration, and not by way of limitation, the control area 40 comprises a handle 52 for steering the truck 10, which may include controls such as grips, butterfly switches, thumbwheels, rocker switches, a hand wheel, a steering tiller, etc., for controlling the acceleration/braking and travel direction of the truck 10. For example, as shown, a control such as a switch grip 54 may be provided on the handle 52, which is spring biased to a center neutral position. Rotating the switch grip 54 forward and upward will cause the truck 10 to move forward, e.g., power unit 14 first, at a speed proportional to the amount of rotation of the switch grip 54. Similarly, rotating the switch grip 54 toward the rear and downward of the truck 10 will cause the truck 10 to move in reverse, e.g., forks 16 first, at a speed proportional to the amount of rotation of the switch grip 54. Devices may also be provided for sounding a horn or for performing other truck functions.

The step-through operator's station 36 provides a platform 56 upon which an operator may stand to drive the truck 10 and operate the load handling features of the truck 10. Presence sensors 58 may also be provided, e.g., on, above, or under the platform floor 56 or otherwise provided about the operator's station 36, to detect the presence of an operator on the truck 10 as will be explained in greater detail herein. In the exemplary truck of FIG. 1, the presence sensors 58 are shown in dashed lines indicating that they are positioned under the platform 56. Under this arrangement, the presence sensors 58 may comprise load sensors, switches, etc. As an alternative, the presence sensors 58 may be implemented above the platform 56, such as by using ultrasonic, capacitive or other suitable sensing technology.

The second end section 34 of the power unit 16 may comprise an operator rest pad or other suitable support structure, a grab bar 62 and a second storage area 64. An antenna 66 is provided for receiving control signals from a corresponding remote control device 70, which in one embodiment comprises a transmitter, a power pack, and a control structure, as will be described in greater detail herein. As shown, radio frequency (RF) performance is facilitated by coupling the antenna 66 to the second end section 34 of the power unit 14, e.g., along or otherwise proximate to a vertically extending post 67 that may also support a light source 68. The placement of the antenna 66 above the light source 68 on the post 67 provides a convenient location for promoting RF reception and may eliminate variability from the light source 68 and its associated wires running past the antenna 66. Alternatively, the antenna 66 can be positioned anywhere else on the truck 10. The light source 68 may be utilized to provide information about the state of the truck 10 and/or state of wireless communication between a properly paired wireless remote control and the truck. For example, the light may illuminate when the truck 10 is in motion and blink or illuminate in defined patterns to indicate prescribed conditions.

The grab bar 62 may be used by the operator as a grasping surface, e.g., when entering, exiting or operating the truck 10. Additionally, the grab bar 62 and other included posts, e.g., an additional optional grab bar towards the first end section 32 (not shown) may be further utilized, for example, to support accessories such as scanners, computers, radios, communications devices and other electronics, lights, clipboards, fans, storage units and other work or convenience related accessories, or other required items for performing intended tasks within an application. For example, the grab bar 62, or second end section 34 in general, may be used to mount supplemental operational controls.

The exemplary truck 10 is provided for illustration and not by way of limitation. In practice, the truck 10 may be implemented in other formats, styles and features, such as an end control pallet truck that includes a steering tiller arm that is coupled to a tiller handle for steering the truck. In this regard, the truck 10 may have similar or alternative control arrangements to that shown in FIG. 1.

In addition to or in lieu of the light source 68, an indicator, e.g., audible, visible etc., may be associated with the remote control system as will be described in greater detail herein. For example, as shown, the truck 10 may include an indicator such as a strobe light 72, which is illustrated as being positioned on or adjacent to the second end section 34 of the power unit 14 mounted relatively low to the ground. The indicator may alternatively be mounted in any other practical location, e.g., on a load backrest, on a vertically extending pole such as the light source 68, or other part of the truck 10.

The strobe light 72 may be set to a unique pattern that is associated with remote control operation. As such, when the truck 10 is not operating under wireless remote control, the strobe pattern can change relative to when the truck 10 is operating under wireless remote control. For example, the strobe light 72 may be turned off or changed in intensity, pattern etc. when the truck 10 is not under wireless remote control. Comparatively, the strobe can flash when the truck 10 is under wireless remote control. The speed, intensity or other patterns can vary based upon the operating conditions of the truck, e.g., to indicate motion, fault conditions, etc. As illustrated, the light pattern 74 from the strobe light 72 is directed generally downward at an angle towards the forks 16. As such, the strobe area is not distracting to the operator or to other people in the vicinity of the truck 10, e.g., in the working aisle of the truck 10, yet is apparent and visible to the operator and other people in the vicinity of the truck 10.

The truck 10 may also comprise one or more object sensors 76, which are provided about the truck 10, e.g., towards the first end section 32 of the power unit 14 and/or to the sides of the power unit 14. The object sensors 76 may comprise any suitable proximity or contact detection technology, such as an ultrasonic sensors, optical recognition devices, infrared sensors, etc. For example, the object sensors 76 may be implemented by Bosch URF6 ultrasonic sensors and a corresponding controller.

The object sensors 76 may be used to detect the presence of objects within a predefined area of the power unit 14, such as within a predefined detection area 78 as illustrated in dashed lines. In practice, the range of each object sensor 76 may be different, and the sensor detection areas 78 may overlap or otherwise be arranged, depending upon the specific implementation and selection of proximity detecting technology. For example, the object sensors 76 towards the front of the power unit 14 may have a range of approximately 0-5 feet (0-1.5 meters) and the object sensors 76 to the sides of the power unit 14 may have a range of approximately 0-2 feet (0-0.6 meters). Moreover, the detection range of the object sensors 76 may be adjustable or be otherwise made dynamically variable. For example, the range of the object sensors 76 may be extended if certain operating conditions are detected, etc. As an example, the range of the object sensors 76 may be adjusted based upon the speed of the truck 10 when advancing under wireless remote control.

Further, the truck 10 may comprise one or more load presence sensors 80. The load presence sensor(s) 80 may comprise proximity or contact technology, e.g., a contact switch, a pressure sensor, an ultrasonic sensor, optical recognition device, infrared sensor or other suitable technology that detects the presence of a suitable load carrying structure, e.g., a pallet or other platform, collection cage, etc. The load presence sensor(s) 80 may be mounted towards the front of the power unit 14, to a load backrest or other suitable support structure, the location of which will likely depend upon the technology deployed.

Figure 2:
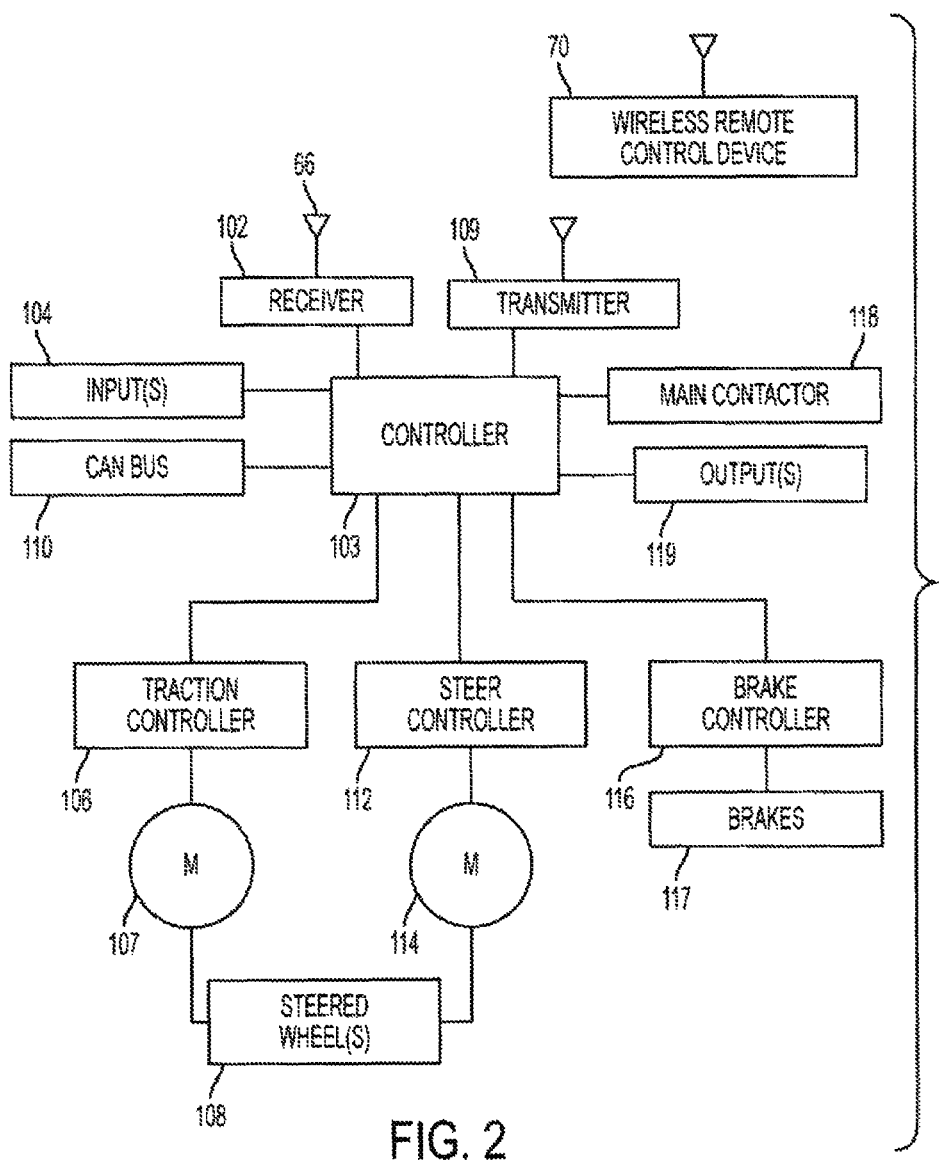
FIG. 2 is a block diagram illustrating an exemplary system for remotely controlling traction, steer and/or brake functions of the truck illustrated in FIG. 1 in response to wireless remote commands according to various embodiments of the present invention.

Referring to FIG. 2, a block diagram 100 illustrates a control arrangement for integrating remote control commands with the truck 10. The antenna 66 is coupled to a receiver 102 for receiving commands issued by the remote control device 70. The receiver 102 passes the received commands to a controller 103, which implements the appropriate actions in response to the received commands, e.g., by operating relays or other actuation devices controlled by electricity, magnetics, hydraulics, pneumatics, etc., or by communicating with other truck components. The controller 103 may also receive other inputs 104 from other sources, such as switches, encoders and other input devices available to the truck 10 to determine appropriate action in response to the received commands from the remote control device 70.

In one exemplary arrangement, the remote control device 70 is operative to wirelessly transmit a travel request as first type signal, also referred to herein as a "travel signal" or "go signal" to the receiver on the truck 10. The travel request is used to request the truck 10 to advance or jog in a first direction. The first direction may be defined, for example, by movement of the truck 10 in a power unit 14 first, i.e., forks 16 to the back, direction. However, other directions of travel may alternatively be defined. Moreover, the truck 10 may be controlled to travel in a generally straight direction or along a previously determined heading.

The first type signal is received by the receiver 102 and is communicated to the controller 103. If the controller 103 determines that the travel signal is a valid travel signal and that the current vehicle conditions are appropriate (explained in greater detail below), the controller 103 sends a signal to the appropriate control configuration of the particular truck 10 to advance and then stop the truck 10. As will be described in greater detail herein, stopping the truck 10 may be implemented by either allowing the truck 10 to coast to a stop, by applying a brake to stop the truck.

As an example, the controller 103 may be communicably coupled to a traction control system, illustrated as a traction motor controller 106 of the truck 10. The controller is responsive to receipt of the first type signal by the receiver 102 to evaluate at least one vehicle condition, to decide whether to implement the travel request based upon the evaluation of the vehicle condition(s) and to cause the traction control system to advance the vehicle if the controller decides to implement the travel request based upon the evaluation of the condition(s).

The traction motor controller 106 is coupled to a traction motor 107 that drives at least one steered wheel 108 of the truck 10. The controller 103 may communicate with the fraction motor controller 106 in such a way so as to limit the speed of the truck 10 in response to receiving a travel request from the remote control device 70. For example, the travel speed of the truck 10 may be limited to typical walking speed, e.g., up to or around 2.75 miles per hour (4.4 kilometers per hour).

There may be noise and/or interference, e.g., from other wireless and remote control systems in the vicinity of the truck 10. As such, either the receiver 102 or the controller 103 may perform signal analysis to discriminate valid travel signals from invalid signals. For example, the controller 103 may determine that the receiver 102 has provided a travel signal at an improper frequency or on an improper channel. Moreover, an operator and/or transmitter identification (ID) code may be embedded into the travel request as will be described in greater detail below. Under such a case, the controller 103 may be operatively configured to respond to messages bearing only certain ID codes or to exclude/disregard commands from certain ID codes.

Also, the travel signal may be detected at a power level that is too strong or too weak to be considered a valid signal. For example, if a signal is too strong, it may indicate that an operator is too close to the truck 10 to initiate automated travel. Correspondingly, if a signal is too weak, that may indicate that an operator has exceeded a predetermined range from the truck 10 for allowed remote control.

Still further, the controller 103 may require an acknowledgement signal or other bi-directional communication from the remote control device 70 that was not timely received. For example, the controller 103 may be coupled to a transmitter 109 on the truck 10 to facilitate bi-directional communication with the wireless remote control device 70. Under these and other similar circumstances, the controller 103 may opt to disregard a received travel request and not take action if the bi-directional communication is not properly confirmed. Still further, bi-directional communication may be utilized for pairing the receiver 102 in the truck 10 to a corresponding instance of a wireless remote control device 70 as will be described in greater detail herein.

The controller 103 may also refuse to acknowledge the travel signal depending upon vehicle condition(s) that relate to environmental or operational factors. For example, the controller 103 may disregard an otherwise valid travel request based upon information derived from one or more of the sensors 58, 76, 80. In this regard, the sensors 58, 76, 80 etc. may be coupled to the controller 103 via the inputs 104 or via a suitable truck network, such as a control area network (CAN) bus 110. Any other number of reasonable conditions may also/alternatively be implemented by the controller 103 to interpret and take action in response to received signals.

The CAN bus 110 facilitates a convenient platform for the controller 103 of the truck 10 to communicate with any truck system or module connected to the CAN bus 110 to make decisions as to how to implement commands received from the remote control device 70. Moreover, relevant information derived from the truck 10 can be communicated back to the remote control device 70 by utilizing the transmitter 109 in the truck 10 to communicate with a corresponding receiver in the remote control device 70.

The CAN protocol is a convenient network platform for material handling vehicles as there is no addressing of subscribers or stations in the conventional network sense. Rather, the CAN defines a prioritized system of transmitted messages where the priority of a given message broadcast across the CAN bus 110 is dependent upon a corresponding message identifier code. A message broadcast from a first module can be received by all nodes or modules connected to the CAN bus 110. Thus, the controller 103 can make intelligent decisions with regard to wireless remote control and/or to the exchange of information with a corresponding paired wireless remote control device 70 based upon any number of factors, states, conditions, etc., that can be conveyed across the CAN bus 110.

The network may alternatively comprise any other bus system, e.g., a Local Interconnect Network (LIN) or a Vehicle Area Network (VAN), etc., or communications capabilities, such as a wiring harness, bus other signal propagation manner or other control network. As such, the various controllers and electronics on the truck 10 may broadcast, unicast or otherwise communicate with each other.

Upon acknowledgement of a valid travel request, the controller 103 interacts with the traction motor controller 106, e.g., via the CAN bus 110 or other communication coupling, to advance the truck 10. Depending upon the particular implementation, the controller 103 may interact with the traction motor controller 106 to advance the truck 10 by a predetermined distance. Alternatively, the controller 103 may interact with the traction motor controller 106 to advance the truck 10 for a period of time in response to the detection and maintained actuation of the control on the remote control device 70. Further, the truck 10 may be configured to jog for as long as a travel control signal is received. However, the controller 103 may further be configured to "time out" and stop the travel of the truck 10 based upon a predetermined event, such as exceeding a predetermined time period or travel distance regardless of whether maintained actuation of a corresponding control on the remote control device 70. Other control arrangements may alternatively be implemented for effecting the range, duration, speed, etc. of the truck 10 when operating under wireless remote control, examples of which will be set out in greater detail herein.

The controller 103 may also communicate, e.g., via the CAN bus 110 or otherwise, with a steer control system to cause the truck 10 to adjust a travel path of the truck 10. For example, the controller 103 may communicate with a steer controller 112 to command or otherwise control a steer motor 114 or other suitable control device, which also couples to the steered wheel(s) 108 of the truck 10. For example, the controller 103 may straighten out the truck 10, or adjust a steer angle of the truck 10 before or during a wireless remote control initiated travel operation. As such, the controller 103 may default to a mode of operation wherein the truck 10 travels in a straight direction or along a predetermined heading when the truck 10 is moving under wireless remote control in response to receipt of a travel request. The controller 103 may further impose a steer angle limit during remote control operations if the truck 10 is to travel in a direction where the steered wheel(s) 108 is not straight. For example, the controller 103 may limit the angle that the truck 10 can travel when executing remote controlled travel requests to a range of approximately 5 to 10 degrees. Thus, in addition to jogging the traction motor 107, the controller 103 may also straighten out or otherwise adjust or control the steered wheel 108.

The remote control device 70 may also be operative to transmit a second type signal, such as a "stop signal", designating that the truck 10 should brake and/or otherwise come to rest. The second type signal may also be implied, e.g., after implementing a "travel" command. The second type signal is received by the receiver 102 and is communicated to the controller 103. If the controller 103 determines that the stop signal is a valid stop signal, the controller 103 sends a signal to a brake control system, e.g., via the CAN bus 110 or otherwise. For example, the controller 103 may communicate with a brake controller 116 of the truck 10 to cause an appropriate brake arrangement 117 to bring the truck 10 to rest. As an alternative to a stop signal, the second type signal may comprise a "coast signal", designating that the coast should allow the truck 10 to eventually come to rest. For example, if a coast signal is recognized by the controller 103 as a valid coast signal, then the controller 103 may disengage drive to the truck 10, e.g., by instructing the fraction controller 106 to stop applying a signal to drive the traction motor 107, but otherwise allow the truck 10 to coast and gradually slow to a stop. Any number of reasonable conditions or factors may be considered by the controller 103 to interpret and take action in response to received stop or coast signals. Further, rather than the remote control device 70 transmitting a second type signal to request that the truck 10 implement a particular function, the remote control device 70 may transmit multiple instances of the first type signal, i.e., if a button on the remote control device 70 is "double clicked", to request that the truck 10 implement a particular function, as will be discussed below.

The time that it takes to bring the truck 10 to a complete rest may vary, depending for example, upon the intended application, the environmental conditions, the capabilities of the particular truck 10 and other similar factors. For example, after completing an appropriate jog movement, it may be desirable to allow the truck 10 to "coast" some distance before coming to rest so that the truck 10 stops slowly. This may be achieved by utilizing regenerative braking to slow the truck 10 to a stop so that a predetermined range of travel distances may be achieved from the initiation of the stop operation until the time in which the truck finally comes to rest. Alternatively, a braking operation may be applied after a predetermined delay time to allow a predetermined range of additional travel to the truck 10 after the initiation of the stop operation. It may also be desirable to bring the truck 10 to a relatively quicker stop, e.g., if an object is detected in the travel path of the truck 10 or if an immediate stop is desired after a successful jog operation. For example, the controller may apply predetermined torque to the braking operation.

Under such conditions, the controller 103 instructs the brake controller 116 to apply the brakes 117 to stop the truck 10.

Moreover, if a truck disable function is implemented, the truck may stop with maximum braking torque. For example, the wireless remote control 70 may include a disable control that transmits a message instructing the truck 10 to brake and/or shut down. In response to the disable function, the truck 10 may also switch off a main contactor 118 that is utilized to power up the truck 10. Under this arrangement, the truck 10 may require a restart operation, e.g., by using a key switch or other suitable configuration to re-initiate a truck startup procedure. The controller 103 may also interact with other truck outputs 119 to implement desired activities, e.g., to control a horn, light source, display, etc. As such, the controller 103 may interact with various components of the truck 10, with the operator and with wireless remote control devices 70 to implement various traveling, stopping, coasting and power enabling strategies.

As noted above, the controller 103 may communicate with the brake controller 116 to cause the brake arrangement 117 to bring the truck 10 to rest under various conditions. For example, the outputs of the object sensors 76 may be overridden while the operator is driving the truck 10, for example, to allow the operator to navigate the truck 10 in tight spaces and around corners that might otherwise activate one or more of the object sensors 76. However, the outputs of the object sensors 76 may be effective and not overridden when no operator is sensed on the truck 10. As such, the controller 103 may communicate with the brake controller 116 to stop the truck 10 if the controller 103 determines that an object is in the path of travel of the truck 10, e.g., as detected by the object sensors 76 during travel in response to receiving a remote travel request from the remote control device 70.

Additionally, the controller 103 may refuse to implement a travel request in response to receiving a travel signal from a corresponding wireless remote control 70 if the platform presence sensor(s) 58 detect the presence of an person on the truck, or where the load presence sensors 80 indicate that a corresponding load platform, e.g., a pallet, is not in position on the forks of the truck. Still further, the controller 103 may communicate with the brake controller 116 to stop the truck 10 if the load presence sensors 80 detect a change of the load platform from a valid designated position.

The remote control device 70, the receiver 102 and the transmitter 109 may communicate over a range of frequencies, thus allowing the remote control device 70 and corresponding truck 10 to lock onto a frequency or frequencies that have minimal interference from outside sources. Additionally, any number of wireless technologies may be utilized to facilitate interaction between the truck 10 and the remote control 70, including the use of spread spectrum technologies.

As an example, technologies such as a Bluetooth communications link or a derivative thereof, may be formed between the transmitter in the remote control device 70 and the receiver 102 on the truck 10. The Bluetooth and similar communication technologies allow control over remote output power intensity, adjustable output power, multiple sub-channels and frequency hopping to reduce the likelihood of noise and other interference in the work area. Bluetooth bandwidth may also simplify transmission of voice control, as will be described in greater detail herein.

If the truck 10 includes a tiller arm instead of the illustrated steering control, the truck may include a steering arm brake. As such, a steering arm locking device may be provided for placing the truck into a coast mode of operation when using the remote, for example, as disclosed in U.S. Pat. No. 6,595,306, assigned to the same assignee and which is herein incorporated by reference.

Figure 3:
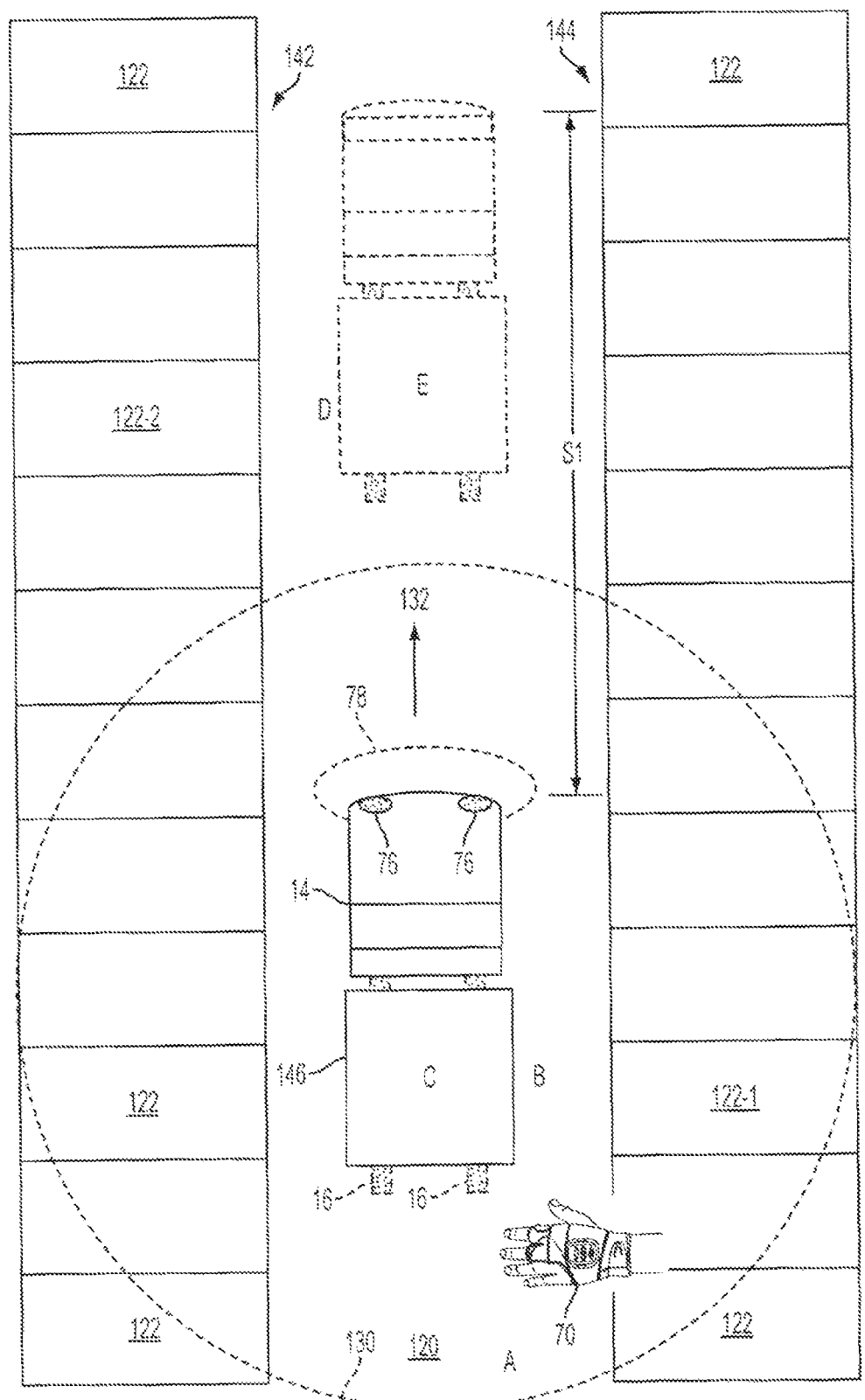
FIG. 3 is a schematic illustration of the truck in a warehouse aisle according to various embodiments of the present invention.

Referring to FIG. 3, the remote control device 70 and the corresponding receiver 102 may be configured so that wireless control is operable over a predetermined distance. The truck 10 is situated in a typical warehouse aisle 120 having a plurality of storage locations 122 on either side of the aisle 120. As illustrated, the remote control device 70 is capable of communicating with the truck 10 over a range designated by the dashed path radius 130. The range may vary depending upon a particular implementation. For example, a range of operation may depend upon an anticipated distance that an operator is expected to walk from the truck 10 to pick an item during a picking process. In an illustrative example, this distance may be approximately 25 feet (7.62 meters). Moreover, the range of operation need not be the same in all directions or under all conditions. For example, the range of operation may have a pattern that is elliptical or in some other directional pattern, etc. Still further, there may be a minimum range, within which the wireless remote control may be nonfunctional. As described above, the controller 103 may discriminate signals that are too strong, suggesting that the operator is either standing on, or is in too close of proximity to the truck 10 for remote operation. As yet another example, the operation range may be affected by operating conditions and environmental conditions, such as the speed of the truck, where the truck is located within a facility, etc.

It may be desirable to set or otherwise program the range of the object sensors 76 for detecting obstacles in the path of the truck 10, which is traveling in response to receiving a travel request from the remote control device 70. For example, as shown, each of the object sensors 76 are set to detect objects in their path within a distance, which is schematically suggested by the range designated by the dashed detection area 78 proximate to each object sensor 76. The side-located object sensors 76 are not illustrated in FIG. 3 for clarity of discussion. The range of the object sensors 76 may also be configured to change, either statically or dynamically. For example, the range of the object sensors 76 may change as the speed of the truck 10 changes in response to received jog commands, etc.

For each actuation of the travel request on the remote control device 70, the operator can advance the truck 10 without taking the time to physically engage the controls on the truck 10. For example, upon issuing a travel request via the remote control device 70, the operator may walk towards the next item to be retrieved, or perform some other task. The truck 10 automatically travels forward by an amount corresponding to the travel request. For example, if travel for a predetermined distance is commanded, after traveling the predetermined distance, the truck 10 stops, without requiring a separate control action from the operator. Alternatively, the truck 10 may stay in motion for as long as a jog command is issued by the remote 70, e.g., by maintained actuation of a travel button. Under this later configuration, the truck 10 continues to travel until the operator releases the travel button, the operator engages a stop or coast button, a specified maximum continuous travel time expires or some other appropriate action stops the truck 10.

As an example, of a first optional manner in which an operator can interact with the truck 10, assume that an operator travels with the truck 10 down the aisle 120. A first row 142 of storage locations 122 is located on a first side of the truck 10. A second row 144 of storage locations 122 is located on a second side of the truck 10. Each of the first and second rows 142, 144 of storage locations 122 include a plurality of individual storage areas, which may be bins, pallets, delineated or otherwise designated areas, etc. Moreover, each storage location 122 may comprise several independent storage areas that are vertically stacked, such as in a racking system in a warehouse facility or distribution center. As such, there may be multiple levels of storage at each storage location 122. During automatic operation of the truck via the remote control device 70, the truck 10 travels down the aisle 120. For example, the truck 10 is illustrated traveling with the power unit 14 forward as illustrated by the directional arrow 132. Thus, the forks 16 are towards the back of the truck 10 when traveling under remote control. Other travel directions may be alternatively implemented.

Assume that the operator is initially located at position A, and that an item is to be picked from a storage location 122 designated as storage location "122-1" in row 144. The operator walks from position A to the storage location "122-1" to retrieve the desired pick item. After picking the desired contents, the operator is at position B, which is just in front of storage location "122-1". It is further assumed that the operator has advanced or is in the process of advancing the truck 10 using the remote control device 70 such that a load platform 146 that is situated on the forks 16 of the truck 10 is located at position C, which is in the vicinity of position B. The operator need not carry any item(s) of the pick order to the truck 10 when walking from position A to storage location "122-1". Moreover, by the time that the operator arrives at position B with the item(s) picked from storage location "122-1" (or shortly before or thereafter), the truck 10 has come to rest at position C. Thus, the operator need only carry the pick item(s) a relatively short distance from storage location "122-1 to position B.

After placing the pick onto the load platform 146 of the truck 10, the operator may then step onto the truck 10 to drive to the next location, or if there are additional items to be picked in the current aisle 120, the operator may move the truck 10 using the travel control of the remote control device 70.

Continuing with the above example, it is assumed that the operator is now located at position B, and that an item is to be picked from a storage location 122 designated as storage location "122-2" in row 142. The operator walks from position B to storage location "122-2" to retrieve the desired pick item. Moreover, the operator initiates a wireless remote control travel request, e.g., by using the remote control device 70 to wirelessly transmit a first type ("travel") signal to the receiver on the truck 10. By the time that the operator arrives at position D with the item picked from storage location "122-2" (or shortly before or thereafter), the truck 10 has traveled under wireless remote control from position C and has come to rest at position E, which is in the vicinity of position D. Again, the operator places the retrieved item on the load platform 146 of the truck 10 in a manner that minimizes the distance that the operator must walk while carrying items on the pick order.

Moreover, by moving the truck 10 foreword while picking, the time required to pick from a given aisle 120 can be reduced because the operator need not interrupt the pick process to reposition or reorient the truck 10. Still further, as schematically illustrated, a single actuation of a travel control on the remote control device 70 may cause the truck 10 to advance a distance 51 and then stop. As such, after actuating the travel control via the remote control device 70, the truck 10 is positioned in a convenient place for the operator to place previously retrieved items in a manner that minimizes the distance that the operator must carrying the picked item(s). Moreover, because the operator need not disrupt picking or other work related tasks, the operator may save energy and time in completing a given task, e.g., compared with an operation wherein the operator is required to continually stop working to advance the truck to its next location.

One measure of productivity of an operator is the time that the operator spends at the pick face. That is, how much time is spent picking orders compared to time spent relocating the truck 10 and performing other tasks not immediately related to locating and loading pick items. As is evident in the discussion above, the time required to relocate the truck 10 has been reduced allowing the operator to spend more time picking items. Moreover, the truck 10 can be remotely controlled to always stay in front of the operator, allowing the operator to work towards a load carrying portion of the truck 10. This minimizes the distance that the operator must travel to fetch and load pick items, and further reduces the distance that the operator must walk while carrying the pick items. This may become significant, especially where the forks 16 of the truck 10 are relatively long. For example, certain forks 16 can support triple length loads, such as three pallets.

Moreover, warehouse management system software that directs operators in their picking operations can take into account the remote travel control of the truck 10 when planning pick orders so that the advantages of the remote control can be further enhanced by more efficient computer processing when preparing the pick orders.

Figure 4:
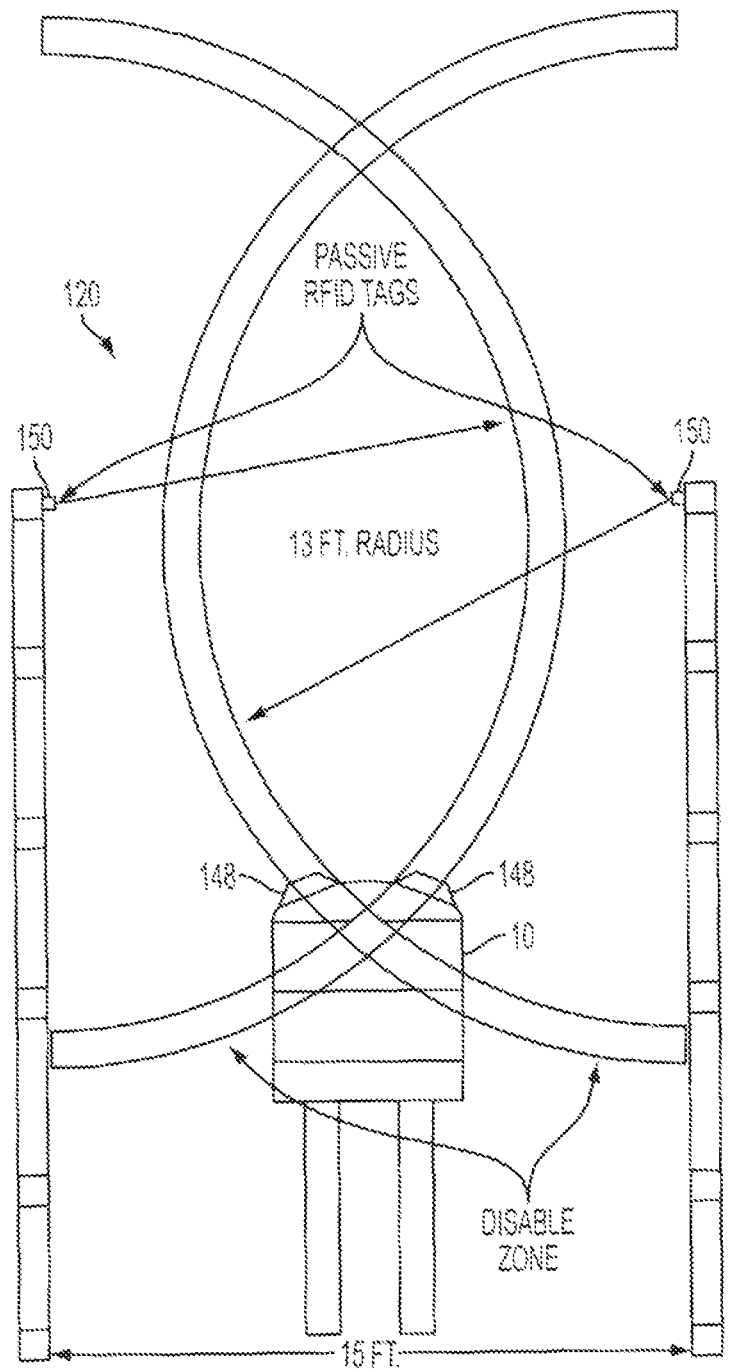
FIG. 4 is a schematic illustration of the truck towards the end of an exemplary warehouse aisle illustrating a disabling zone according to various aspects of the present invention.

Referring to FIG. 4, according to an aspect of the present invention, additional features may be incorporated into the warehouse or other facility and/or to the truck 10 to provide enhanced functionalities. For example, the wireless remote jog control functionality may be disabled in certain locations about a facility, such as at the end of aisles, at crossing or intersecting passageways, at loading or receiving dock areas, at areas of high pedestrian traffic, etc. To illustrate this feature, assume that wireless remote jog control is to be disabled on the truck 10 as the truck 10 approaches the end of an aisle 120. To facilitate disabling wireless remote jog control of the truck 10 at a predetermined location, the truck 10 includes one or more devices 148, such as radio frequency identification (RFID) antennas. Corresponding RFID tags 150 are positioned at the end of the aisle at a suitable position.

The devices 148 generate signals in response to detecting the end of the aisle, e.g., by sensing the corresponding RFID tags 150, which trigger the truck 10 to stop if it is under wireless remote jog control. For example, signals from the devices 148 may couple to corresponding inputs, e.g., appropriate ones of the inputs 104 on the controller 103. For example, if the controller 103 detects an appropriate signal from one of the devices 148 and the controller 103 detects that it is currently operating the truck 10 in response to a travel request from the remote control device 70, the controller may issue an appropriate command to the brake controller 116 to stop the truck 10.

In the illustrated example, the aisle 120 is 15 feet (approximately 4.6 meters) wide and the RFID antennas 148 are configured to detect the corresponding RFID tags 150 within a radius of 13 feet (approximately 3.9 meters). This provides sufficient overlap of coverage in the aisle 120 for detection by the truck 10 and provides ample distance for the exemplary truck 10 to brake or otherwise come to a rest proximate to the end of the aisle. In practice, other ranges may be utilized and may be varied, based for example, upon the stopping requirements of the truck 10 and corresponding wireless remote control implementation, the sensing technology utilized and other suitable factors.

Figure 5:
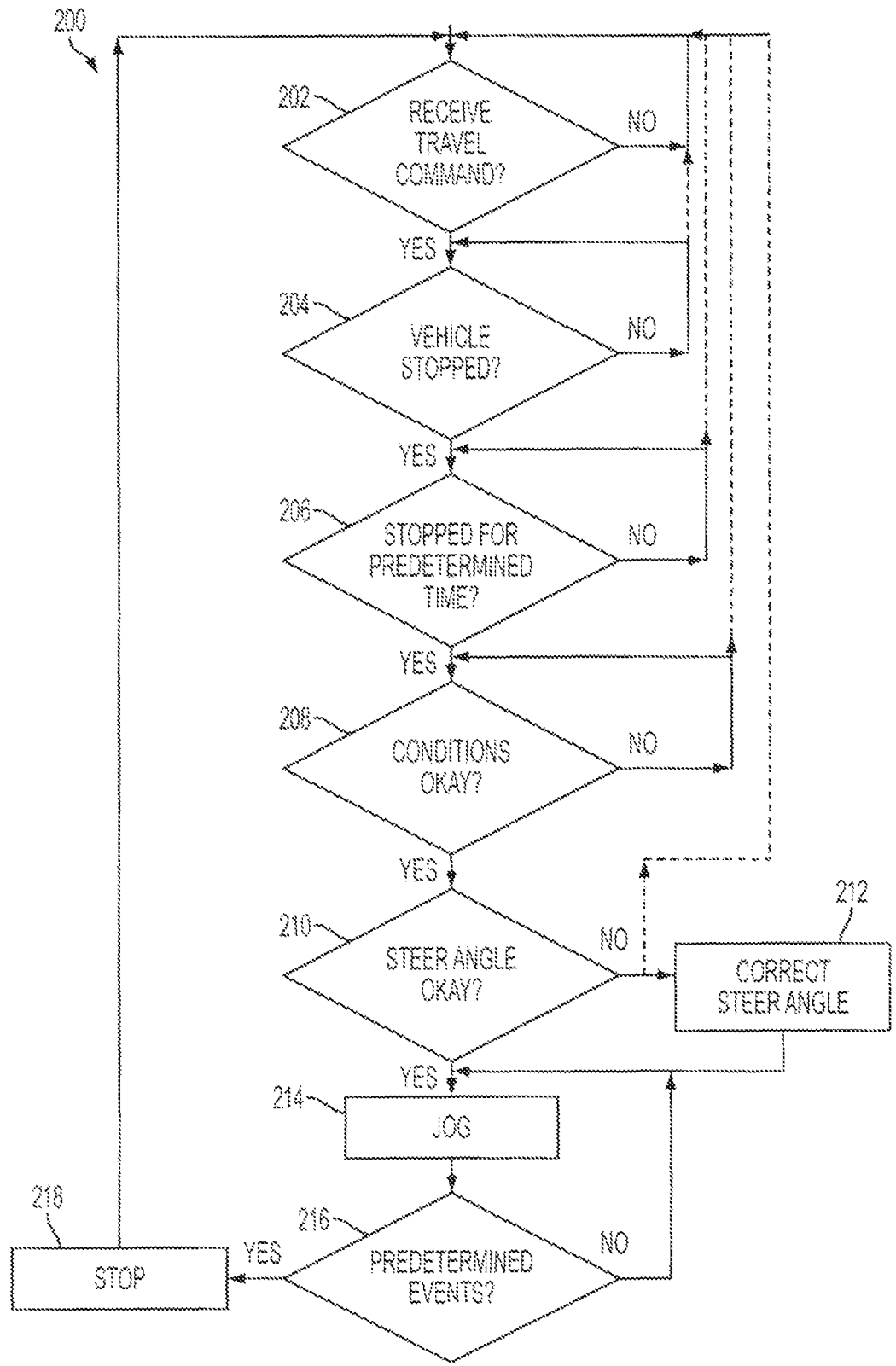
FIG. 5 is a flow chart illustrating an exemplary decision process of the controller on the truck of FIG. 1 according to various embodiments of the present invention.

Referring to FIG. 5, a method 200 of implementing the travel function is illustrated. The method 200 may be implemented, for example, by the controller 103 on the truck 10. As noted herein, the controller 103 may be responsive to receipt of a travel request from the remote control device 70 to cause the truck 10 to advance unless at least one condition is satisfied. The method 200 sets out various exemplary vehicle conditions that may affect how the controller 103 interprets travel requests from the remote control device 70.

The process waits to receive a travel request at 202. If no travel request is received, the process continues to wait. If a travel request is received, the process may either implement the travel request 202 or perform optional checks or evaluations of vehicle conditions to determine whether to acknowledge or otherwise implement the travel request, examples of which are illustrated at 204, 206, 208 and 210.

For example, the process may require that the truck is stopped before recognizing a new travel request. This vehicle condition requirement may be implemented, for example, where the controller 103 limits the maximum amount of continuous travel of the vehicle without stopping while under wireless remote control in response to receipt of the first type (travel request) signal(s). In this regard, the controller 103 may determine whether the truck is currently stopped at 204, e.g., using feedback from an encoder or other suitable device to detect motion of the truck. If the truck is not stopped, the process may optionally wait until the truck has come to rest or the process may ignore or otherwise terminate evaluation of whether to implement the received travel request as indicated by the dashed lines.

Moreover, the process may require that not only that the truck be stopped, but that there is no movement of the truck for a predetermined period of time. Thus, for example, if the truck is stopped, the process may determine whether a predetermined interval has passed after detecting that the truck has come to rest at 206. If the predetermined interval has not passed, the process may wait until the predetermined interval has lapsed or the process may ignore or otherwise terminate processing of the received travel request as indicated by the dashed lines.

The process may also check at 208 for vehicle conditions such as operational and/or environmental conditions that would affect operation of the truck in response to a remote travel request. If the vehicle condition check(s) indicate that it is okay to proceed processing the received travel request, then processing continues. Otherwise, the process may wait to resolve the condition, or the process may ignore or otherwise terminate processing of the received travel request as indicated by the dashed lines.

Operational and environmental conditions that may cause the process to ignore or otherwise refuse to implement a travel request from the remote control device 70 may include factors such as detecting an operator on the platform, detecting an object in the travel path of the truck, detecting that the truck is in an area or location where wireless remote control is not allowed, e.g., at the end of aisles or at intersections such as by using the RFID tags described with reference to FIG. 4, detecting the lack of a pallet or other suitable carrier structure on the forks of the truck, detecting that an invalid operator is logged into the truck and/or that the truck is paired with an unauthorized user, detecting that the power level of the received travel request is outside a range, e.g., too weak indicating that the operator is out of a predetermined maximum range, or too strong, indicating that the operator is too close to the truck, etc. Thus, the operator may have to wait, clear an obstacle, or otherwise remedy a condition before the truck is ready to respond to remote travel requests.

The process may also check that a steer angle of the truck is within a predetermined range of steer angles at 210. If the steered wheel(s) of the truck are turned beyond the predetermined range, the steer angle may be corrected at 212. Alternatively, the system may default the steered wheel to a predetermined position, e.g., steered straight or the system may ignore or otherwise terminate processing of the received travel request.

The truck is then moved forward at 214. For example, if each evaluated vehicle condition is satisfied by the controller as allowing remote travel, the controller causes the traction control system to advance the truck. The truck may also sound an alarm or provide other forms of audible or visual cues when the truck is traveling in response to wireless remote control commands, or when the travel control on the remote control device 70 remains actuated, such as by using the light source 68 and/or the indicator such the strobe light 72. As further illustrative examples, a horn and/or other cue may be controlled by relays or other suitable switching devices to be active concomitantly with engagement of the traction motor while the truck operates in response to wireless remote control commands.

The process checks at 216 to determine whether a predetermined stopping event has occurred. For example, the process may check to determine whether the operator has deactivated the travel control on the remote control device 70. Upon deactivating the travel control, the truck stops, e.g., by applying a brake, by coasting or by performing other suitable stopping operations. The process may also check at 216 to determine whether a predetermined time of travel, distance of travel or other like event has passed in response to movement of the vehicle in response to wireless remote control.

For example, the truck may be configured to travel a maximum distance of continuous movement in response to a single wireless remote control travel request. As another example, the truck may be configured to travel a maximum distance of continuous movement in response to repeated successive wireless remote control travel requests. An exemplary range may comprise a travel distance limited to 25-50 feet (approximately 7.6 meters to 15.2 meters). As another example, the truck may be configured to travel for up to a predetermined maximum continuous travel time.

Other exemplary stopping events may comprise vehicle conditions, e.g., as imposed by predefined travel limits, receiving a stop or disable command, detecting an obstacle in the travel path of the truck 10, detecting a person on the truck, detecting a change in the position of the load carrying device (e.g., pallet, cage), detecting mechanical, electrical, pneumatic, hydraulic abnormal conditions of the truck, etc. If the predetermined stopping event is met at 216, the truck is stopped or controlled to coast to a rest at 218 and the system resets. If the operator issues a travel request from the wireless control device 70 before a given task is complete, the system may wait for the current task to complete before issuing the next command.

According to various aspects of the present invention, the remote control device 70 is a wearable wireless remote control device that is donned by the operator who is interacting with the truck. In general, the wearable wireless remote control device may comprise a wireless transmitter and a travel control, e.g., a button or switch that is communicably coupled to the wireless transmitter. As will be described in greater detail below, actuation of the travel control causes the wireless transmitter to transmit a first type signal, which may request the truck to advance in a first direction. Depending upon the particular implementation, the wireless remote control device may further include a power pack such as a battery for powering the remote control device electronics, a control area where the travel control is located on the operator, e.g., on or about a hand of the operator and a communications link between the transmitter and the control area where the transmitter is physically spaced from the control area when worn by the operator.

Figure 6:
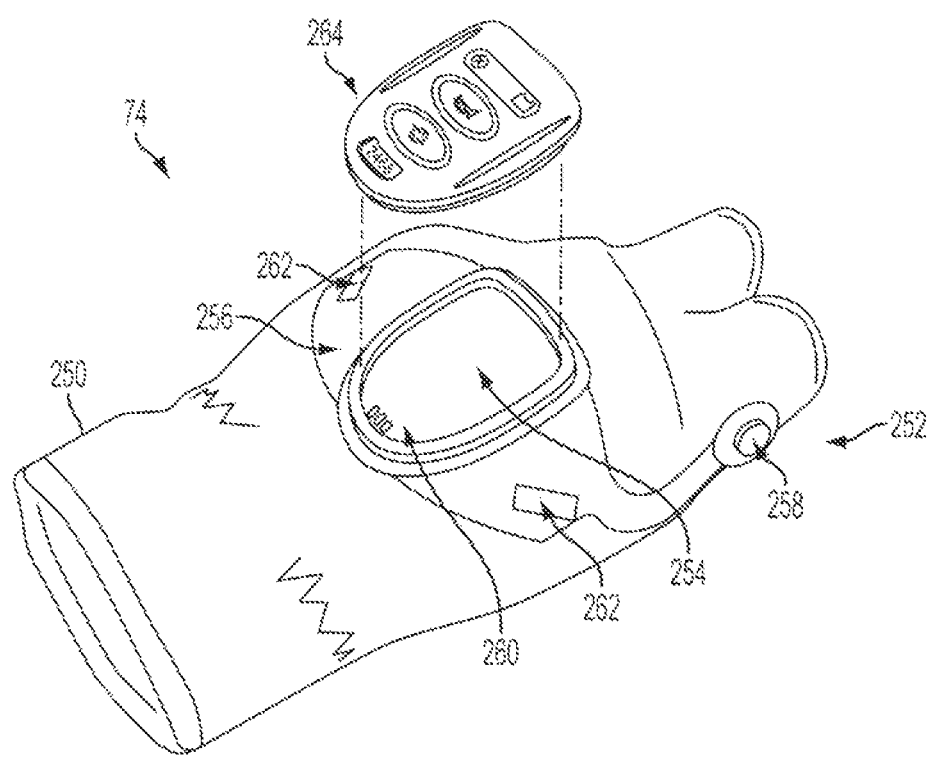
FIG. 6 is an illustration of an exemplary remote control device according to various aspects of the present invention.

Referring to FIG. 6, an exemplary garment 250 comprises a glove-like structure donned by a hand of the operator. The illustrated garment 250 includes a first control area 252, a docking area 254 that supports a detachable transmitter and power pack and a communications link implemented as a circuit 256 that interconnects the first control area 252 to the docking area. As shown, the control area 252 includes a first control 258, e.g., a button that is oriented to the side of a finger portion of the garment 250. In an illustrative example, the button extends from a glove finger through which the index finger of the truck operator extends when the garment 250 is properly donned. The button orientation provides a main face of the button juxtaposed with the thumb of the truck operator. As will be described in greater detail below, this configuration allows the truck operator to reach and actuate the first control 258 using their thumb, thus enabling operation of the remote control device 70 using a single hand gesture. Moreover, as will be described in greater detail below, this hand gesture may be performed even while performing work operative tasks such as holding or carrying boxes, scanning devices, tools, etc.

The docking area 254 includes a plurality of connection pads 260 that electrically couple to the first control area 252 via the circuit 256. As an example, the circuit 256 may comprise a flexible circuit that is integrated into or otherwise concealed by the material construction of the garment 250. The circuit 256 further supports one or more antennas 262. The docking area 254 is configured to receive a corresponding detachably mountable communications device 264. For example, the communications device 264 may comprise pads that couple the contacts 260 in the docking area when the communications device 264 is properly docked into the garment 250. The communications device 264 may be snapped, locked, secured using a hook and loop fastener such as a hook and loop fabric or material sold under the trademark Velcro® by Velcro Industries, Manchester N.H., USA, secured using magnetic forces or other suitable technique.

Figure 7A:
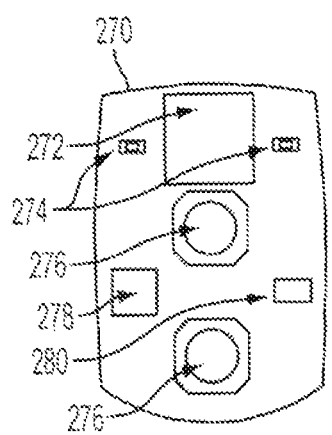
FIGS. 7A and 7B are illustrations of components of a dockable communications device that docks to a corresponding garment according to various aspects of the present invention.
Figure 7B:
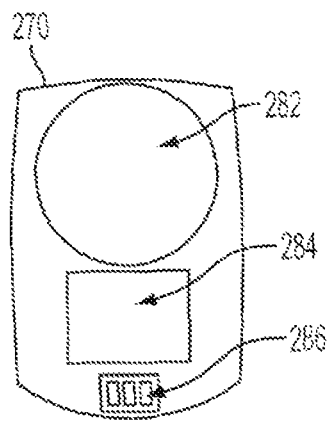

Referring to FIGS. 7A and 7B generally, a cover of the communications device 264 has been removed to illustrate an exemplary arrangement of components on a first surface (shown in FIG. 7A) and components on a corresponding second surface (shown in FIG. 7B) of a circuit board of the communications device 264. The communications device 264 comprises a carrier 270, e.g., a double sided printed circuit board that includes on a first side thereof, regulator circuitry 272 for regulating the power utilized to operate the communications device 264, display indicators 274 such as Light Emitting Diodes (LEDs) that provide a visual feedback as to the operation of the communications device 264, input components 276, such as switches, a processor 278 and a crystal 280 or other suitable processor clocking circuitry (if necessary by the particular processor). The carrier further supports on a second side thereof, a battery 282, a communications circuitry 284 such as a transmitter, receiver, transceiver, etc., and contacts 286 that communicate with the connection pads of the docking area 254 when the communications device 264 is docked in a corresponding garment 250.

The display indicators 274 may be utilized to provide a visual feedback to the operator as to the state of the remote control system. For example, a first one of the indicators may be used as a fault condition indicator. For example, an LED may illuminate an "X" symbol centered in a circle (best seen in FIG. 6) to indicate a fault condition such as where the "Go" button 258 is not connected, where any one of the buttons is shorted or faulty, where the radio link is down, where there is no receiver ID paired with the transmitter as will be explained in greater detail below, etc. Another indicator 274 may be utilized to indicate a low battery as represented by the icon of a battery, which is best seen in FIG. 6. Other uses of the indicators may be implemented, and more or less than two indicators may be provided. The remote control device 70 may further include additional alert elements such as a display screens sounds or other features that provide a visual and/or audible cue as to the status of the remote and/or the associated truck 10.

The input components 276 may comprise for example, two buttons. A first one of the buttons may correspond to a horn button. When the horn button is pressed, a corresponding message is transmitted to the receiver 102 on the truck 10 to sound the truck horn. A second one of the buttons may comprise an emergency disconnect button. Pressing this button causes an emergency disconnect command to be transmitted to the receiver 102 on the truck 10. In response to receiving an emergency disconnect command, the truck 10 may stop and power down, thus requiring an operator to reinitiate a startup procedure to restart the truck as described in greater detail herein.

The transmitter in the communications circuitry 284 may transmit information in an analog or digital form using any suitable proprietary or standardized wireless transmission formats. For example, transmission may be realized using existing technologies, such as 802.11, 802.16, Bluetooth, short message service (SMS), amplitude shift keying (ASK), on-off keying (OOK), wireless local area network (WLAN), code division multiple access (CDMA), amplitude modulation (AM), frequency modulation (FM), universal mobile telecommunications system (UMTS), cellular phone technology such as global system for mobile communications (GSM), etc. In practice, the manner in which the transmitter transmits messages should correspond to a format that is recognizable by the corresponding receiver on the truck 10. Moreover, the communications circuitry 284 of the remote control device 70 may also contain its own receiver for bi-directional communication with a corresponding truck 10.

When the communications device 264 is properly docked on a corresponding garment 250, the remote control device 70 provides a convenient platform for enabling a truck operator to remotely control their vehicle. For example, a user can operate the "Go" button 258, which communicates with the processor 278 of the communications device 264 via the circuit 256 and corresponding contacts 260 and connection pads 286. The go button causes the processor 278 to format and transmit a travel request that advances the truck if the travel request is received by the truck and is determined to be a valid command.

If the travel request is properly received by the receiver 102 and is determined to be a valid travel request, the truck 10 may be wirelessly remotely controlled to travel for a prescribed time and/or distance, and then enter a controlled brake or coast as described in greater detail herein. The button 258 may alternatively facilitate travel of the truck 10 for as long as there is maintained actuation of the button 258 (or until an intervening event occurs, such as the truck 10 reaching a maximum travel distance, travel time, detecting an environmental or operational condition that stops the truck, etc. The control area 252 and/or communications device 264 may also optionally include steer and or directional controls to provide commands to the truck to adjust the truck's steer angle as described in greater detail herein.

Still further, an optional stop button may be provided, e.g., within the control area 252 and/or on the communications device 264 to stop the truck, which may be useful where the coast function is implemented. If the stop command is properly received by the receiver 102, the truck 10 will be controlled to come to a controlled stop. Alternatively, an optional additional button may correspond to a coast command, which, if properly received by the receiver 102 on the truck 10, will cause the truck 10 to coast to a rest.

When any of the buttons on the remote control device 70 are pressed, the processor 278 formats an appropriate message and transmits the resulting signal via the transmitter 284 to the receiver 102. In this regard, the processor 278 may append to the command, a sequence, control or other identification information, a time stamp, channel indication or other data necessary for the receiver 102 to discriminate that the particular remote control device 70 is a valid communications device, to authenticate operators, to log data for historical or other purposes, etc.

While the remote control device 70 is illustrated as a glove garment that is worn by the operator around the wrist or arm, other configurations may alternatively be implemented. For example, the transmitter, power supply and or any of one or more controls such as the button 258 may be worn separately or together on any part of the body where it is comfortable, practical or desirable, as the specific application dictates. For example, as shown, the garment 250 is worn by a corresponding operator. As such, each operator may have their own glove containing the button 258, circuit 256 and antenna(s) 262 built in. When the operator begins a shift, a communications device 264 may be retrieved from an appropriate recharging station or other staging area, and is docked into the corresponding docking area 254.

By separating the communications device 264 from the garment 250 and corresponding button 258, a single transmitter may be reused with multiple instances of the garment 250. As such, operators on different shifts can maintain their own garments 250 including finger or hand worn controls, e.g., the button 258, and merely plug in or dock a communications device into their garment 250 at the start of their shift. This further allows identification technologies such as Radio frequency Identification (RFID) tags to be incorporated with the garment 250, which information can be subsequently transmitted to the truck 10. As such, the truck 10 can log the operator, productivity and other relevant information during operation.

Figure 8A:
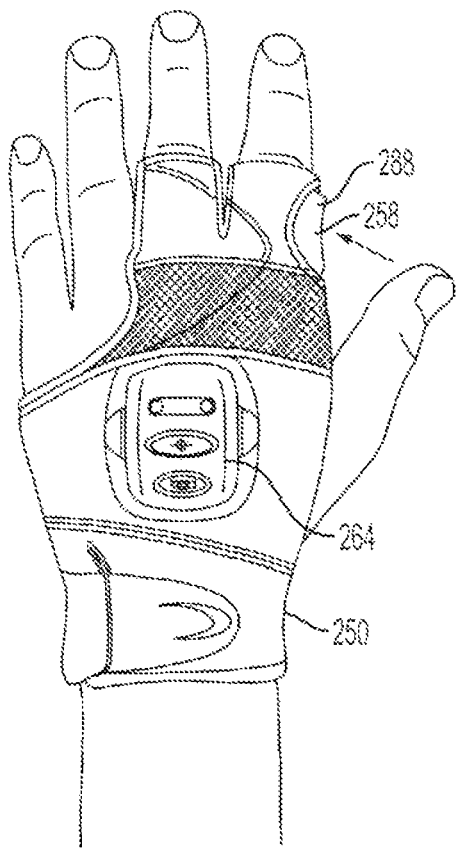
FIGS. 8A and 8B are illustrations of a communications device donned by an operator according to various aspects of the present invention.
Figure 8B:
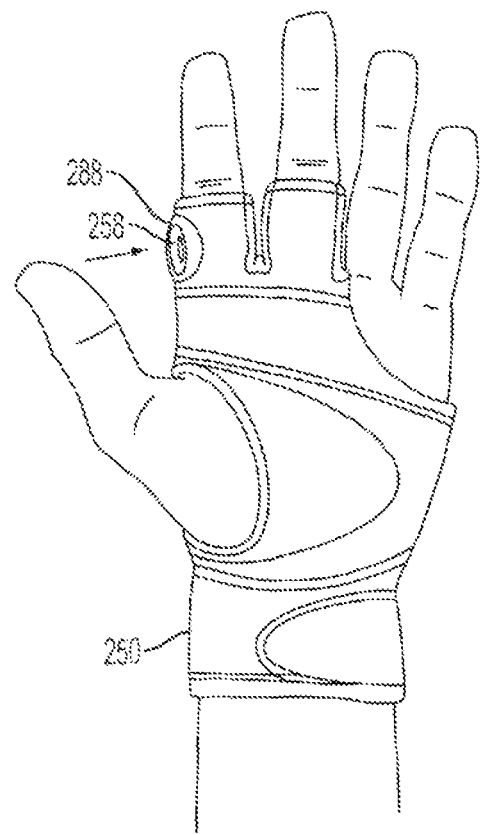

Referring to FIGS. 8A and 8B, the button 258 of the remote may be easily reached and operated with the corresponding thumb of the operator, as schematically represented by the directional arrows. Such action requires a deliberate, yet easily achievable action on the part of the operator to actuate the button 258. Moreover, operational sequences may be required to actuate the button 258. For example, a double press in quick succession, i.e., a "double click" may be required to actuate a control, as will be discussed herein. The remote control device 70 may be worn in such a way that neither hand of the truck operator is inconvenienced or otherwise interferes with an operator using both hands for picking items. Moreover, there is no inconvenience, such as requiring large limb movements, difficult to reach or otherwise inaccessible controls to move or stop the truck 10, even when the hands of the operator are currently engaged in a pick operation. As such, the operator can move or stop the truck 10, even when carrying pick items such as boxes, etc. with both hands, using a single, simple gesture.

According to an aspect of the present invention, an area 288 around the button 258 may include a raised/contoured collar.

To actuate and/or select the button 258, an operator must press down in the direction of the illustrated arrow within the collar and actuate the button 258. As yet another optional configuration, the button 258 could require a multi-dimensional operation before a successful actuation is transmitted. For example, the button 258 may require being depressed, then slid in a lateral direction generally orthogonal to the direction of the button press.

The garment 250 may be constructed from any number of materials such as stretchable fabrics, plastic, synthetics, leather, or other materials alone or in combination. Moreover, the various components of the remote control device 70 may be donned as an armband, as a belt or shirt clipped device or by other means. Moreover, the communications link connecting the control area to the transmitter on the garment may be implemented as a relatively thin wire that may optionally be tethered on a retractable take-up reel.

The button 258 may be positioned underneath a spring-loaded, flip down member, which may be manually flipped down to expose the button 258. Further, the button 258 may optionally be programmed to support multiple commands. For example, the remote control device 70 may be configured to transmit a "stop" command if a single actuation of the button 258 is detected. Moreover, a "travel" command may be transmitted if a double click or double actuation of the button 258 is detected within a predetermined time period. Alternatively, rather than transmitting different types of signals corresponding to each respective requested command, e.g., stop, travel, etc., the remote control device 70 may transmit single or multiple successive instances of the same signal based on the number of "clicks" implemented by the operator, wherein the controller 103 on the truck 10, upon receiving the signal instance(s), decides what command, if any, to actuate based on the number of received signal instances and/or current vehicle conditions, e.g., whether the truck 10 is currently moving under wireless remote control or stopped.

For example, a single click of a button on the remote control device 70 by the operator may cause a single instance of a signal to be transmitted by the remote control device 70 to the truck 10, and a double click of the button by the operator may cause a double instance of the signal to be transmitted by the remote control device 70 to the truck 10. The single instance of the signal may cause the truck 10 to implement a stop function, and the double instance of the signal may cause the truck 10 to implement a travel function as described herein, although the instances of the signal may cause the truck 10 to implement other predefined functions as described herein.

As another example, the controller 103 of the truck 10, upon receiving one or more instances of a signal, may evaluate vehicle conditions and implement a particular truck function based on the number of received signal instances and the vehicle conditions. In this example, a single click of the button by the operator may cause a single instance of a signal to be transmitted by the remote control device 70 to the truck 10, and a double click of the button by the operator may cause a double instance of the signal to be transmitted by the remote control device 70 to the truck 10. A single instance of the signal may cause the truck 10 to implement a stop function if the truck 10 is moving under wireless remote control upon the truck 10 receiving the signal. A double instance of the signal may also cause the truck 10 to implement a stop function if the truck 10 is moving under wireless remote control upon the truck 10 receiving the signal. If the truck 10 is stopped upon receiving the signal(s), a double instance of the signal may cause the truck 10 to implement a travel function while a single instance of the signal may not cause the truck 10 to implement travel function, i.e., the truck 10 ignores the signal.

Alternatively, redundant travel controls may be provided on the communications device 264, which controls may be pressed independently or may be programmed to require concomitant actuation to move the truck 10. As such, the communications device 264 may be worn on the arm of the operator, e.g., just above the wrist or in any easily accessible location, such as on a belt, shirt or pants, in which case, the communications device 264 may be tethered with a suitable wire harness to the button 258. Still further, short range wireless technology, such as Bluetooth, may be utilized to enable a communications device 264 to communicate with the garment 250 and corresponding button 258, and would allow the communications device 264 to be donned by the operator away from the garment 250 and corresponding button 258.

The remote control device 70 may also be worn as a pendant around the neck of the operator, e.g., by looping the remote control device 70 through a suitable lanyard. Under such an arrangement, the button 258 may comprises a pair of switches implemented as textured rubber surfaces on opposite sides of the remote control device 70. As such, an operator must squeeze the remote control device 70 to operate the travel control. By having two switches, concomitant actuation of both switches may be required. This also allows the transmitter, power pack and controls to be integrated into a single housing thus minimizing the interference of the remote control device 70 with the operator, e.g., by eliminating wires and other structures that may be loose or inconvenient for the operator. To operate a stop or coast control, the operator may, for example, grasp the pendant and pull the remote control device 70 downward in the direction. The downward force causes the transmitter to transmit a stop or coast command, depending upon the particular programming. The wearable remote control device 70 is donned by slipping the lanyard around the neck of the operator.

According to another aspect of the present invention, the remote control device 70 may be donned by clipping the remote control device 70 to a shirt, belt, pants, vest, uniform or other piece of clothing using a suitable clip. This exemplary configuration provides another unibody arrangement wherein the transmitter and control area are combined into a common housing. Moreover, the clip allows the operator to clip the remote control device 70 to any convenient piece of clothing or other suitable location on or about the operator. The clip may also be coupled to a lanyard so as to be worn around the neck of the operator. A generally round configuration and smooth shape of the remote control device 70 may allow a relatively low profile design that wears "well" as the remote can be donned in a manner that places the remote control device 70 close to the body of the operator.

According to yet another exemplary aspect of the present invention, the remote control device 70 may implemented as a voice controlled transmitter. The remote control device 70 may mount, for example, to a torso strap, sash or other suitable device. The remote control device 70 further comprises a microphone. The microphone may be rotated or otherwise adjusted to provide flexible positioning of the microphone input for the operator. Although voice activation is provided, a redundant stop or coast button may also be provided. This arrangement provides flexible placement of the remote control device 70 on the operator. Moreover, the remote may be operated in a hands free manner. The voice commands are preferably a simple command set.

When used with the voice control system of the remote control device 70, operator voice commands such as TRAVEL, FORWARD, COAST, STOP, etc., may be used to cause the truck 10 to move a preset distance and still maintain the heading set by the steer controller 112 (shown in FIG. 2), e.g., parallel to the storage locations 122 in the aisle 120. The command words TRAVEL, FORWARD, COAST, STOP, etc., may be used to communicate with the traction motor controller 106 while the steer controller 112 automatically corrects itself to maintain a straight orientation or other desired heading. The remote control device 70 may further allow the operator to make minor adjustments to the heading of the truck 10, e.g., by allowing voice commands such as LEFT or RIGHT to adjust the heading of the truck 10. Herein, translation of the voice commands into control commands for the truck 10 may be carried out either in the processor of the remote control device 70 or in the controller 103 of the truck 10.

Yet another alternative configuration for the remote comprises a variation on the finger-thumb activated button 258. Instead of a single button, two buttons are provided. The first and second buttons each comprise a first switch component and further share a common second switch component. In particular, the garment includes a first band or finger, e.g., for receiving the index finger of the truck operator, and which supports the first switch component of the first button and the first switch component of the second button, e.g., as recesses. When the garment is donned, the first switch components are oriented towards the side of an operator's index finger. A first button contact is provided generally along the base of the recess of the first switch component. Similarly, a second button contact is provided generally along the base of the recess of the second switch component.

Correspondingly, the garment includes a band that supports the common second switch component about the thumb of the operator. The second switch component includes a common contact generally at the tip of a protrusion that corresponds generally to the recesses of the first switch components of the first and second buttons. To actuate the first button, the common contact on the thumb of the operator is brought into intimate electrical connection with the first button contact, e.g., by directing the protrusion of the second switch component into the recess of the first switch component. When electrical contact is made between the first button contact and common contact member, actuation of the corresponding control is achieved. Similarly, to actuate the second button the common contact on the thumb of the operator is brought into intimate electrical connection with the second button contact, e.g., by directing the protrusion of the second switch component into the recess of the first switch component. When electrical contact is made between the second button contact and common contact member, actuation of the corresponding control is achieved.

Any of the disclosed configurations for the remote control device 70 may be equipped with steering compensation controls. For example, the remote control device 70 may include additional controls within the control area, such as a left steer button and a right steer button in addition to the travel button and optional stop or coast button. The amount of remotely controllable steer correction will likely depend upon a number of factors such as environment of use, typical anticipated correction, etc. However, in one exemplary arrangement, small steer angle corrections, e.g., on the order of 1 degree or less may be implemented for each actuation of the left and right steer controls.

Further, the remote control system may be integrated with a steer angle control of the truck 10. The steer angle control is typically implemented using a potentiometer, encoder or other suitable input device, and may be positioned at any convenient location on the truck 10. When used in combination with additional steering controls, the steer angle control sets a desired heading of the truck 10. As an example, an operator may line up the truck 10 in an aisle parallel to a row of racks in a warehouse operation. Using angle sensing feedback from the steer controller 112 (shown in FIG. 2), the heading of the truck 10 may be maintained parallel to the racks as the truck 10 moves down the aisle. The steer angle control thus prevents drift of the truck 10 and maintains its course. Under this arrangement, a travel request from the remote control device 70 causes the truck 10 to travel substantially straight along a heading defined by the steer controller.

A system that implements the jog control functionality set out herein may implement additional advanced features to satisfy specific performance requirements. For example, the transmitters may be equipped with a "global stop" command that shuts down all trucks 10 within range of the transmitter that are operating under remote control. Thus, all receivers may be programmed or otherwise configured to recognize a stop command, e.g., using a global or common command sequence. Moreover, the global stop command may be transmitted by appending an operator ID so that the identity of the operator who issues the global stop command can be identified.

In each of the illustrated exemplary systems, an antenna for the transmitter could be located in a transmitter box, woven into the garment, e.g., by integrating the antenna into Velcro, straps, bands, or other components associated with the transmitter, that is donned by the operator, located in wiring between the transmitter box and controls, etc.

Still further, the transmitter may be directional. For example, a target may be provided on the truck 10, e.g., as part of the receiver 102 or antenna 66. Thus, the operator must point the transmitter of the remote control 70 at or towards the target in order to cause the operation of the control, e.g., a jog command, to be received by the truck 10. Alternatively, certain commands may be non-directional, whereas other controls are directional. For example, the global stop (where provided) may not require detection by a target in order to be effectuated. On the other hand, a control to initiate a jog operation may be required to be detected by a suitable target. Targeted detection may be accomplished, for example, using infrared or other suitable technologies.

The numerous exemplary configurations of the remote control described herein are presented by way of illustration and not by way of limitation of the manner in which a remote control may be configured. The various described features may be commingled into any desired configuration. Moreover, additional features may be provided in addition to, or in lieu of the features set out herein. Still further, the truck, remote control system and/or components thereof, including the remote control device 70, may comprise any additional and/or alternative features or implementations, examples of which are disclosed in U.S. Provisional Patent Application Ser. No. 60/825,688, filed Sep. 14, 2006 entitled "SYSTEMS AND METHODS OF REMOTELY CONTROLLING A MATERIALS HANDLING VEHICLE;" U.S. patent application Ser. No. 11/855,310, filed Sep. 14, 2007 entitled "SYSTEMS AND METHODS OF REMOTELY CONTROLLING A MATERIALS HANDLING VEHICLE;" U.S. Provisional Patent Application Ser. No. 61/222,632, filed Jul. 2, 2009, entitled "APPARATUS FOR REMOTELY CONTROLLING A MATERIALS HANDLING VEHICLE;" U.S. patent application Ser. No. 12/631,007, filed Dec. 4, 2009, entitled "MULTIPLE ZONE SENSING FOR MATERIALS HANDLING VEHICLES;" U.S. Provisional Patent Application Ser. No. 61/119,952, filed Dec. 4, 2008, entitled "MULTIPLE ZONE SENSING FOR REMOTELY CONTROLLED MATERIALS HANDLING VEHICLES;" U.S. Provisional Patent Application Ser. No. 61/234,866, filed Aug. 18, 2009, entitled "STEER CORRECTION FOR A REMOTELY OPERATED MATERIALS HANDLING VEHICLE;" U.S. patent application Ser. No. 12/649,738, filed Dec. 30, 2009, entitled "APPARATUS FOR REMOTELY CONTROLLING A MATERIALS HANDLING VEHICLE;" U.S. patent application Ser. No. 12/649,815, filed Dec. 30, 2009, entitled "STEER CORRECTION FOR A REMOTELY OPERATED MATERIALS HANDLING VEHICLE;" U.S. patent application Ser. No. 13/011,366, filed Jan. 21, 2011, entitled "SYSTEMS AND METHODS OF REMOTELY CONTROLLING A MATERIALS HANDLING VEHICLE;" U.S. patent application Ser. No. 13/033,169, filed Feb. 23, 2011, entitled "OBJECT TRACKING AND STEER MANEUVERS FOR MATERIALS HANDLING VEHICLES;" U.S. patent application Ser. No. 13/272,337, filed Oct. 13, 2011, entitled "STEER CONTROL MANEUVERS FOR MATERIALS HANDLING VEHICLES;" International Patent Application Serial No. PCT/US2009/066789, filed Dec. 4, 2009, entitled "MULTIPLE ZONE SENSING FOR MATERIALS HANDLING VEHICLES;" International Patent Application Serial No. PCT/US2009/069839, filed Dec. 30, 2009, entitled "APPARATUS FOR REMOTELY CONTROLLING A MATERIALS HANDLING VEHICLE;" International Patent Application Serial No. PCT/US2009/069833, filed Dec. 30, 2009, entitled "STEER CORRECTION FOR A REMOTELY OPERATED MATERIALS HANDLING VEHICLE;" International Patent Application Serial No. PCT/US2007/078455, filed Sep. 14, 2007, entitled "SYSTEMS AND METHODS OF REMOTELY CONTROLLING A MATERIALS HANDLING VEHICLE;" International Application No. PCT/US2012/022011, filed Jan. 20, 2012, entitled "SYSTEMS AND METHODS OF REMOTELY CONTROLLING A MATERIALS HANDLING VEHICLE" and/or U.S. Pat. No. 7,017,689, issued Mar. 28, 2006, entitled "ELECTRICAL STEERING ASSIST FOR MATERIAL HANDLING VEHICLE;" the entire disclosures of which are each incorporated by reference herein.

Figure 9:
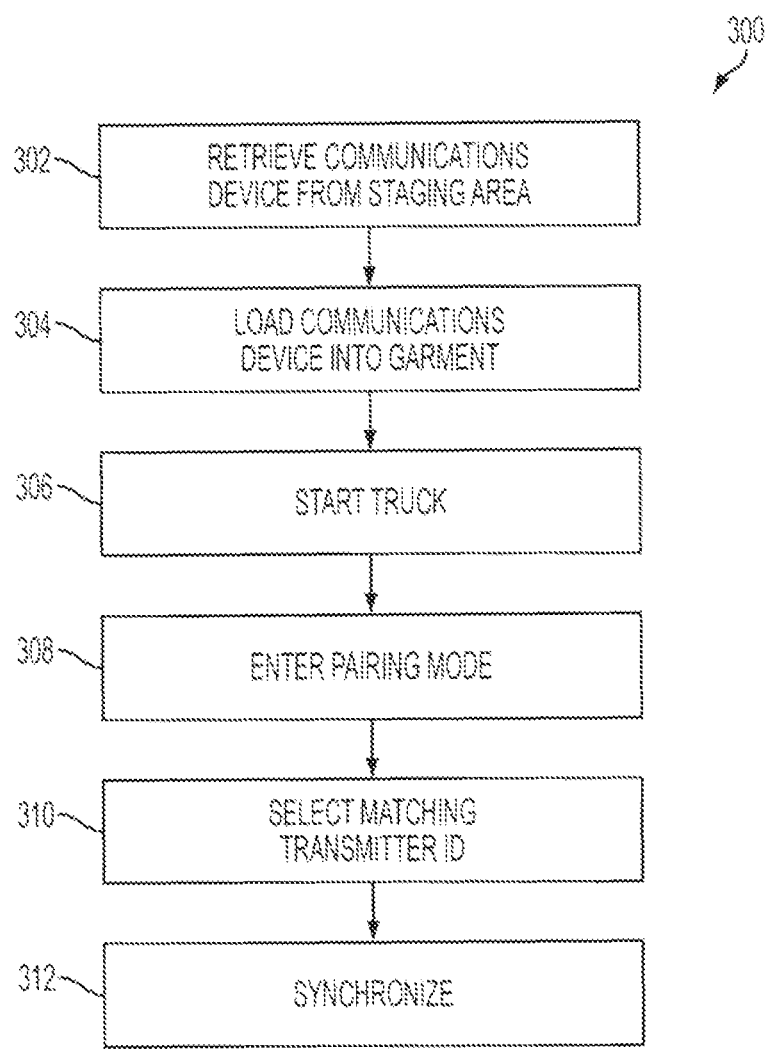
FIG. 9 is a flow chart illustrating a method of pairing a wireless remote transmitter to a receiver on a truck according to various aspects of the present invention.

Referring to FIG. 9, a method 300 of synchronizing a remote control to a truck is illustrated. The truck operator retrieves a communications device from a staging area at 302. The staging area may comprise a common storage location for unused communications devices, a battery recharging station, etc. The truck operator then connects, loads or otherwise associates the retrieved communications device with their corresponding remote control device garment at 304, e.g., by snapping the communications device into the docking area of their glove as set out in greater detail herein. If the operator has not already done so, the garment is also donned by the operator.

The truck operator then initiates a power on sequence to enable the truck for operation, i.e., the operator starts the truck at 306. In starting the truck, the operator may be required to provide a logon identification code to the truck. This identification may be provided for example, by entering a personal identification number (PIN) number into a control panel of the truck, by utilizing a key fob to provide the logon ID to the truck, or the operator's PIN may be encoded into a memory device, such as an RFID chip that is integrated into the remote control device garment worn by the operator. Under this arrangement, the communications device attached to the garment can sense the PIN number via the contacts and pads and transmit the operator's PIN number to the truck or a device on the truck, e.g., an RFID reader on the truck may sense the operator ID code, such as by bringing the garment into proximity of the truck.

The operator then enters a pairing mode with the truck at 308. It is likely that there may be several trucks and/or transmitters in the same vicinity using wireless remote control according to various aspects of the present invention. As such, a display on the truck may list or otherwise indicate the identification codes of all of the transmitters that it senses. The operator reviews the listed transmitter identification codes and selects the one that corresponds to the communications device docked in that operator's remote control device garment at 310. For example, the communications device may include a sticker, label tag or other indication that provides the transmitter identification code, e.g., by providing the transmitter identification code on the face of the communications device.

The system then synchronizes the transmitter of the remote control device worn by the operator to the receiver on the corresponding truck at 312. For example, the controller 103 on the truck may prompt the user to press a known key sequence on the remote control device 70, e.g., by concomitantly pressing the horn and emergency disengage buttons. Such an operation allows the system to perform any desired validation, e.g., to determine that the buttons coupled to the remote control device are in working order. Once synchronized, the system may provide a visual indication as such, e.g., by displaying a message on the truck that indicates that the synchronization is complete.

Depending upon the information required for a particular application of the various aspects of the present invention, three distinct operational identifications can be associated, including the unique operator identification, the unique identification of the communications device and a unique identification of the truck. This information may be useful, for example, to validate commands received by the receiver on the truck, to log data for subsequent analysis, to log productivity, truck performance, etc.

Figure 10:
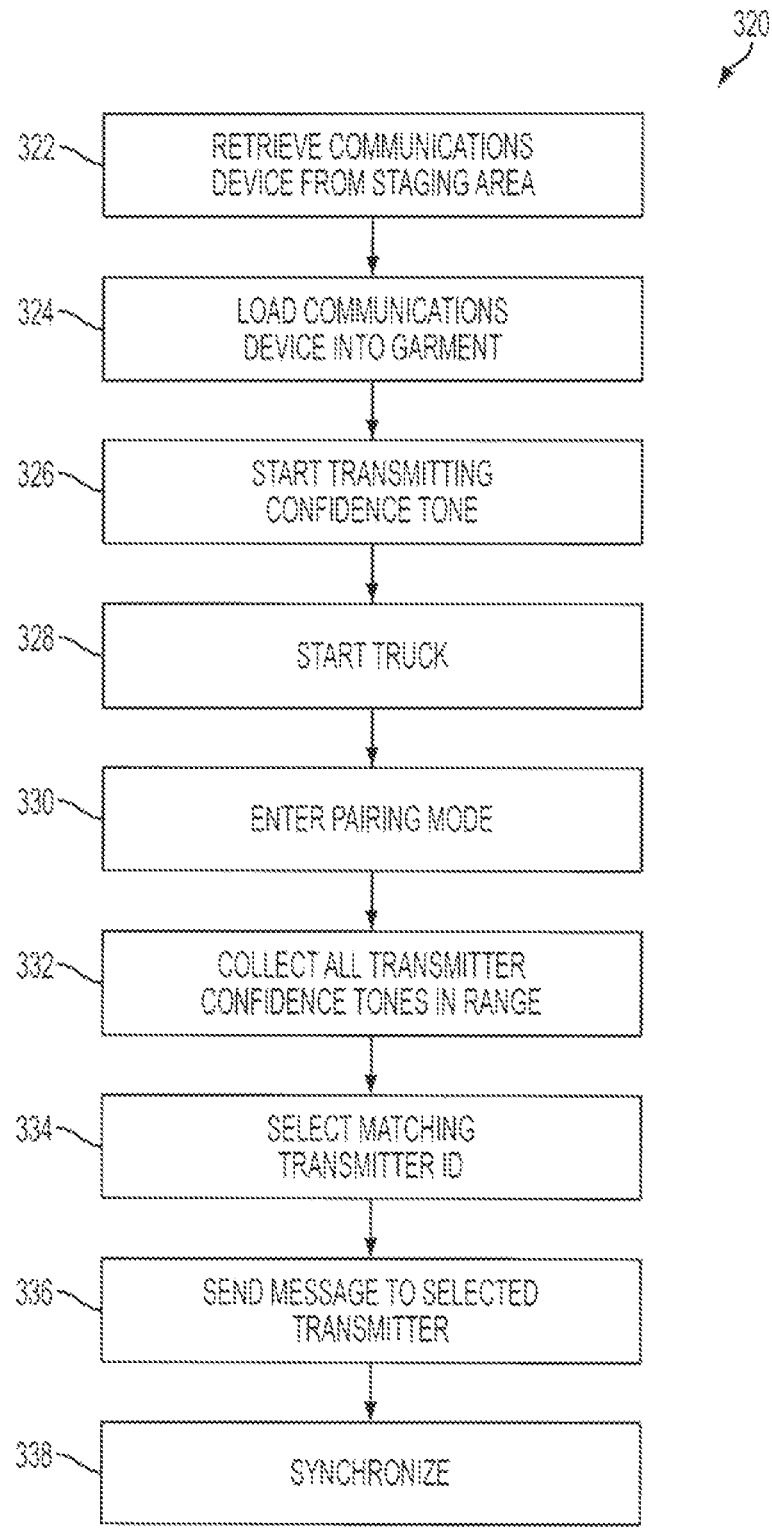
FIG. 10 is a flow chart illustrating an exemplary method of pairing a wireless remote transmitter to a receiver on a truck according to various aspects of the present invention.

Referring to FIG. 10, a method 320 is illustrated for a truck operator starting a shift using the remote control according to various aspects of the present invention. The truck operator obtains a communications device from a suitable storage area at 322. As with the previous example, the communications devices may be stored at a battery charging station, etc. The truck operator loads the communications device into the garment at 324. The communications device is then caused to begin transmitting a pairing mode confidence tone at 326. For example, the confidence tone may comprise repeatedly transmitting a message that includes the transmitter identification. In this regard, the transmitter identification code that is being transmitted may match a transmitter identification code that is written on the communications device or which is otherwise known to the truck operator.

The truck operator starts the truck at 328, which may comprise logging into the truck as set out in greater detail above. The truck operator may then enter a pairing mode at 330 to synchronize the truck's receiver to the particular transmitter retrieved by the truck operator. During the pairing operation, the receiver on the truck collects all confidence tones in its range at 332 and lists the tones, e.g., by transmitter identification code on a suitable display. In one illustrative example, the display may prioritize the located transmitter identification codes by signal strength or by any other suitable measure. The truck operator selects the transmitter identification code that matches the transmitter code associated with the communications device that was retrieved and loaded into their remote control device garment at 334. The transmitter identification code selected by the operator is stored in the truck, e.g., in a memory of the controller on the truck.

The controller on the truck may send a message to the communications device docked in the truck operator's remote control device garment at 336 that includes a unique truck receiver identification code and/or other information, which can be stored in the memory of the communications device donned by the operator. The transmitter and receiver then synchronize at 338, e.g., as described above. For example, the truck operator may be prompted to press a particular sequence of controls on the remote control device. In response to detecting the actuation of the requested control(s) and/or control sequence, the communications device can send a message to the receiver on the truck that identifies the transmitter identification code, the receiver identification code and a code corresponding to the requested control(s) and/or control sequence that has been actuated to effect the synchronization of the receiver on the truck to the remote control device donned by the operator.

In this regard, the controller in the truck may associate the transmitter identification code with the operator identification code that was provided to the truck controller by the operator as a part of the log on operation required to start the truck. The controller may also associate the identification code associated with the truck/receiver. In this way, the truck/receiver identification code, the remote control identification code and the operator identification code are uniquely associated. The controller in the truck can use this three way association to discriminate received commands. Moreover, the remote control device also stores information about the truck that it is synchronized to and/or other optional information, e.g., an operator identification code, etc., which may be used in formatting and transmitting information.

Figure 11:
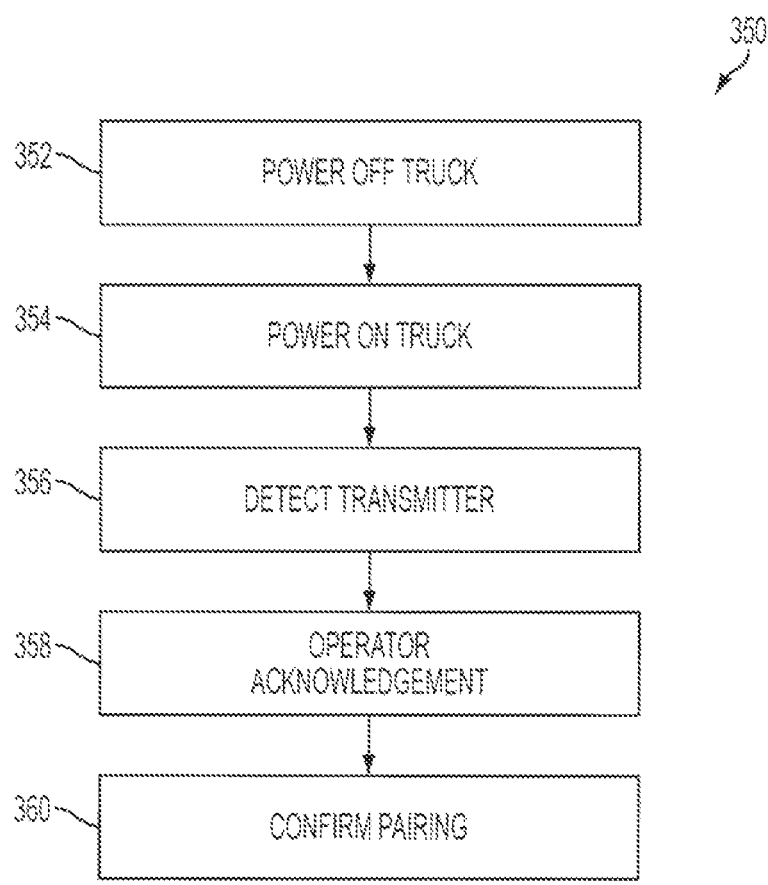
FIG. 11 is a flow chart illustrating an exemplary method of temporarily powering down a truck having a receiver that was previously paired with a wireless remote transmitter according to various aspects of the present invention.

Referring to FIG. 11, after performing work operations, the truck operator may need to temporarily leave the truck, e.g., to take a break. A method 350 is illustrated for shutting down, restarting and re-synchronizing the truck receiver and the transmitter of the communications device donned by the truck operator. The truck operator powers down the truck at 352, so as to take a lunch break, etc. After a predetermined time, the truck operator powers the truck back up at 354. During this time of the break, the transmitter in the remote control device donned by the operator may continue to transmit its synchronized confidence tone, which identifies the transmitter identification code and the corresponding truck/receiver identification code. The synchronized confidence tone transmitted by the transmitter in the communications device worn by the truck operator is detected at 356, as the association of the transmitter identification code to the receiver/truck identification code was preserved in memory on the truck.

The truck controller may further require that the truck operator acknowledge the system at 358, e.g., by entering their PIN code or by providing some other authentication measure to verify that the current operator is the same operator who was using the truck before the break. The pairing is confirmed and displayed at 360 if the operator identification code entered as part of the acknowledgement operation authenticates to the operator identification code that was preserved in the memory of the truck as the operator who was using the truck before the break.

For example, the controller in the truck may maintain the above-described three way association of identification codes, i.e., the truck/receiver identification code, the remote control identification code and the operator identification code even when the truck is powered down. As such, if another operator comes along, that operator cannot use the remote wireless control with the truck, even if that new operator obtains possession of the previous operator's transmitter because the new operator does not have the previous operator's identification code. Similarly, if a new operator starts the truck and enters a new operator identification code as part of the truck startup process, then the wireless remote travel requests issued by the new operator will not be acknowledged by the controller on the truck because the three way identification is not preserved, that is, the new operator's transmitter will not be synchronized to the receiver on the truck.

Rather, for a new user to successfully use wireless remote control features of the truck, that new operator must log into the truck using their operator identification code and utilize a new pairing mode synchronization process to synchronize the new operator's transmitter to the receiver of the truck, such as using the methods described herein.

Figure 12:
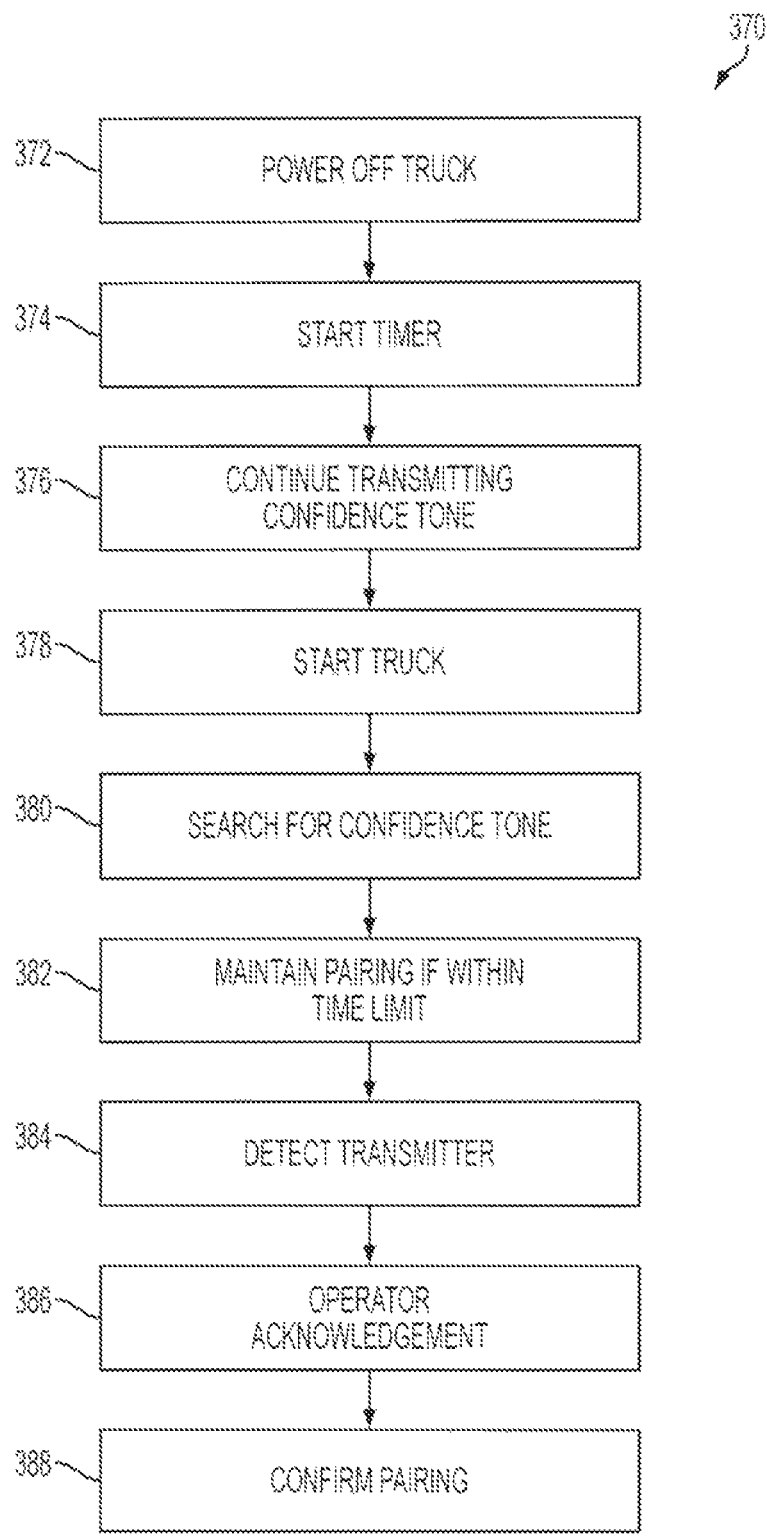
FIG. 12 is a flow chart illustrating an exemplary method of terminating a pairing between a receiver and a wireless remote transmitter according to various aspects of the present invention.

Referring to FIG. 12, a more detailed method 370 is illustrated for temporarily powering down the truck, restarting the truck and re-synchronizing the transmitter donned by the truck operator with the receiver in the truck. The truck operator powers off the truck at 372, e.g., to take a break, etc. When the truck is powered down, a timer associated with the controller on the truck is started at 374. During the interval where the truck is powered down, the transmitter on the communications device donned by the truck operator continues to transmit its synchronized confidence tone at 376. For example, since the transmitter has been previously synchronized with the truck receiver, the confidence tone may comprise a message that includes both the transmitter identification code as well as the truck/receiver identification code. The truck is powered back on at 378. Once powered back on, the receiver on the truck begins to search for the corresponding confidence tone at 380 that matches the transmitter identification code it has previously stored in memory.

If the synchronized confidence tone is detected within a prescribed time limit at 282, then the pairing is maintained. If the confidence tone is detected outside the prescribed time limit, the truck operator may be required to resynchronize, e.g., using a startup procedure as set out in the examples described with reference to FIGS. 9 and 10. If pairing is maintained, then the transmitter identification code may be detected at 384, e.g., by receiving a predetermined message from the transmitter of the remote control device, such as a resynchronization acknowledgement. The truck operator may also be required to acknowledge the truck system at 386, e.g., by providing an operator identification code at the truck, and the pairing confirmation is completed at 388, e.g., by displaying a confirmation to the truck operator.

Under this arrangement, if another user attempts to take the truck 10, that new user will have to clear and resynchronize the truck receiver to the new transmitter identification code of the remote control device donned by the new operator. However, if the new operator attempts to do so, the truck 10 may optionally refuse to respond to remote commands of the new operator, e.g., where the truck is further tied to the operator identification code. As such, a new operator may be required to initiate a complete truck power up sequence as well as a wireless remote control pairing sequence, in which case, the operator identification code of the new operator may be logged by the truck 10.

If the prescribed time period expires, then the pairing information stored in the memory of the truck may be cleared, e.g., by erasing an association between the receiver identification code and the transmitter identification code. Similarly, when the communications device is removed from the corresponding docking area of a garment and is returned to its storage location, e.g., a recharging station, the memory within the communications device corresponding to the pairing information can be erased. For example, when the communications device is removed from the garment and is loaded into a recharger or other docking device, the receiver identification code and/or other information that was previously stored in memory of the communication device based upon information received from the truck controller may be erased from the communications device. Moreover, such information may be downloaded into a corresponding business enterprise. This arrangement may be beneficial, for example, where the communications devices are shared among a community of users.

According to further aspects of the present invention, individual communications devices may be assigned to particular truck operators as an alternative to having a "pool" of available transmitters. For example, assume that the truck operator powers down the truck. In response to powering down, a timer starts running. At this time, pairing information is still stored in memory. After a prescribed time interval, the pairing information is cleared from the memory in the truck. Assume that the truck operator leaves the communications device docked to the garment for an extended amount of time. After a certain period of inactivity, the communications device may enter a sleep mode where another timer starts, e.g., for shut down mode. During this time, the pairing information is stored in memory and the communications device continues to transmit its confirmation tone. During power down mode, the pairing information is retained. However, the communications device ceases from transmitting the confirmation tone. After a third prescribed time delay expires, the receiver identification code is cleared from the memory of the communications device.

Figure 13:
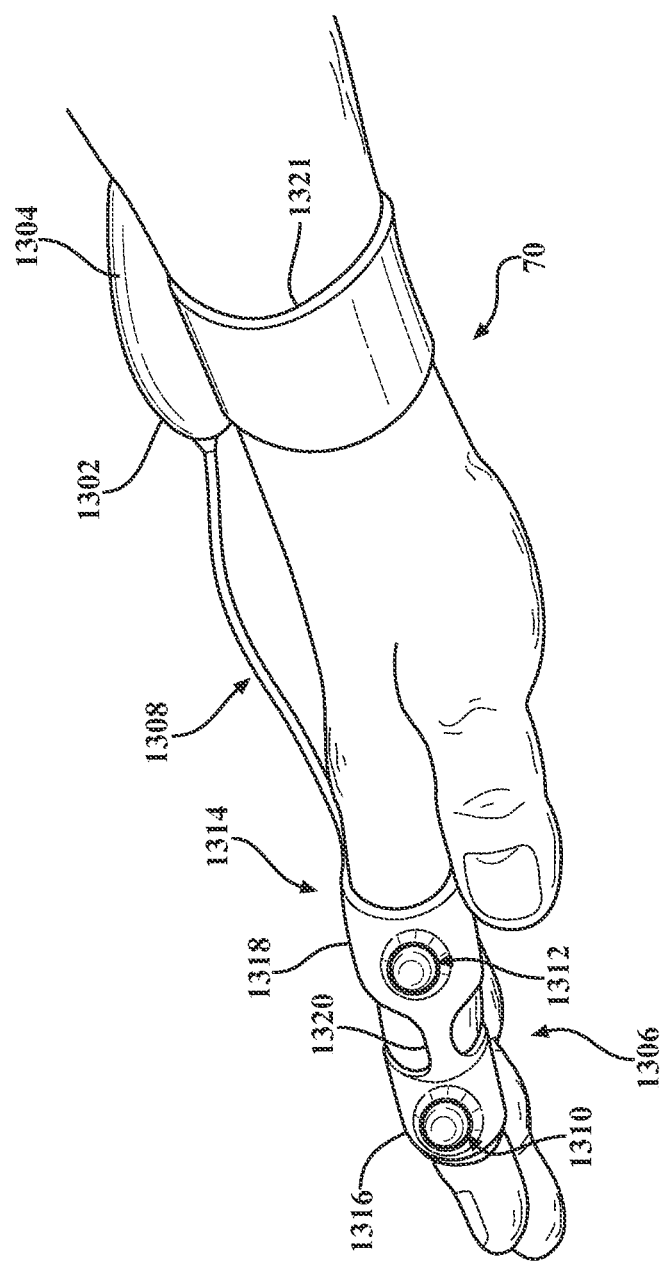
FIG. 13 is a schematic illustration of an exemplary remote to be worn on the wrist/hand of an operator.

Referring to FIG. 13, one exemplary implementation of the remote control device 70 comprises a transmitter 1302, a power pack 1304, a control structure 1306 and a communications link 1308 between the transmitter 1302 and the control structure 1306. The transmitter 1302 may transmit information in an analog or digital form using any suitable wireless transmission means, including standard or proprietary formats. For example, transmission may be realized using existing technologies, such as 802.11, 802.16, Bluetooth, short message service (SMS), amplitude shift keying (ASK), on-off keying (OOK), wireless local area network (WLAN), code division multiple access (CDMA), amplitude modulation (AM), frequency modulation (FM), universal mobile telecommunications system (UMTS), cellular phone technology such as global system for mobile communications (GSM), etc. In practice, the manner in which the transmitter 1302 transmits messages should correspond to a format that is recognizable by the corresponding receiver 102 (FIG. 2) on the truck 10 (FIG. 1). Moreover, the remote control device 70 may also contain its own receiver for bi-directional communication with a corresponding truck 10.

The control structure 1306 contains the controls that instruct the transmitter 1302 to transmit an appropriate command. In the illustrated example of FIG. 13, there are two controls, implemented as switches or buttons. A first button 1310 corresponds to a travel command, which, if actuated, causes the transmitter 1302 to transmit a travel command. If the travel command is properly received by the receiver 102, the truck 10 will be controlled to travel forward. Alternatively, the first button 1310 could comprise a "go" button that instructs the truck 10 to travel for a prescribed time and/or distance, and then enter a controlled brake or coast. The first button 1310 may alternatively provide travel for as long as there is maintained actuation of the first button 1310. The control structure 1306 may also optionally include steer and or directional controls as described in detail herein.

A second button 1312 corresponds to a stop command, which, if actuated, causes the transmitter 1302 to transmit a stop command. If the stop command is properly received by the receiver 102, the truck 10 will be controlled to come to a controlled stop. Alternatively, the second button 1312 may correspond to a coast command, which, if properly received by the receiver 102 on the truck 10, will cause the truck 10 to coast to a rest.

When either of the first or second buttons 1310, 1312 is pressed, the transmitter 1302 formats an appropriate message and transmits the resulting signal to the receiver 102. In this regard, the transmitter 1302 may append to the command, a sequence, control or other identification information, a time stamp, channel indication or other data necessary for the receiver 102 to discriminate that the particular remote control device 70 is a valid communications device, to authenticate operators, to log data for historical or other purposes, etc.

The first and second buttons 1310, 1312 are integrated into a suitable finger garment 1314 that is illustrated as including a first finger segment band 1316, a second finger segment band 1318 and a bridge 1320. The first finger segment band 1316 supports the first button 1310 for implementing travel commands. The signal(s) from the first button 1310 travel along a first signal carrying wire extending through the bridge 1320 through the second finger segment band 1318 to the communication link 1308, which may comprise a second signal carrying wire integral with or coupled to the first signal carrying wire.

While the communications link 1308 is illustrated as a wired connection, any suitable technology may be used to communicably link the transmitter 1302 to the control structure 1306. Further, FIG. 13 illustrates that the transmitter 1302 and power pack 1304 are worn by the operator around the wrist or arm. However, the transmitter 1302 and power pack 1304 may be worn separately or together on any part of the body where it is comfortable, practical or desirable, as the specific application dictates. For example, as shown, the transmitter 1302 and power pack 1304 are attached to the operator's wrist or arm using a flexible and adjustable band 1321. The arm band 1321 may be readily removable from the transmitter 1302 and power pack 1304 so that personal or new arm bands 1321 could be used by each operator.

By separating the transmitter 1302 from the control structure 1306 and coupling both by the communications link 1308, a single transmitter 1302 may be reused with multiple instances of control structures 1306. As such, for example, operators on different shifts can maintain their own control structures 1306, e.g., via finger or hand worn controls, and merely plug them into a corresponding transmitter 1302 at the start of their shift. This further allows Radio frequency Identification (RFID) tags to be incorporated with the first and second buttons 1310, 1312, which information can be subsequently transmitted to the truck 10. As such, the truck 10 can log the operator, productivity and other relevant information during operation.

The remote control device 70 thus defines a wearable control device that is donned by the operator interacting with the truck 10. The exemplary remote control device 70 comprises a flexible band 1321 that is supported on the arm or wrist of the operator, and the finger garment 1314, which is positioned on the index finger of the operator such that the first and second buttons 1310, 1312 are oriented towards the thumb of the operator.

The remote control device 70 according to this embodiment minimizes the number and size of items mounted on the finger/hand of the operator, as the control structure 1306 according to this embodiment is the only structure mounted on the finger/hand of the operator. Hence, interference caused by the remote control device 70 with operator work functions, such as grasping, carrying, and placing items, is reduced. Further, while the remote control device 70 according to this embodiment is especially suitable for high temperature environments, i.e., since operator sweat caused by components mounted to the finger/hand is reduced, the remote control device 70 according to this embodiment is also capable of being mounted over a glove, such that use of the remote control device 70 can also be particularly suitable in low temperature environments. Further still, the remote control device 70 according to this embodiment is designed as a "one-size-fits-all" device, i.e., it can accommodate operators having different sized hands, and can be designed to fit right-handed operators or left-handed operators.

Figure 14:
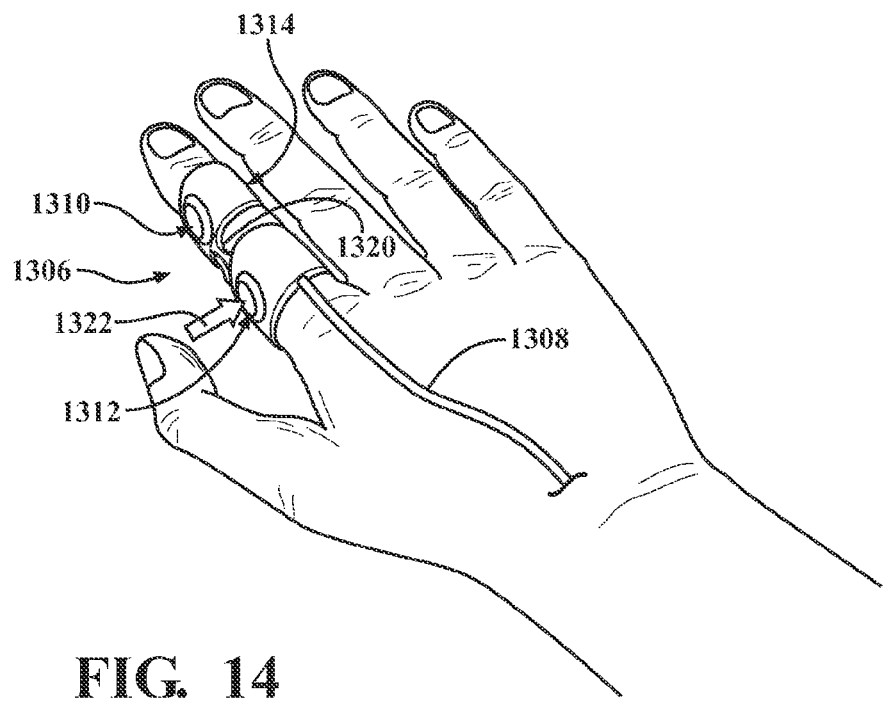
FIG. 14 is a schematic illustration of a portion of the remote of FIG. 13 donned on the hand of an operator where the operator is not engaging operative controls of the remote.
Figure 15:
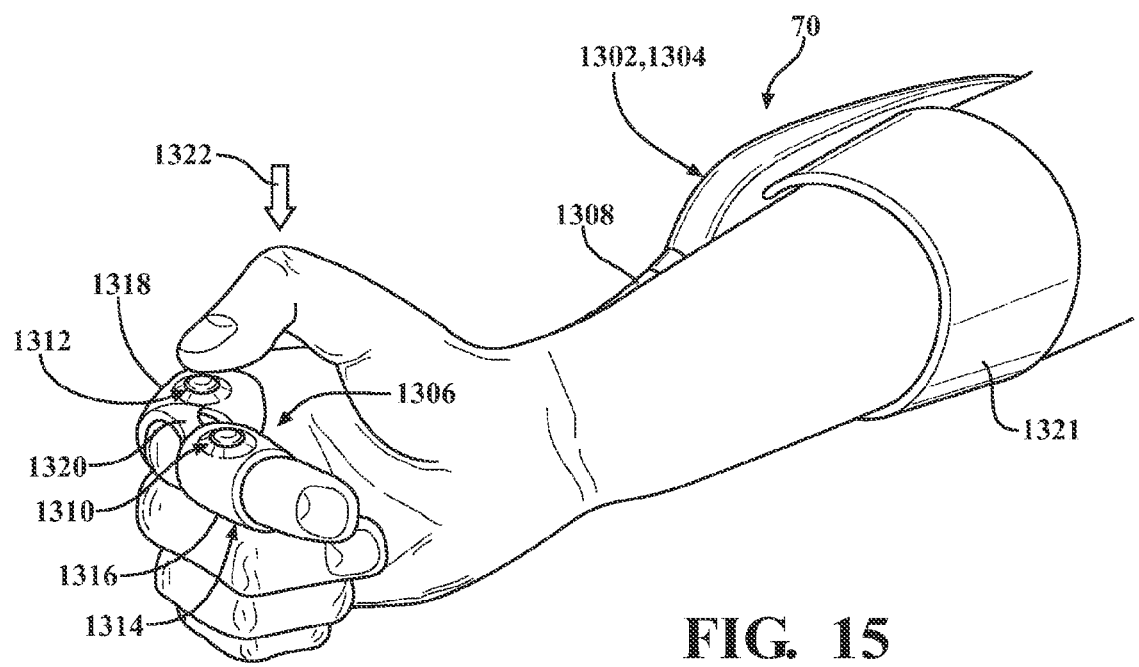
FIG. 15 is a schematic illustration of the remote of FIG. 13 donned on the hand of an operator where the operator is in the process of engaging a control of the remote.

Referring to FIGS. 14 and 15, the first and second buttons 1310 and 1312 of the control structure 1306 of the remote control device 70 may be easily reached and operated with the corresponding thumb of the operator, as schematically represented by the directional arrow 1322. Such action requires a deliberate, yet easily achievable action on the part of the operator to actuate either the first or the second button 1310, 1312. Moreover, operational sequences may be required to actuate the first and/or second buttons 1310, 1312 or for the truck 10 to actuate a particular command, as described herein. For example, a double press in quick succession, i.e., a "double click" may be required to transmit a signal or for the truck 10 to actuate a control.

Figure 15A:
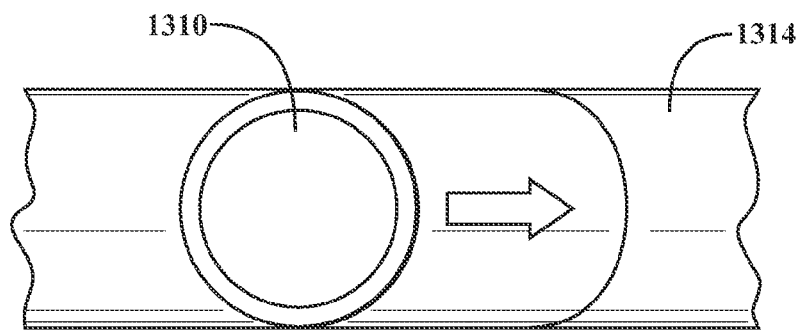
FIG. 15A schematically illustrates an alternate button configuration for a wrist/hand mounted remote.

Referring to FIG. 15A, as an optional configuration, either or both of the first and second buttons 1310 or 1312 could require a multi-dimensional operation before a successful actuation is transmitted. For example, the buttons 1310, 1312 may require that they are depressed, then slid in a lateral direction generally orthogonal to the direction of the button press.

Figure 16:
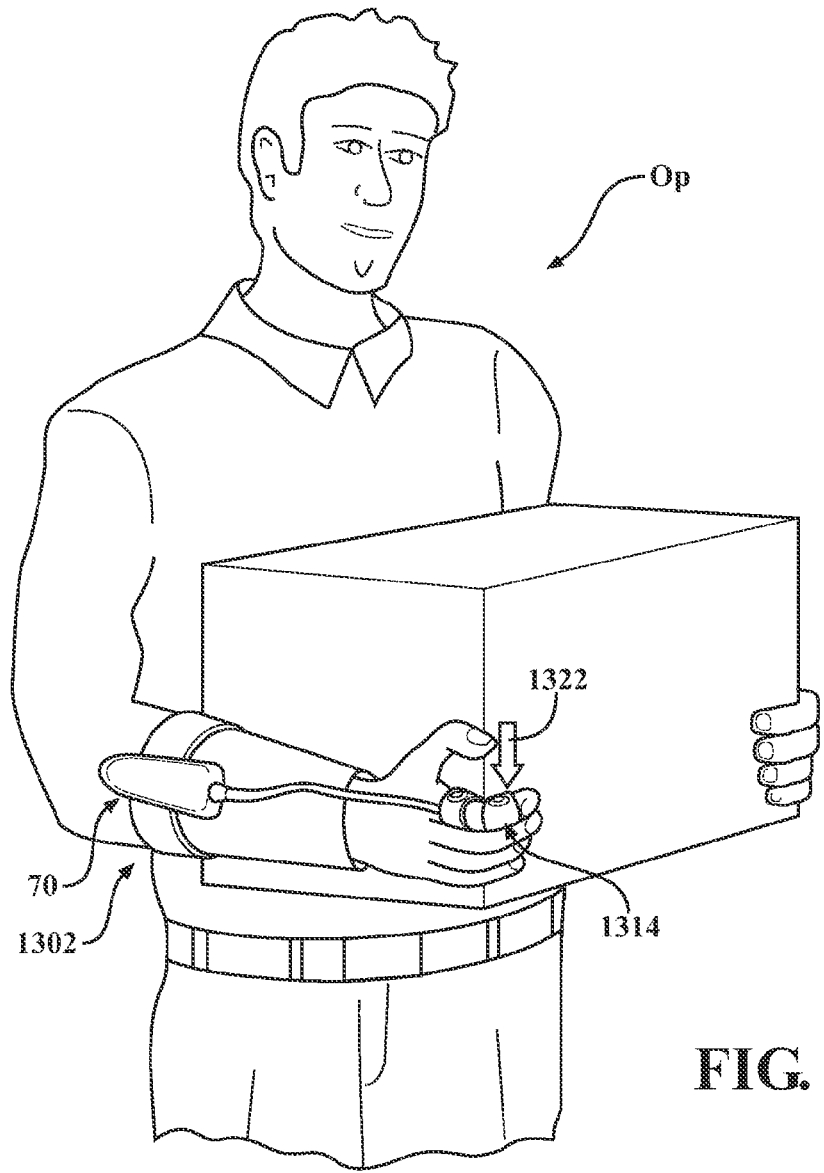
FIG. 16 is a schematic illustration of the remote of FIG. 13 worn by an operator while carrying a package with both hands.

Referring to FIG. 16, the remote control device 70 may be worn in such a way that neither hand is inconvenienced or otherwise interferes with an operator $O_P$ using both hands for picking items. Moreover, there is no inconvenience, such as requiring large limb movements, difficult to reach or otherwise inaccessible controls to move or stop the truck 10, even when the hands of the operator $O_P$ are currently engaged in a pick operation. As such, the operator $O_P$ can move or stop the truck 10, even when carrying pick items with both hands.

Figure 17:
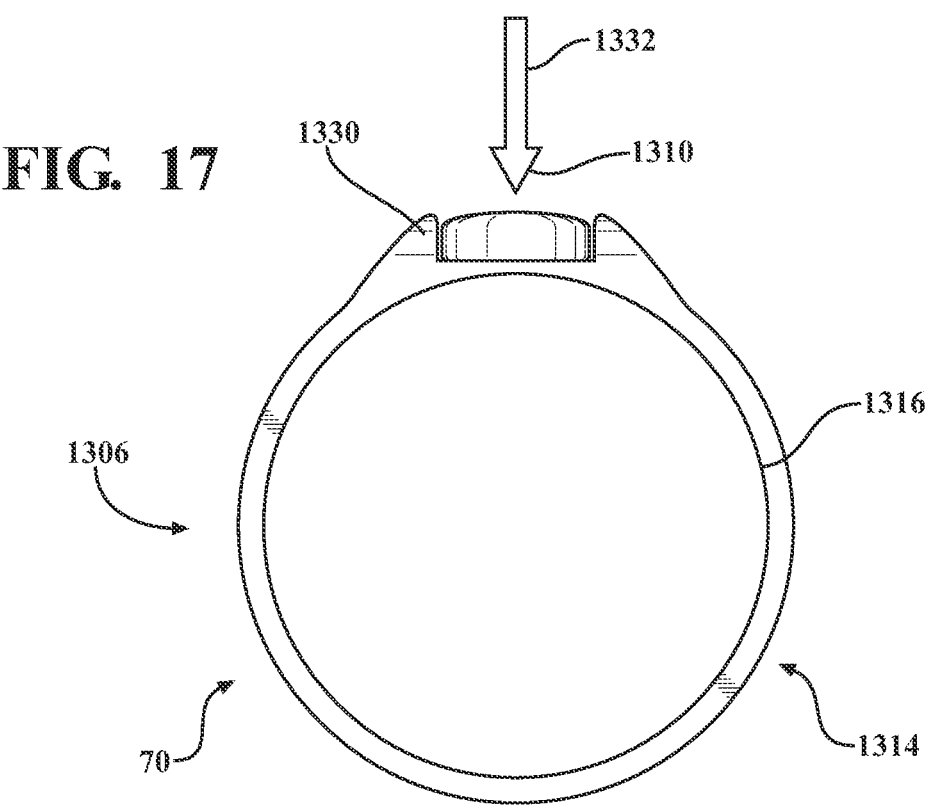
FIG. 17 is a side view of an exemplary control area of another exemplary remote.

Referring to FIG. 17, the control structure 1306 of a remote control device 70 according to a further embodiment of the present invention may include a raised/contoured collar 1330 around each of the first and second buttons 1310, 1312 (only the first button 1310 is illustrated in FIG. 17). To actuate and/or select one of the first or second buttons 1310, 1312, an operator must press down in the direction of arrow 1332.

Figure 18:
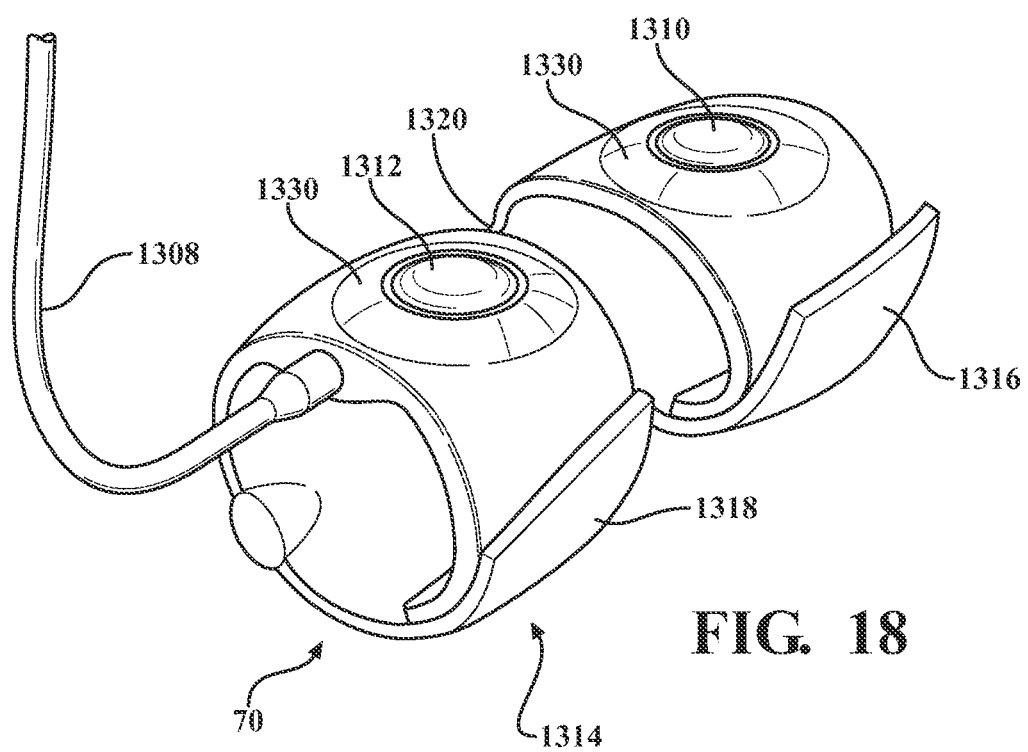
FIG. 18 is a perspective view of the control area of the remote of FIG. 17.

The finger garment 1314 may be constructed from any number of materials such as stretchable fabrics, plastic, synthetics, leather, or other materials alone or in combination. For example, the finger garment 1314 illustrated in FIG. 17 comprises a one-piece flexible band constructed from a material that allows the first finger segment band 1316, second finger segment band 1318 and bridge 1320 (only the finger segment band 1316 is illustrated in FIG. 17) to expand while donning to fit various finger sizes. With reference to FIG. 18, as another alternative embodiment, the first finger segment band 1316 and the second finger segment band 1318 may comprise an adjustable, e.g., latchable or hookable, fabric or material such as hook and loop material sold, for example, under the trademark Velcro®, owned by Velcro Industries B.V. of the Netherlands.

Figure 19A:
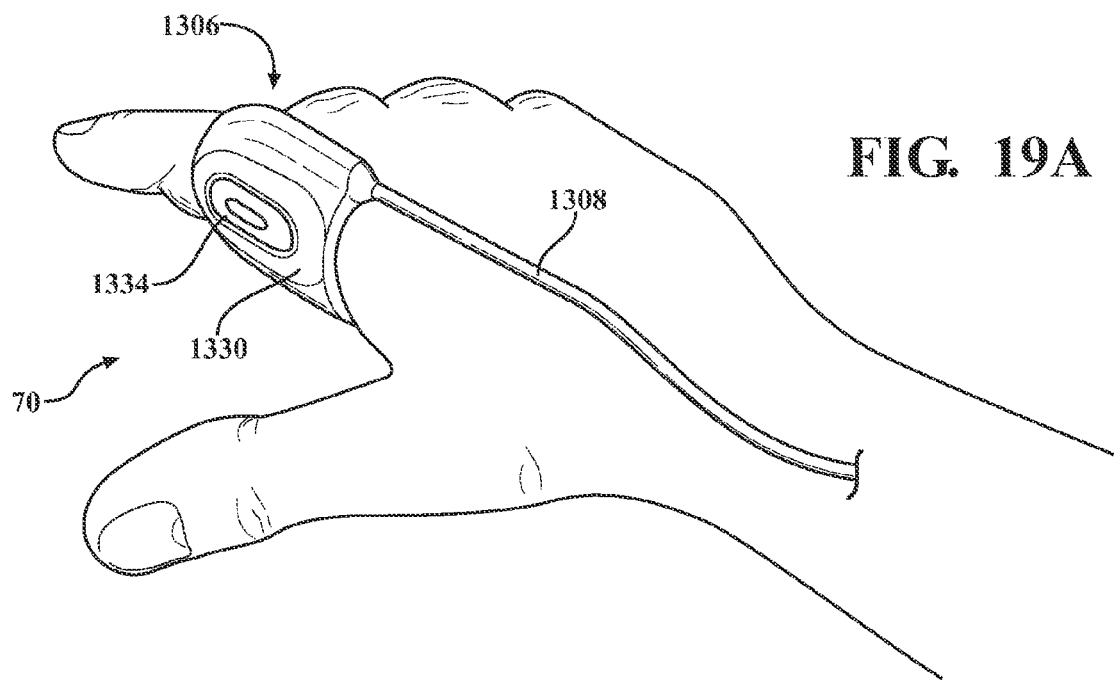
FIG. 19A is a perspective view of a control area of another exemplary remote being worn by an operator.
Figure 19B:
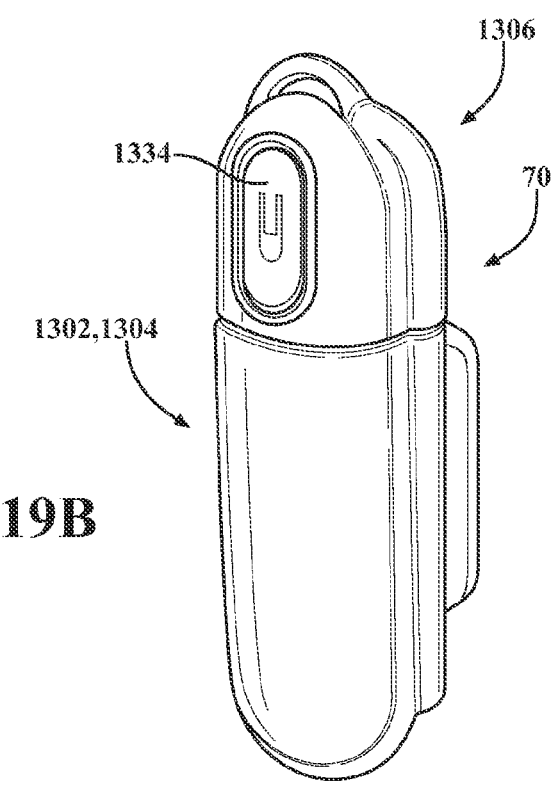
FIG. 19B is a perspective view of a remote including the control area of FIG. 19A illustrating the control area and a transmitter assembled together.
Figure 19C:
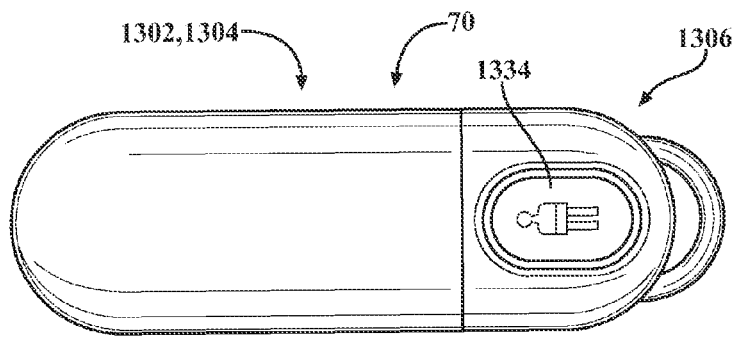
FIG. 19C is a top view of the remote of FIG. 19B.
Figure 19D:
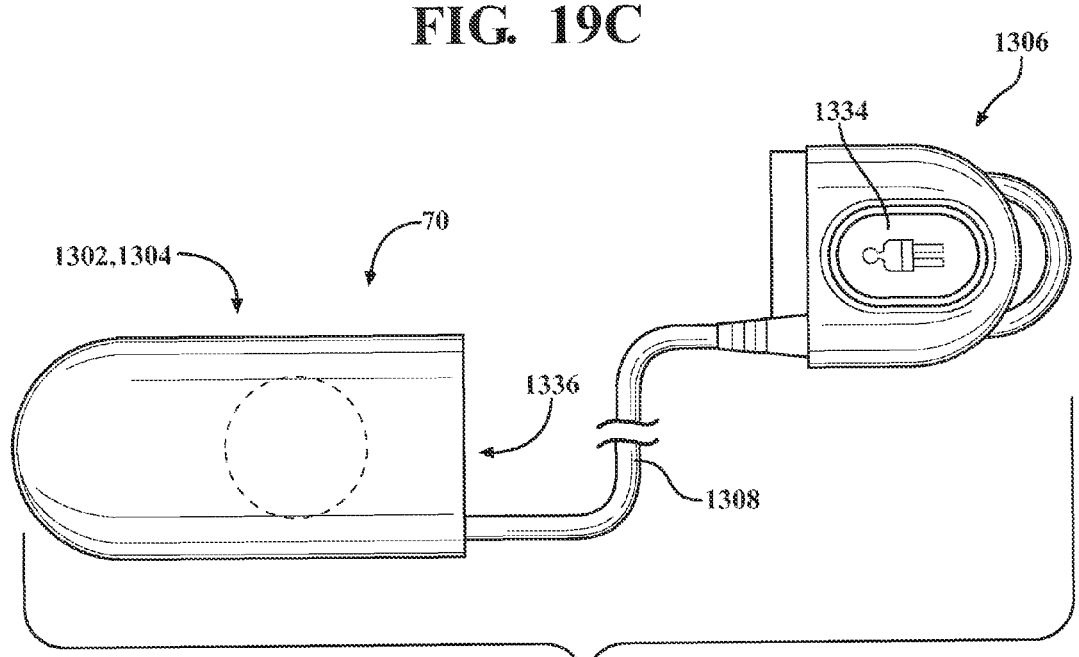
FIG. 19D is a top view illustrating the remote of FIG. 19B with the control area separated from the transmitter by a tethered interconnect.

With reference to FIGS. 19A-19D, yet another exemplary remote arrangement is illustrated. The remote control device 70 includes a single button 1334. The button 1334 may be programmed to support multiple commands. For example, the remote control device 70 may be configured to transmit a "stop" command if a single actuation of the button 1334 is detected. Moreover, a "travel" command may be transmitted if a double click or double actuation of the button 1334 is detected within a predetermined time period. Alternatively, single or multiple instances of the same signal may be transmitted by the remote control device 70 based on the number of "clicks" implemented by the operator, wherein the wherein the controller 103 on the truck 10 decides what command, if any, to actuate based on the number of received signals and/or the current vehicle conditions, as discussed above. The transmitter 1302 and power pack 1304 may be donned as an armband, as a belt or shirt clipped device or by other means. Moreover, the communications link 1308 may be implemented as a relatively thin wire that may optionally be tethered on a retractable take-up reel 1336 as best seen in FIG. 19D.

Figure 20:
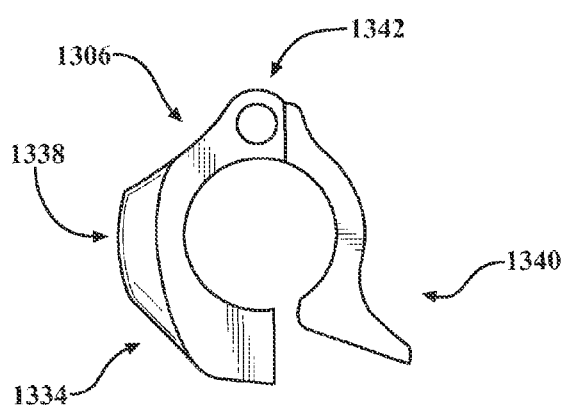
FIG. 20 is a side view of a control area of the remote of FIGS. 19B-19D, illustrating a clamping approach to donning the control area.

With reference to FIG. 20, a control structure 1306 is illustrated comprising two sections 1338, 1340 that are hinged about a hinge point 1342, wherein a spring member (not shown) may be used to provide a closing bias for the two sections 1338, 1340.

Figure 21A:
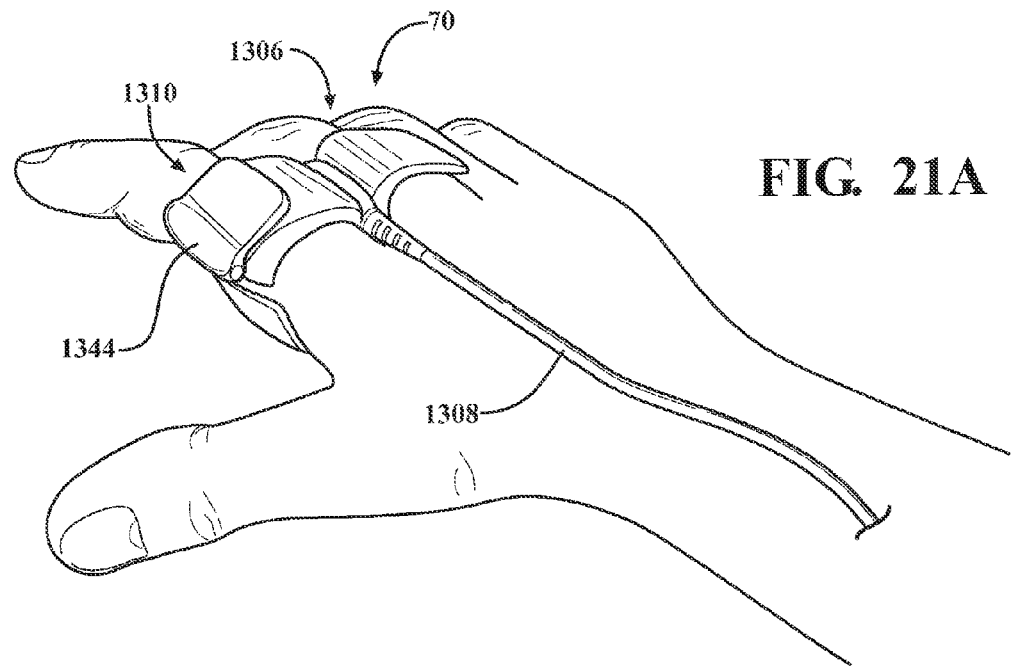
FIG. 21A is a perspective view of a portion of yet another exemplary remote being worn by an operator.
Figure 21B:
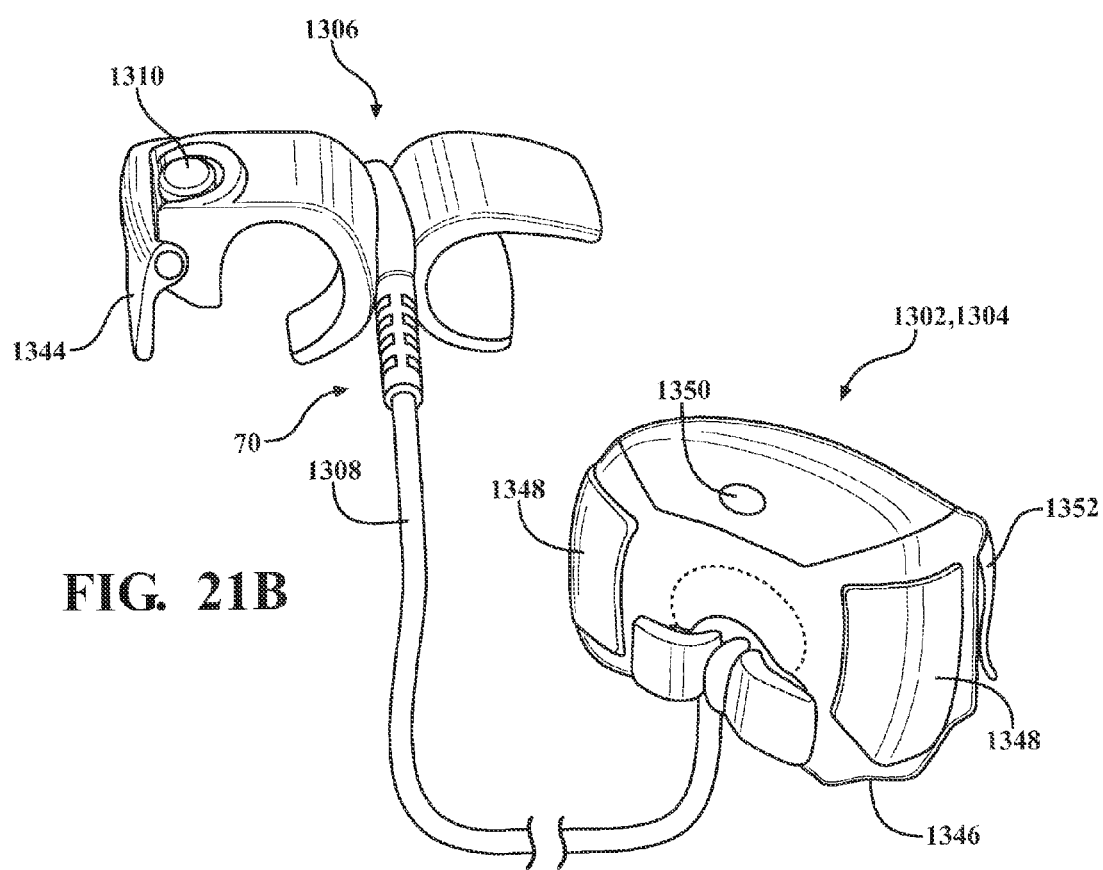
FIG. 21B is a perspective view of a control area of the remote of FIG. 21A coupled to a transmitter of the remote.

Referring to FIGS. 21A-21B, yet another exemplary remote control device 70 is illustrated. As shown the control structure 1306 clips onto two adjacent fingers of the operator. As such, the control structure 1306 is readily adaptable to right or left handed operators with no modifications. For example, the communications link 1308 may be constructed so that it can be "flipped" to the opposite side of the control structure 1306 by rotating 180 degrees, thus making the control structure 1306 suitable for left handed operation. As with previous exemplary remote control devices 70, the controls may be actuated with a single hand gesture, even when carrying picked items such as boxes, etc.

As shown, the travel button 1310 is positioned adjacent a spring-biased, flip down member 1344, which may be manually flipped down to expose the travel button 1310. As can be seen in FIG. 21B, in the illustrated remote control device 70, the casing 1346 for the transmitter 1302 further comprises additional controls. Such buttons can be used to trigger the truck 10 to sound a horn or otherwise provide an audible and/or visual cue, to immediately stop and/or terminate automatic jog operation, or perform other desired functions. Alternatively, such controls may implement redundant travel controls 1348, which may be pressed independently or may be programmed to require concomitant actuation to move the truck 10. Further, an addition button 1350 is illustrated, which may be utilized, for example, as either a stop button or a coast button. As such, the casing 1346 may be worn in an easily accessible location, such as clipped on a belt, shirt or pants using a clip 1352. Also, the communications link 1308 may retract into the transmitter 1302 when the control structure 1306 is not being donned by an operator.

Figure 22A:
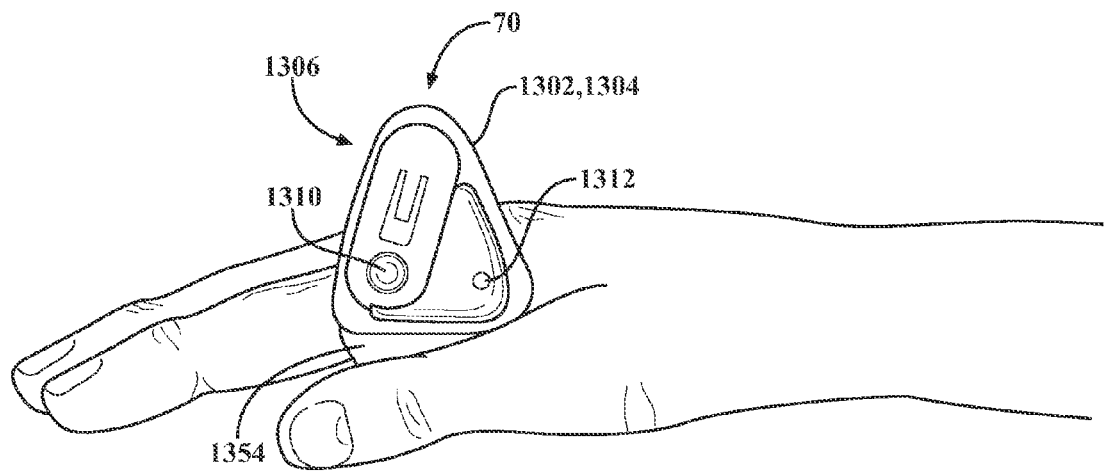
FIG. 22A is a side view of another exemplary remote being worn by an operator.
Figure 22B:
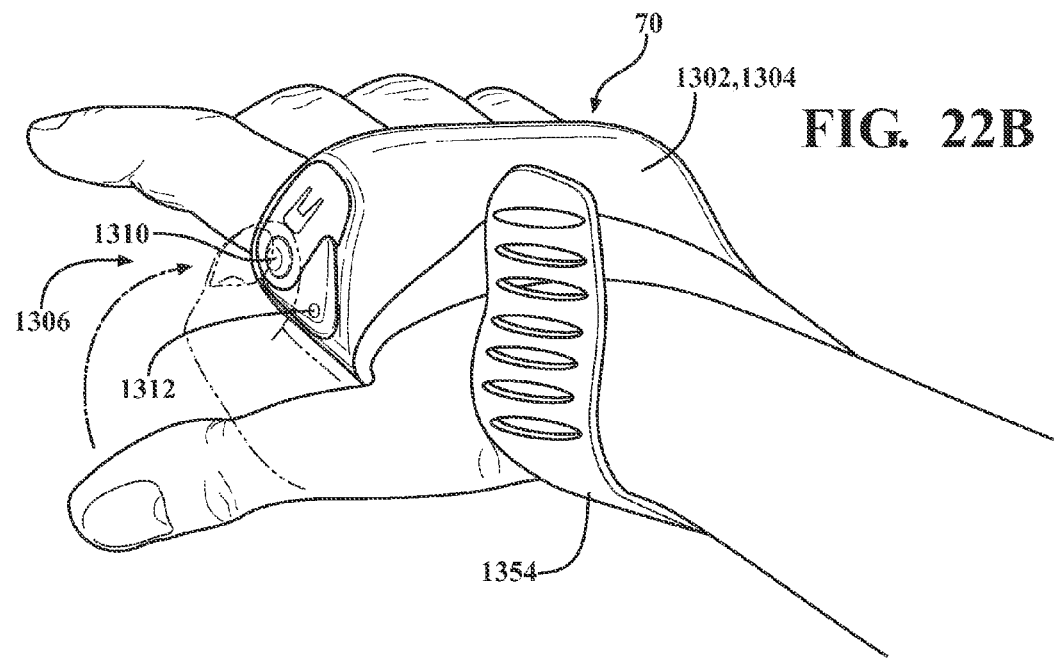
FIG. 22B is a perspective view of the remote of FIG. 22A.

Referring to FIGS. 22A-22B, yet another exemplary remote control device 70 is illustrated. As shown, the transmitter 1302 is integrated with the control structure 1306 thus avoiding the need for the communications link 1308 illustrated in previous examples. As illustrated, an adjustable strap 1354 is used to support the remote control device 70 about the palm/wrist area of an operator.

Figure 23:
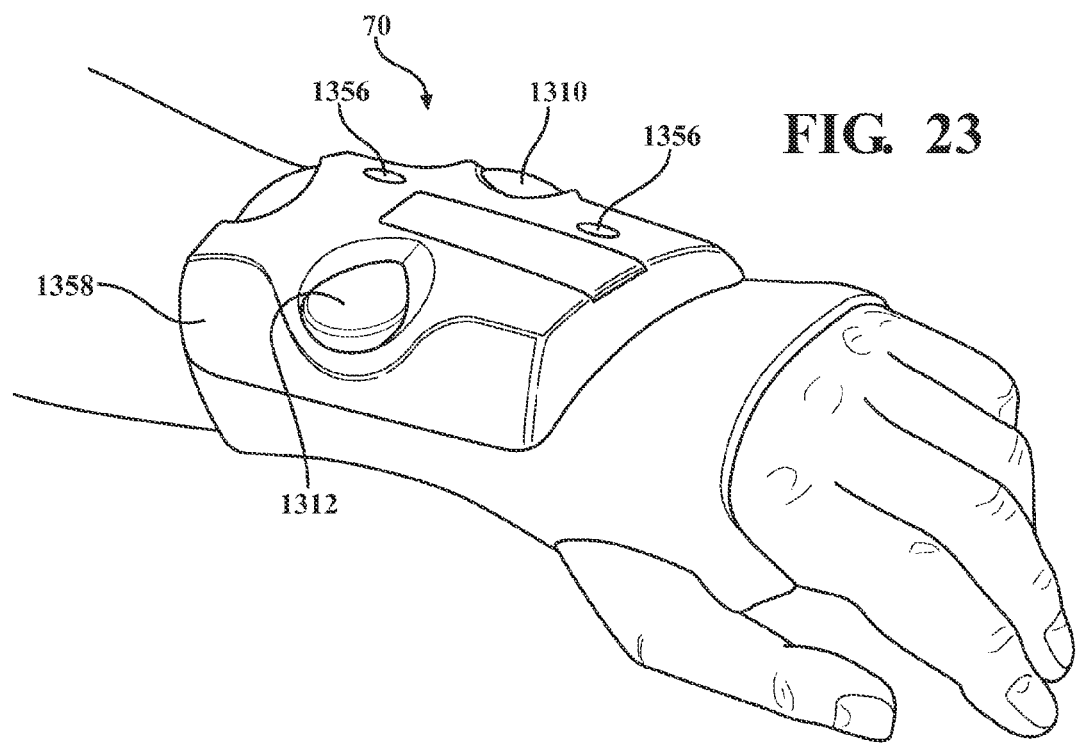
FIG. 23 is yet another exemplary remote, which is worn on a wrist of an operator.
Figure 24:
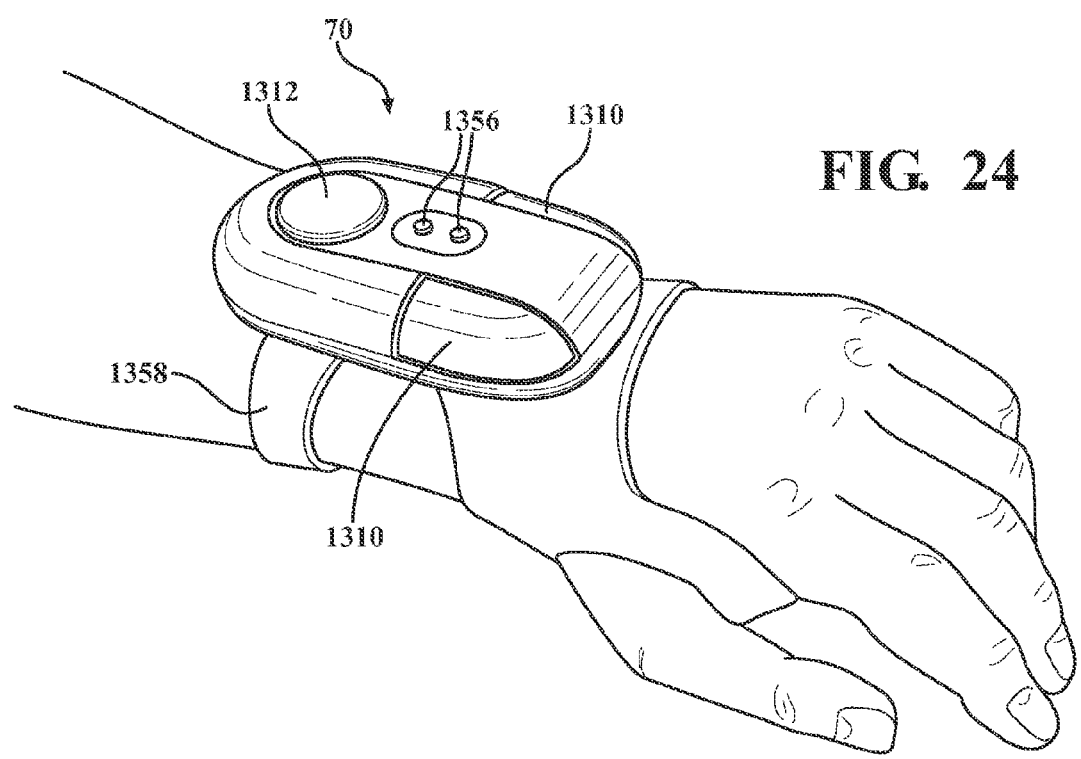
FIG. 24 is a further exemplary remote, which is worn on a wrist of an operator.

Referring to FIGS. 23 and 24, exemplary embodiments are illustrated where the remote control device 70 is worn so as to be supported on the arm of the operator, e.g., just above the wrist. These remote control devices 70 include alert elements 1356 such as light emitting diodes (LEDs), lights, display screens, sound generating devices, or other features that provide visual and/or audible cues as to the status of the remote and/or the associated truck 10, e.g., when the remote control device 70 is in two-way communication with the associated truck 10. These remote control devices 70 are donned by the operator by slipping an appropriate support structure 1358 over the arm, wrist and/or hand. The structure comprising the buttons 1310, 1312 and the alert elements 1356 of the remote control device 70 may subsequently be attached to the support structure 1358, or the structure comprising the buttons 1310, 1312 and the alert elements 1356 of the remote control devices 70 may have been previously attached to the support structure 1358. With the remote control device 70 in the illustrated positions, two handed operation is required to access the travel buttons 1310 and the stop or coast buttons 1312, which may be preferred in some applications.

Figure 25A:
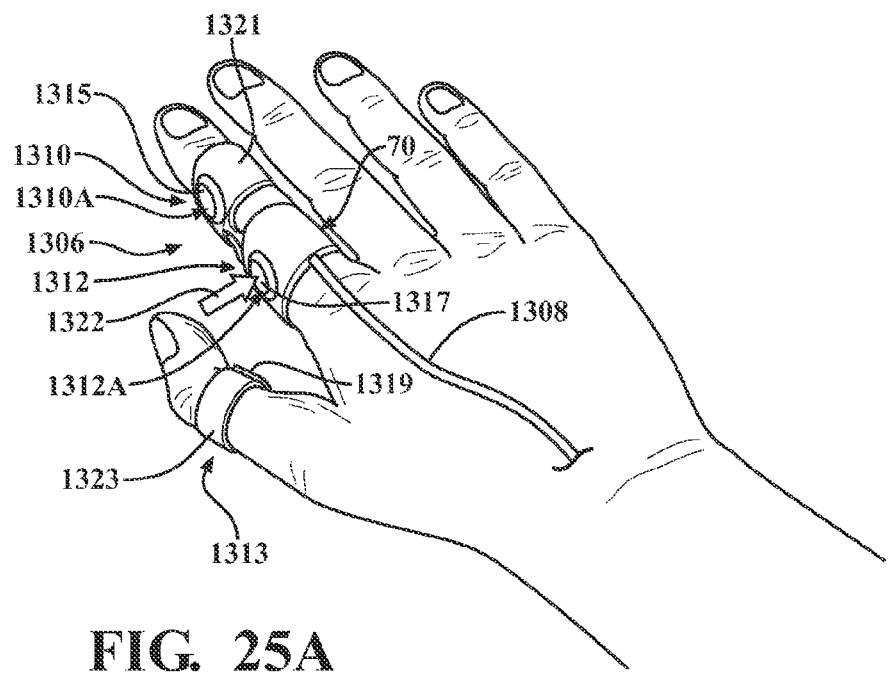
FIG. 25A is an illustration of yet another exemplary remote donned on the hand of an operator.
Figure 25B:
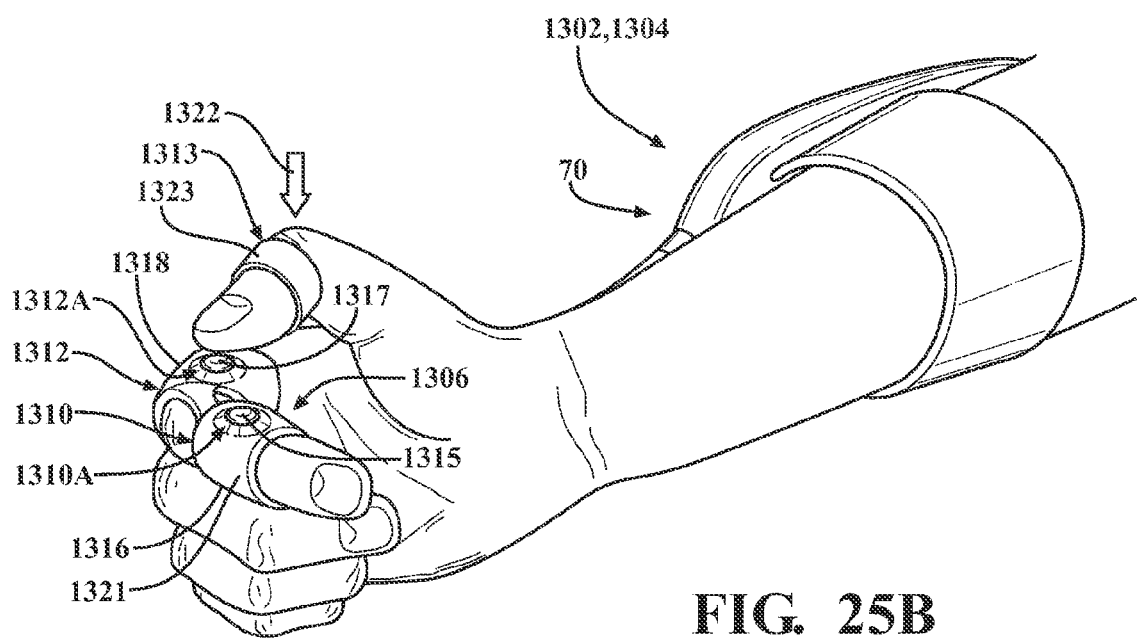
FIG. 25B is an illustration of the remote of FIG. 25A, wherein an operator is in the process of actuating a button.
Figure 25C:
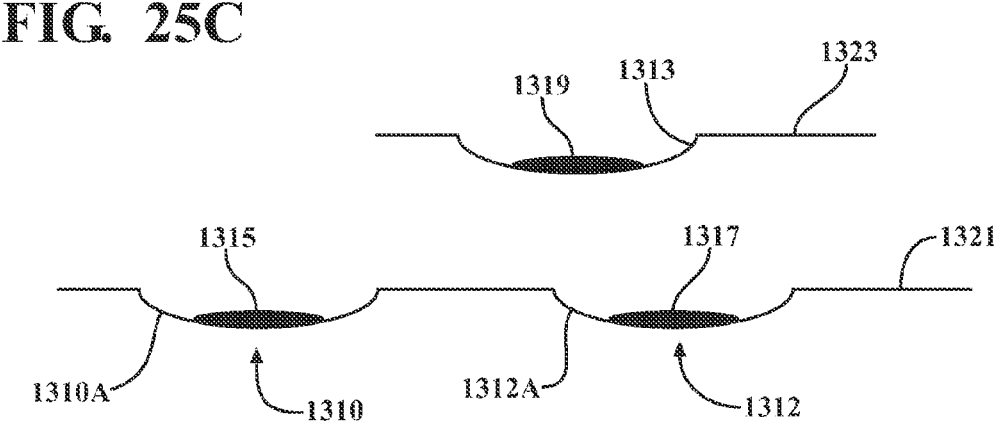
FIG. 25C is a schematic side illustration of the remote of FIG. 25A, illustrating the button as having a first contact member and a second contact member.

Referring to FIGS. 25A-25C, yet another exemplary remote 70 is illustrated. As shown, the controls are finger-thumb activated. The first and second buttons 1310, 1312 each comprise a first switch component 1310A, 1312A respectively. Each of the first switch components 1310A, 1312A are capable of being actuated by a common second switch component 1313. In particular, the remote control device 70 includes a first band 1321 that is provided as a finger garment that supports the first switch component 1310A of the first button 1310 and the first switch component 1312A of the second button 1312 in recesses on the side of an operator's index finger. The first switch component comprises a first housing including a recess and a first button contact 1315 located in the recess. Similarly, the second switch component comprises a second housing including a recess and a second button contact 1317 located in the recess.

Correspondingly, the garment includes a second band 1323 that supports the common second switch component 1313 about the thumb of the operator. The second switch component 1313 includes a common contact 1319 (see FIGS. 25A and 25C) generally at the tip of a protrusion that corresponds generally to the shape of the recesses of the first and second housings of the first switch components 1310A, 1312A. To actuate the first button 1310, the common contact 1319 on the thumb of the operator is brought into intimate electrical connection with the first button contact 1315, e.g., by directing the protrusion of the second switch component 1313 into the recess of the first housing of the first switch component 1310A. When electrical contact is made between the first button contact 1315 and common contact member 1319, actuation of the corresponding control is achieved. Similarly, to actuate the second button 1312, the common contact 1319 on the thumb of the operator is brought into intimate electrical connection with the second button contact 1317, e.g., by directing the protrusion of the second switch component 1313 into the recess of the second housing of the first switch component 1312A. When electrical contact is made between the second button contact 1317 and common contact member 1319, actuation of the corresponding control is achieved. While an intimate electrical connection is disclosed in this embodiment as being required between the common contact 1319 on the thumb and the first and second button contacts 1315 and 1317 to actuate the respective controls, the use of proximity-related structures is also contemplated, wherein the common contact 1319 on the thumb would only need to be brought into very close proximity to the first and second button contacts 1315 and 1317 to actuate the respective controls.

Figure 26:
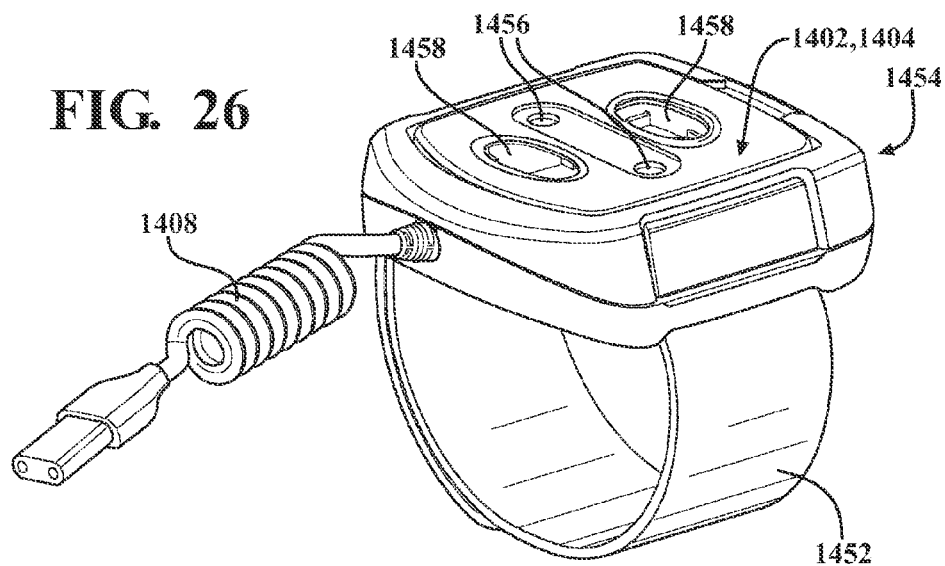
FIGS. 26-28 illustrate an additional exemplary remote, which is adapted to be worn on a wrist/arm of an operator.
Figure 27:
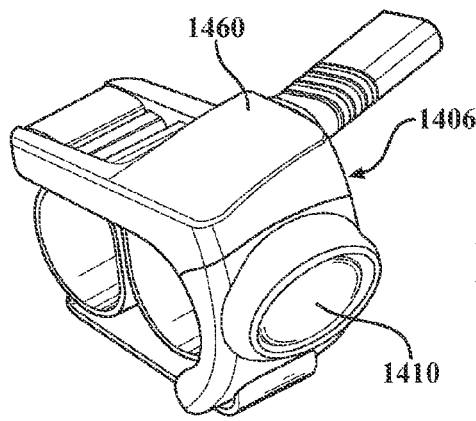
Figure 28:
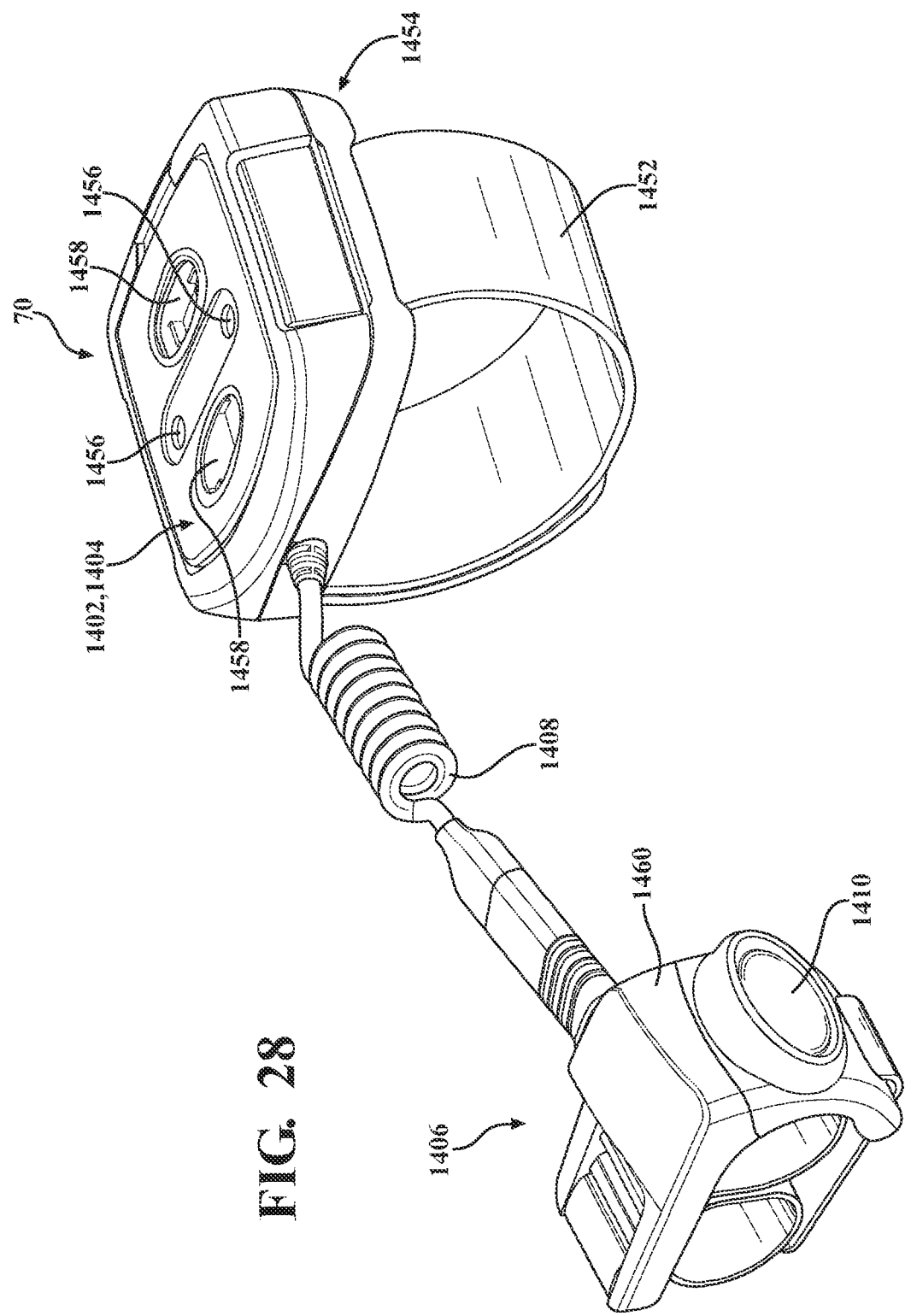

FIGS. 26-28 illustrate a remote control device 70 according to yet another aspect of the invention. The remote control device 70 may be worn so as to be supported on the arm, wrist, and/or hand of the operator. The remote control device 70 according to this aspect of the invention is donned by the operator by slipping a strap 1452 coupled to a support structure 1454 of the device 70 over the arm or wrist of the operator.

The support structure 1454 houses the removable wireless transmitter/power pack 1402, 1404, as described herein. The support structure 1454 further comprises alert elements 1456, such as light emitting diodes (LEDs), lights, display screens, sound generating devices, or other features that provide visual and/or audible cues as to the status of the remote control device 70 and/or the associated truck 10, e.g., when the remote control device 70 is capable of two-way communication with the associated truck 10. The support structure 1454 further comprises connectors 1458 for connection to other functional elements, such as a truck horn button and/or a brake button, i.e., similar to the second button 1312 described in the embodiments above.

The remote control device 70 further comprises a control structure 1406 comprising a rigid control device 1460 and an elongate, flexible communications link 1408 between the transmitter/power pack 1402, 1404 housed in the support structure 1454 and the control structure 1406. The communications link 1408 in the embodiment shown provides a detachable, wired connection between the support structure 1454 and the control structure 1406 so as to provide electrical communication between the wireless transmitter/power pack 1402, 1404 and the control device 1460. By separating the support structure 1454 from the control structure 1406 via the communications link 1408, a single transmitter/power pack 1402, 1404 may be reused with multiple instances of control structures 1406. As such, for example, operators on different shifts can maintain their own control structures 1406, e.g., via finger worn controls, and merely plug them into a corresponding support structure 1454 at the start of their shift.

The control device 1460 is adapted to be mounted to the hand of the operator, e.g., to one or more fingers of the operator. The control device 1460, which comprises a single button 1410 according to this aspect of the invention, communicates with the transmitter/power pack 1402, 1404 via the communications link 1408. With the remote control device 70 in the illustrated position, one handed operation is permitted to access the button 1410, which button 1410 is actuated to send a first type signal comprising a travel request signal to the truck, and may also optionally be used to send a second type signal comprising a stop or coast request to the truck, as described herein.

The button 1410 of the remote 70 may be easily reached and operated with the corresponding thumb of the operator. Such action requires a deliberate, yet easily achievable action on the part of the operator to actuate the button 1410. Moreover, operational sequences may be required to actuate the button 1410. For example, a double press in quick succession, i.e., a "double click" may be required to actuate a control, such as a travel request. Moreover, a "double click" may be required if no vehicle-related activity, e.g., movement of the truck 10, wireless commands requested by the operator, etc., has taken place for a period of time, e.g., 30 seconds. Further, a "double click" may be required for the first wireless command requested by an operator after the operator steps off the truck 10, e.g., as detected by the presence sensor(s) 58 described above.

The remote control device 70 may be worn in such a way that neither hand of the truck operator is inconvenienced or otherwise interferes with an operator using both hands for picking items. Moreover, there is no inconvenience, such as requiring large limb movements, difficult to reach or otherwise inaccessible controls, to move or stop the truck 10, even when the hands of the operator are currently engaged in a pick operation. As such, the operator can move or stop the truck 10, even when carrying pick items such as boxes, etc. with both hands, using a single, simple gesture.

Any of the disclosed configurations for the remote control device 70 may be equipped with steering compensation controls and/or may be integrated with a steer angle control of the truck 10. The steer angle control is typically implemented using a potentiometer, encoder or other suitable input device, and may be positioned at any convenient location on the truck 10. When used in combination with additional steering controls, the steer angle control sets a desired heading for the truck 10. As an example, an operator may line up the truck 10 in an aisle parallel to a row of racks in a warehouse operation. Using angle sensing feedback, as described herein, the heading of the truck 10 may be maintained parallel to the racks as the truck 10 moves down the aisle. The steer angle control thus prevents drift of the truck 10 and maintains its course. Under this arrangement, a travel command from the remote control device 70 causes the truck 10 to travel substantially straight along a heading defined by the steer controller 112.

A system that implements the jog control functionality set out herein may implement additional advanced features to satisfy specific performance requirements. For example, the transmitters may be equipped with a "global stop" command that shuts down all trucks 10 within range of the transmitter that are operating under remote control. Thus, all receivers may be programmed or otherwise configured to recognize a stop command, e.g., using a global or common command sequence.

In each of the illustrated exemplary systems, an antenna for the transmitter could be located in a transmitter box, woven into the garment, e.g., by integrating the antenna into Velcro, straps, bands, or other components associated with the transmitter, that is donned by the operator, located in wiring between the transmitter box and controls, etc.

Still further, the transmitter may be directional. For example, a target may be provided on the truck 10, e.g., as part of the receiver 102 (FIG. 2) or antenna 66 (FIG. 1). Thus, the operator must point the transmitter of the remote control 70 at or towards the target in order to cause the operation of the control, e.g., a jog command, to be received by the truck 10. Alternatively, certain commands may be non-directional, whereas other controls are directional. For example, the global stop (where provided) may not require detection by a target in order to be effectuated. On the other hand, a control to initiate a jog operation may be required to be detected by a suitable target. Targeted detection may be accomplished, for example, using infrared or other suitable technologies.

Figure 29:
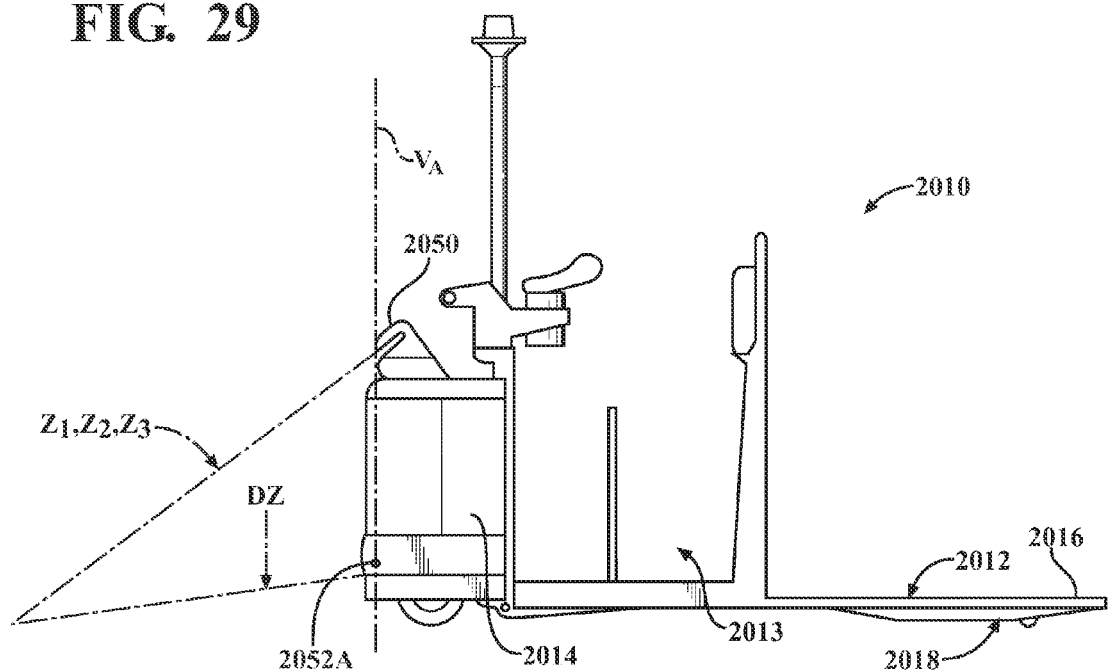
FIGS. 29-30 are side and top views of a materials handling vehicle according to another embodiment of the present invention.
Figure 30:
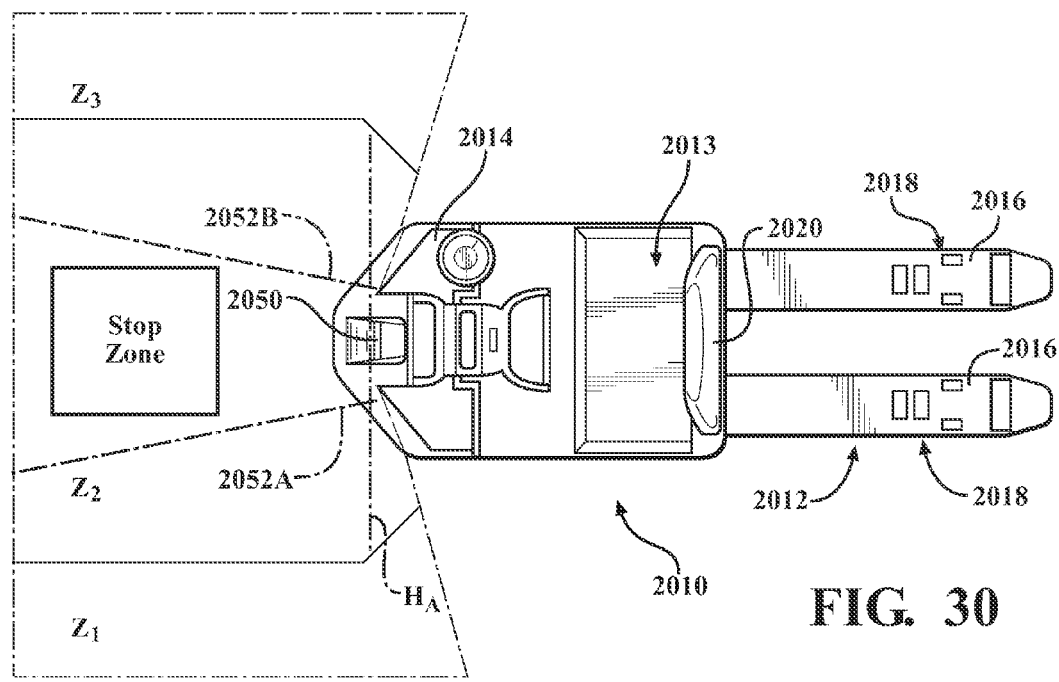

Referring to FIGS. 29 and 30, a materials handling vehicle 2010 according to another aspect of the invention includes a load handling assembly 2012, an operator's compartment 2013, and a power unit 2014. The load handling assembly 2012 includes a pair of forks 2016, each fork 2016 having a load supporting wheel assembly 2018. The load handling assembly 2012 may include other load handling features in addition to or in lieu of the illustrated arrangement of the forks 2016, such as a load backrest, scissors-type elevating forks, outriggers and separate height adjustable forks, a mast, a load platform, collection cage or other support structure carried by the forks 2016 or otherwise provided for handling a load supported and carried by the vehicle 2010.

As shown in FIGS. 29 and 30, the vehicle 2010 includes a first obstacle detector 2050 and a pair of second obstacle detectors 2052A and 2052B mounted to the power unit 2014. The second obstacle detectors 2052A and 2052B are spaced apart from each other along a horizontal axis $H_A$ of the vehicle defining a horizontal direction, see FIG. 30. The first obstacle detector 2050 is spaced apart from the second obstacle detectors 2052A and 2052B along a longitudinal axis $V_A$ of the vehicle 2010 defining a vertical direction, i.e., the second obstacle detectors 2052A and 2052B are located below, i.e., closer to the ground, than the first obstacle detector 2050, see FIG. 29.

The first obstacle detector 2050 according to this aspect of the invention may comprise a sweeping laser sensor capable of detecting objects, for example, in first, second, and third zones $Z_1, Z_2, Z_3$, which first, second, and third zones $Z_1, Z_2, Z_3$ may comprise planar zones, see FIGS. 29 and 30. The second zone $Z_2$ may comprise a "stop zone", and the first and third zones $Z_1$ and $Z_3$ may comprise left and right "steer bumper zones", such as the stop zone and the left and right steer bumper zones described in U.S. patent application Ser. No. 12/649,815, filed Dec. 30, 2009, entitled "STEER CORRECTION FOR A REMOTELY OPERATED MATERIALS HANDLING VEHICLE, the entire disclosure of which is already incorporated by reference herein. It is noted that the first obstacle detector 2050 may be capable of detecting objects in additional or fewer zones than the three zones $Z_1$, $Z_2, Z_3$ illustrated.

The second obstacle detectors 2052A and 2052B according to this aspect of the invention may comprise point laser sensors that are capable of detecting objects between one or more of the zones $Z_1, Z_2, Z_3$ and the vehicle 2010, i.e., underneath one or more of the zones $Z_1, Z_2, Z_3$, as illustrated in FIG. 29, and are preferably capable of at least detecting objects underneath the second zone $Z_2$. The second obstacle detectors 2052A and 2052B are thus capable of detecting objects located in a non-detect zone DZ of the first obstacle detector 2050, see FIG. 29, i.e., which non-detect zone DZ is defined as an area below the zones $Z_1, Z_2, Z_3$ and thus not sensed by the first obstacle detector 2050. Hence, the first obstacle detector 2050 functions to detect objects located along a path of travel of the power unit 2014 beyond the non-detect zone DZ, while the second obstacle detectors 2052A and 2052B function to sense objects along the path of travel of the power unit 2014 in the non-detect zone DZ, which is located just in front of the vehicle 2010, as shown in FIG. 29.

Figure 31:
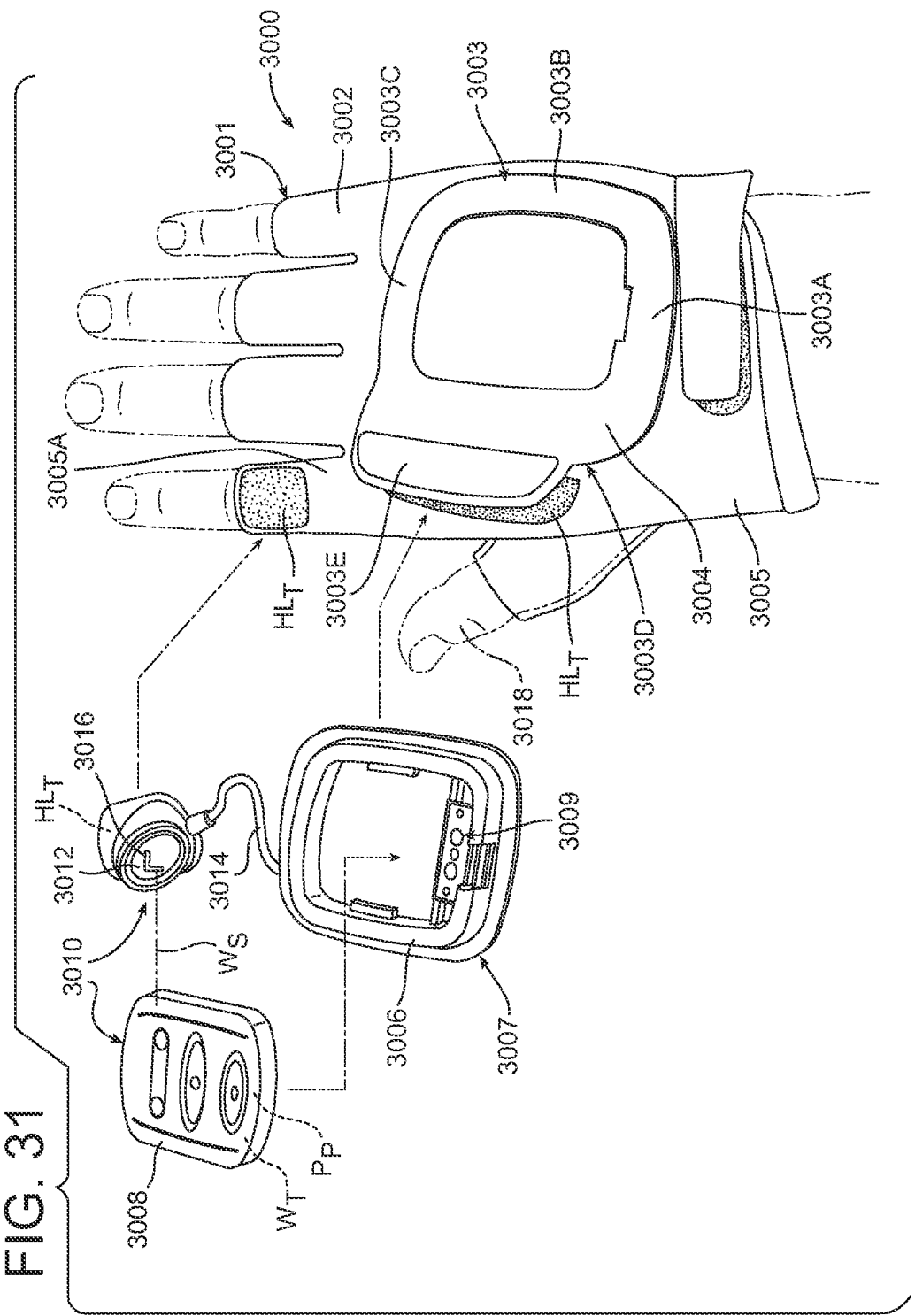
FIG. 31 is a perspective unassembled view of a wearable wireless remote control device according to various aspects of the present invention.
Figure 32:
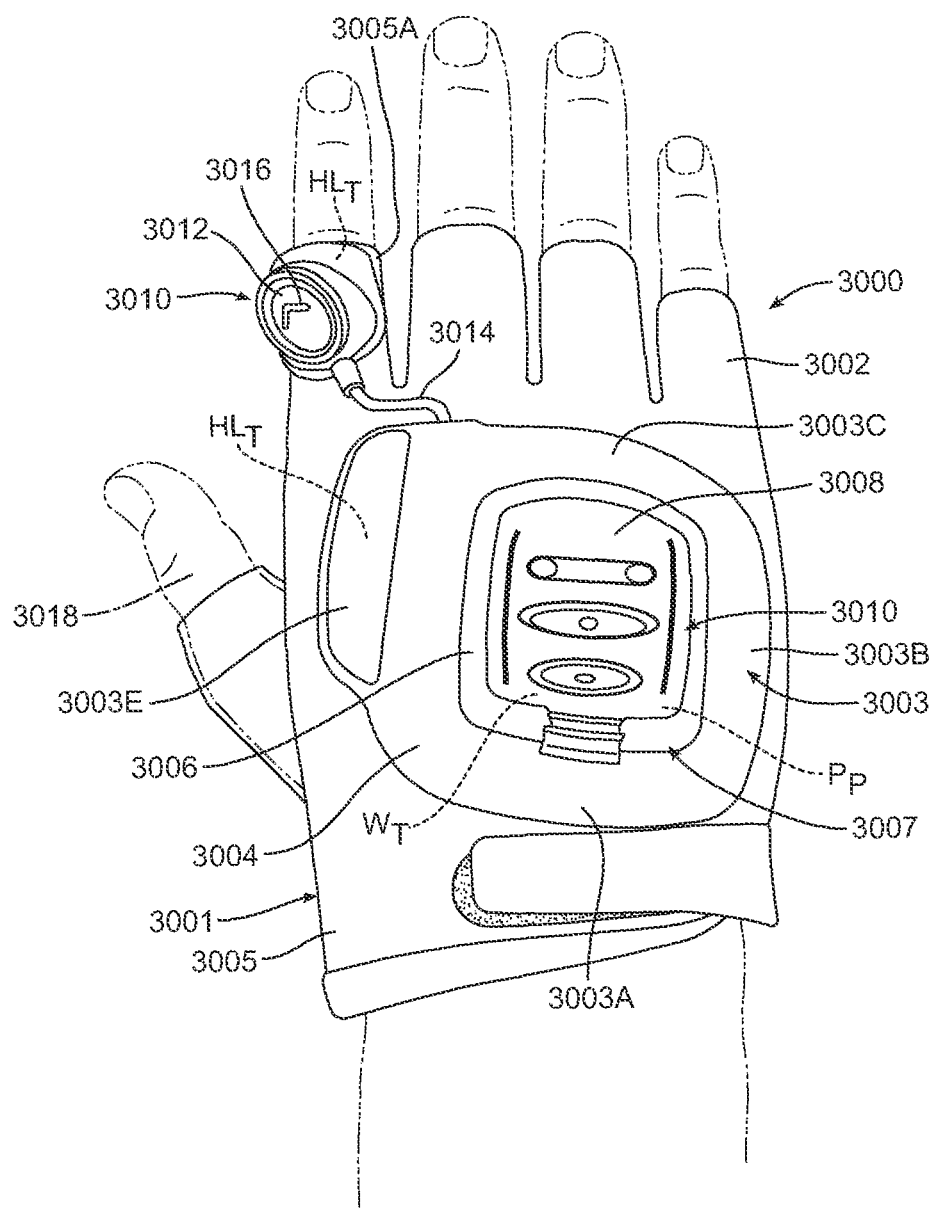
FIG. 32 is a perspective assembled view of the wearable wireless remote control device of FIG. 31.

Referring now to FIGS. 31 and 32, an exemplary wearable wireless remote control device 3000 of a supplemental remote control system for a materials handling vehicle according to another aspect of the invention is shown. The wireless remote control device 3000 according to this aspect of the invention comprises a garment 3002 comprising a glove 3001 that is donned by a hand of an operator. The illustrated garment 3002 includes a generally first frame-like structure 3003 coupled to a glove main body portion 3005 along three sides 3003A-3003C of the first frame-like structure 3003 such that an entrance 3003D at a fourth side 3003E into a pocket 3004 defined by the first frame-like structure 3003 is provided. In the illustrated embodiment, the first frame-like structure 3003 is formed from, for example polyvinyl chloride (PVC).

The pocket 3004 receives a docking area 3006 defined by a second frame-like structure 3007 during use of the device 3000 to control movement of a materials handling vehicle, such as of the type disclosed herein. The second frame-like structure 3007 in the illustrated embodiment is formed from, for example a polycarbonate. The docking area 3006 may include the same working components as those of the docking area 254 described above, e.g., connection pads 3009 (see FIG. 31), but in the case of the remote control device 3000, the docking area 3006 is detachably mounted to the garment 3002.

The fourth side 3003E of the first frame-like structure 3003 includes hook and loop tape $HL_T$ that is used to secure the docking area 3006 within the pocket 3004 and to the garment 3002 during use. When not in use, the docking area 3006 can be removed from the pocket 3004, leaving a relatively cost efficient glove 3001 having a pocket 3004 but including no electronic hardware. While the illustrated remote control device 3000 includes the pocket 3004 for receiving and securing the docking area 3006 to the garment 3002, the docking area 3006 may be secured to the garment 3002 in any suitable manner.

The docking area 3006 supports a detachable communications device 3008 including a wireless transmitter $W_T$ and a power pack $P_P$, wherein the communications device 3008 temporarily docks to the docking area 3006 during use of the supplemental remote control system to control movement of the associated materials handling vehicle but can be removed from the docking area 3006 when not in use, e.g., to enable charging of the power pack $P_P$ at a charging station. The communications device 3008 may include the same working components as those of the communications device 264 described above.

The communications device 3008 is provided as a component of electrical hardware 3010 of the remote control device 3000, which electrical hardware 3010 also comprises a travel control 3012 and a wire 3014 comprising structure that provides communication, e.g., direct communication or indirect communication through one or more intermediate elements, between the travel control 3012 and the wireless transmitter $W_T$ of the communications device 3008. The communication between the travel control 3012 and the wireless transmitter $W_T$ of the communications device 3008 in the embodiment shown is provided from the travel control 3012 through the wire 3014 to the docking area 3006, and through the connection pads 3009 of the docking area 3006 to the communications device 3008.

The travel control 3012 in the illustrated embodiment comprises a button 3016 that is detachably mountable to a finger 3005A of the glove main body portion 3005 of the garment 3002, e.g., by hook and loop tape $HL_T$ or in any suitable manner. As shown in FIG. 32, the button 3016 is positioned such that it can be can be easily pressed by a thumb 3018 of the operator to cause the wireless transmitter $W_T$ of the communications device 3008 to wirelessly transmit a vehicle command to a controller on the vehicle, such as a travel request as a first type signal requesting the materials handling vehicle to move across a floor surface in a first direction, as described in detail herein. As described above, the hand gesture for actuating the button 3016 may be performed even while the operator concurrently performs other work operative tasks such as holding or carrying boxes, scanning devices, tools, etc.

The travel control 3012 and the wire 3014 may be provided as an integral unit, which integral unit may also include the docking area 3006, i.e., the travel control 3012, the wire 3014, and the docking area 3006 may be provided as an integral unit that is detachable from the garment 3002, leaving a relatively cost efficient glove 3001 having a pocket 3004 but including no electronic hardware as mentioned above. Alternatively, the travel control 3012 and the wire 3014 may be detachable from the docking area 3006.

When the communications device 3008 is properly docked on a corresponding garment 3002, the remote control device 3000 provides a convenient platform for enabling a truck operator to remotely control their vehicle, as described in detail herein. Moreover, additional structure and/or functionality of the various remote control devices described herein, such as a stop button, vehicle traveling direction controls, etc., may be provided for use with the remote control device 3000 illustrated in FIGS. 31 and 32.

By separating the docking area 3006 and the electronic hardware 3010 from the garment 3002, single instances of the docking area 3006 and the electronic hardware 3010 may be used with multiple instances of the garment 3002. Further, by separating the communications device 3008 from the docking area 3006, a single communications device 3008 may be reused with multiple instances of the docking area 3006. As such, operators on different shifts can maintain their own garments 3002 and/or docking areas 3006, which docking area 3006 may be provided as an integral unit with a corresponding travel control 3012 and wire 3014, and merely plug in or dock the communications device 3008 into the docking area 3006 and the docking area 3006 into the pocket 3004 of their corresponding garment 3002 at the start of their shift.

The garment 3002 may be constructed from any number of materials such as stretchable fabrics, plastic, synthetics, leather, or other materials alone or in combination.

Figure 33:
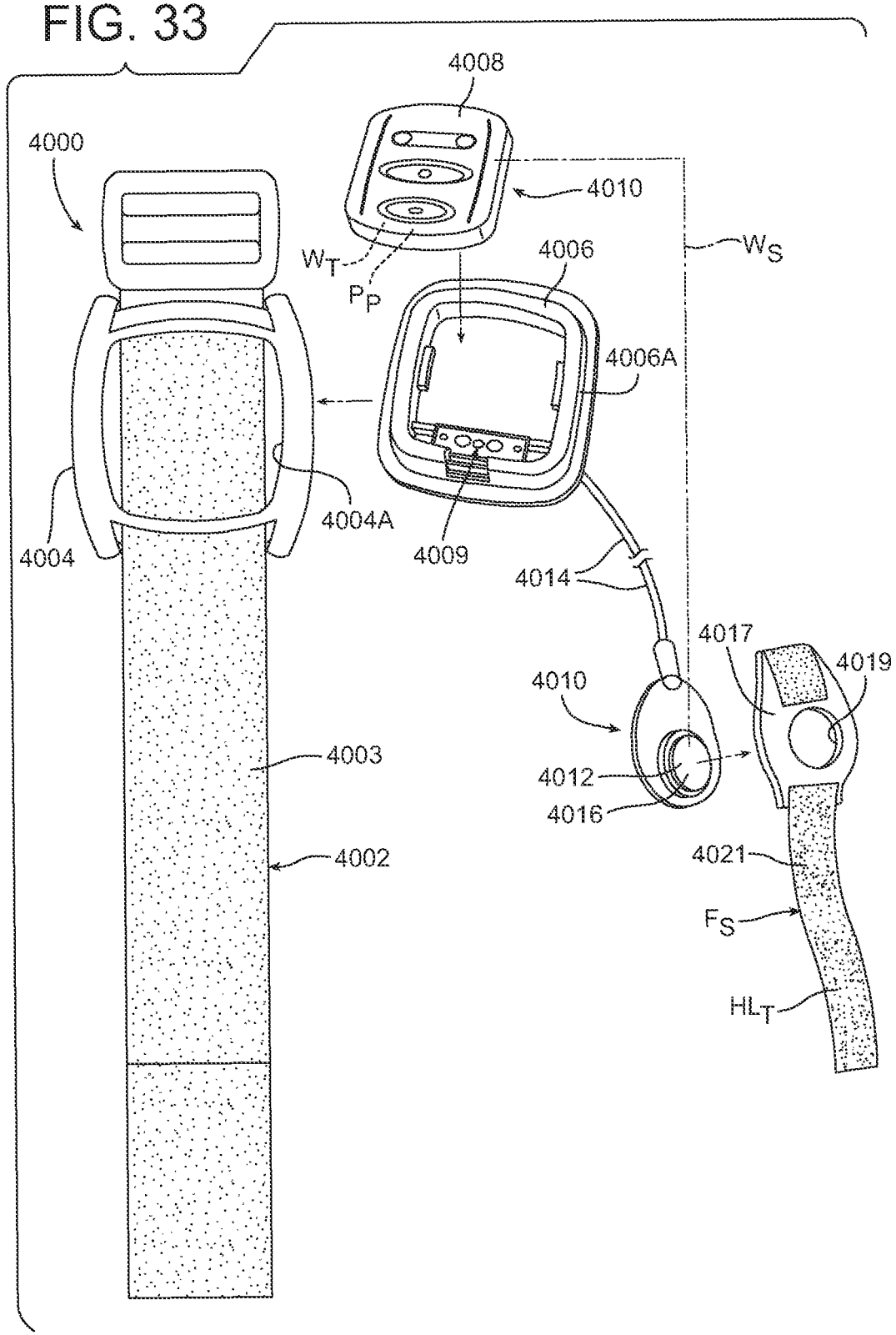
FIG. 33 is a perspective unassembled view of a wearable wireless remote control device according to various aspects of the present invention.
Figure 34:
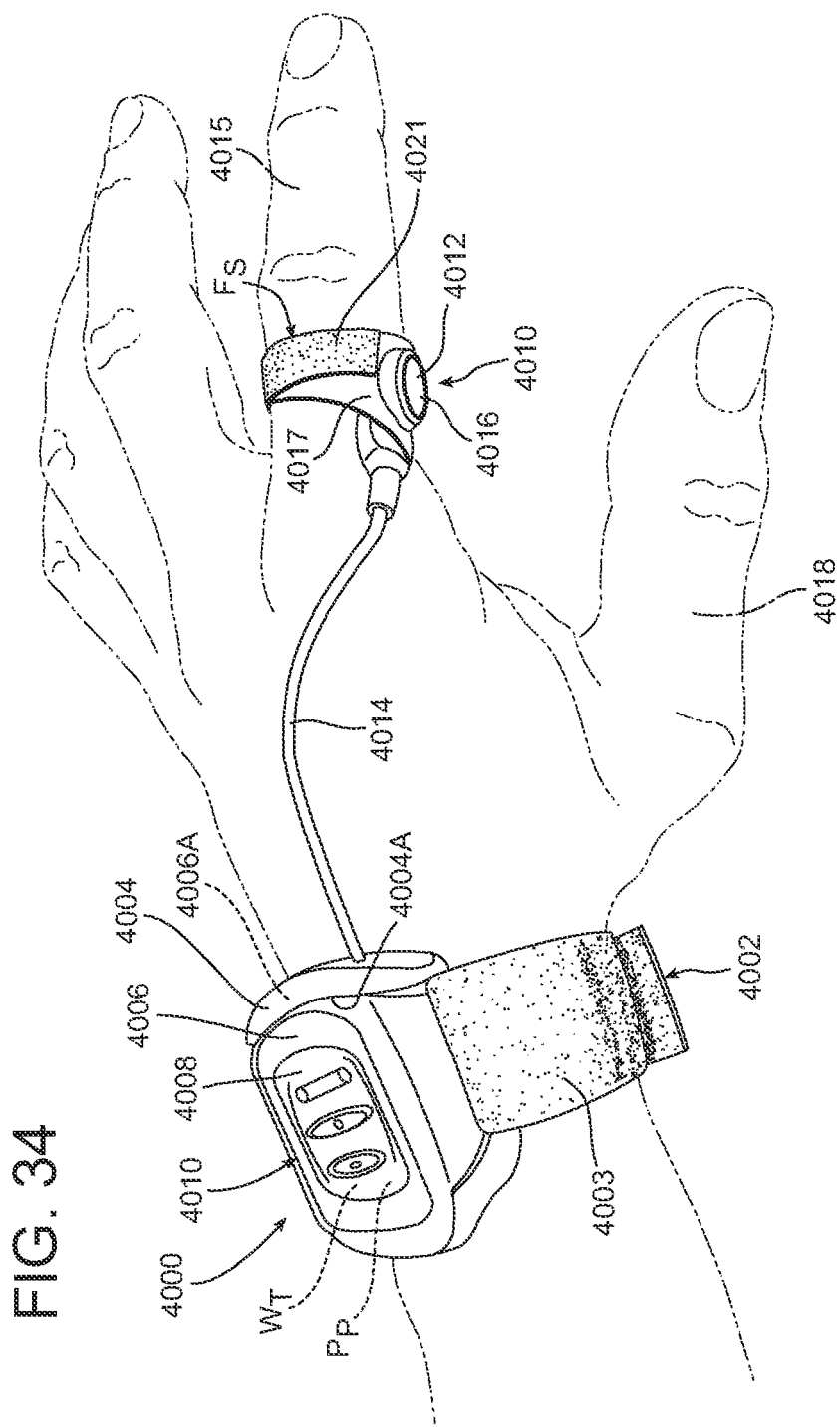
FIG. 34 is a perspective assembled view of the wearable wireless remote control device of FIG. 33.

Referring now to FIGS. 33 and 34, an exemplary wearable wireless remote control device 4000 of a supplemental remote control system for a materials handling vehicle according to another aspect of the invention is shown. The wireless remote control device 4000 according to this aspect of the invention comprises a garment 4002 comprising a strap 4003 that is worn on the wrist or arm of an operator. The illustrated garment 4002 further includes a frame 4004 to which the strap 4003 is attached. The frame 4004 receives a docking area 4006 during use of the device 4000 to control movement of a materials handling vehicle, such as of the type disclosed herein. The docking area 4006 may include the same working components as those of the docking area 254 described above, e.g., connection pads 4009 (see FIG. 33), but in the case of the remote control device 4000, the docking area 4006 is detachably mounted to the garment 4002.

The frame 4004 may be formed with generally the same frame-like shape as the docking area 4006 and includes an outer lip 4004A that overlaps an outer edge 4006A of the docking area 4006 to secure the docking area 4006 to the garment 4002 during use, i.e., the docking area 4006 is captured between the strap 4003 and the frame 4004. When not in use, the docking area 4006 can be removed from the frame 4004, leaving a relatively cost efficient strap 4003 having a frame 4004 but including no electronic hardware. While the illustrated remote control device 4000 includes the frame 4004 for receiving and securing the docking area 4006 to the garment 4002, the docking area 4006 may be secured to the garment 4002 in any suitable manner.

The docking area 4006 supports a detachable communications device 4008 including a wireless transmitter $W_T$ and a power pack $P_P$, wherein the communications device 4008 temporarily docks to the docking area 4006 during use of the supplemental remote control system to control movement of a materials handling vehicle but can be removed from the docking area 4006 when not in use, e.g., to enable charging of the power pack $P_P$ at a charging station. The communications device 4008 may include the same working components as those of the communications device 264 described above.

The communications device 4008 is provided as a component of electrical hardware 4010 of the remote control device 4000, which electrical hardware 4010 also comprises a travel control 4012 and a wire 4014 comprising structure that provides communication, e.g., direct communication or indirect communication through one or more intermediate elements, between the travel control 4012 and the wireless transmitter $W_T$ of the communications device 4008. The communication between the travel control 4012 and the wireless transmitter $W_T$ of the communications device 4008 in the embodiment shown is provided from the travel control 4012 through the wire 4014 to the docking area 4006, and through the connection pads 4009 of the docking area 4006 to the communications device 4008.

The travel control 4012 in the illustrated embodiment comprises a button 4016 that is detachably mountable to a finger 4015 of the operator, e.g., by a finger strap $F_S$ that forms a portion of the garment 4002 detached from the strap 4003 as shown in FIG. 34 or in any suitable manner. The exemplary finger strap $F_S$ illustrated in FIGS. 33 and 34 includes a frame 4017 that defines an opening 4019 that receives the button 4016, and a strap portion 4021 that includes hook and loop tape $HL_T$ to secure the finger strap $F_S$ to the operator's finger 4015, although the travel control 4012 may be secured to the operator's finger 4015 in any suitable manner, such as, for example, using a finger strap that includes hook and loop tape that interacts with corresponding hook and loop tape associated with the travel control 4012. By using hook and loop tape to secure the travel control 4012 to the finger strap, the travel control 4012 could easily be repositioned on the operator's finger 4015 as desired.

As shown in FIG. 34, the button 4016 is positioned such that it can be can be easily pressed by a thumb 4018 of the operator to cause the wireless transmitter $W_T$ of the communications device 4008 to wirelessly transmit a vehicle command to a controller on the vehicle, such as a travel request as a first type signal requesting the materials handling vehicle to move across a floor surface in a first direction, as described in detail herein. As described above, the hand gesture for actuating the button 4016 may be performed even while the operator performs other work operative tasks such as holding or carrying boxes, scanning devices, tools, etc.

The travel control 4012 and the wire 4014 may be provided as an integral unit, which integral unit may also include the docking area 4006, i.e., the travel control 4012, the wire 4014, and the docking area 4006 may be provided as an integral unit that is detachable from the garment 4002, leaving a relatively cost efficient strap 4003 having a frame 4004 but including no electronic hardware as mentioned above. Alternatively, the travel control 4012 and the wire 4014 may be detachable from the docking area 4006.

When the communications device 4008 is properly docked on a corresponding garment 4002, the remote control device 4000 provides a convenient platform for enabling a truck operator to remotely control their vehicle, as described in detail herein. Moreover, additional structure and/or functionality of the various remote control devices described herein, such as a stop button, vehicle traveling direction controls, etc., may be provided for use with the remote control device 4000 illustrated in FIGS. 33 and 34.

By separating the docking area 4006 and the electronic hardware 4010 from the garment 4002, single instances of the docking area 4006 and the electronic hardware 4010 may be used with multiple instances of the garment 4002. Further, by separating the communications device 4008 from the docking area 4006, a single communications device 4008 may be reused with multiple instances of the docking area 4006. As such, operators on different shifts can maintain their own garments 4002 and/or docking areas 4006, which docking area 4006 may be provided as an integral unit with a corresponding travel control 4012 and wire 4014, and merely plug in or dock the communications device 4008 into the docking area 4006 and the docking area 4006 into the frame 4004 of their corresponding garment 4002 at the start of their shift.

The garment 4002 may be constructed from any number of materials such as stretchable fabrics, plastic, synthetics, leather, or other materials alone or in combination.

It is noted that the communications devices 3008 and 4008 of FIGS. 31/32 and 33/34, respectively, are interchangeable between the garments 3002 and 4002 with no modifications to the communications devices 3008 and 4008 required. That is, the communications device 3008 of FIGS. 31 and 32 can be used in the docking area 4006 of FIGS. 33 and 34, and the communications device 4008 of FIGS. 33 and 34 can be used in the docking area 3006 of FIGS. 31 and 32, with no modification of the communications devices 3008 and 4008 required. The communications devices 3008 and 4008 of FIGS. 31/32 and 33/34, respectively, could also be utilized in docking areas of other types of garments of other types of supplemental remote control systems, thus reducing overall costs associated with providing different types of garments that are available.

Further, according to an optional aspect of the invention, either of the remote control devices 3000, 4000 may include structure $W_S$ (see FIGS. 31 and 33) that utilizes short range wireless technology, such as, for example, Bluetooth, to provide wireless communication between the travel control 3012, 4012 and the corresponding communications device 3008, 4008, in which case the wire 3014, 4014 could be eliminated.

Figure 35:
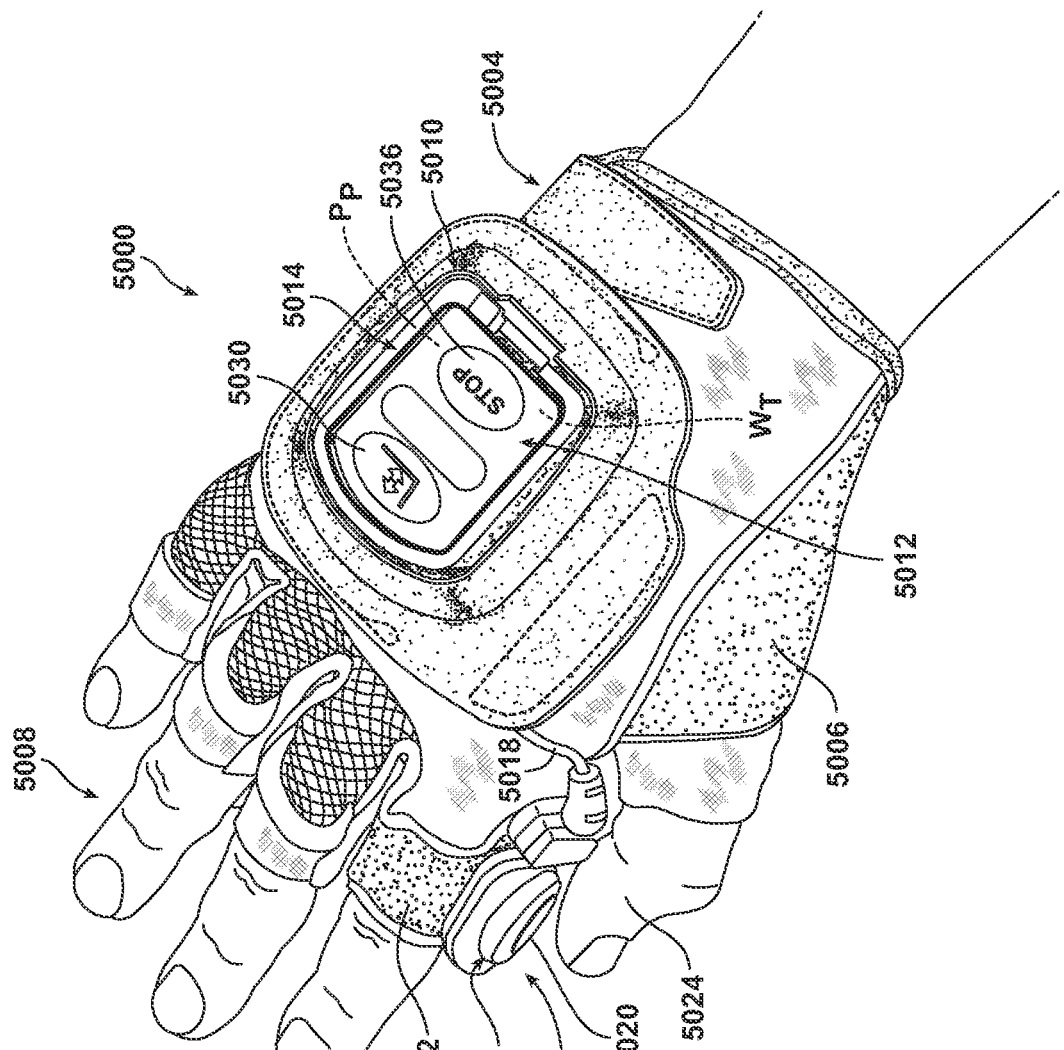
FIG. 35 is a perspective assembled view of a wearable wireless remote control device according to various aspects of the present invention.
Figure 36:
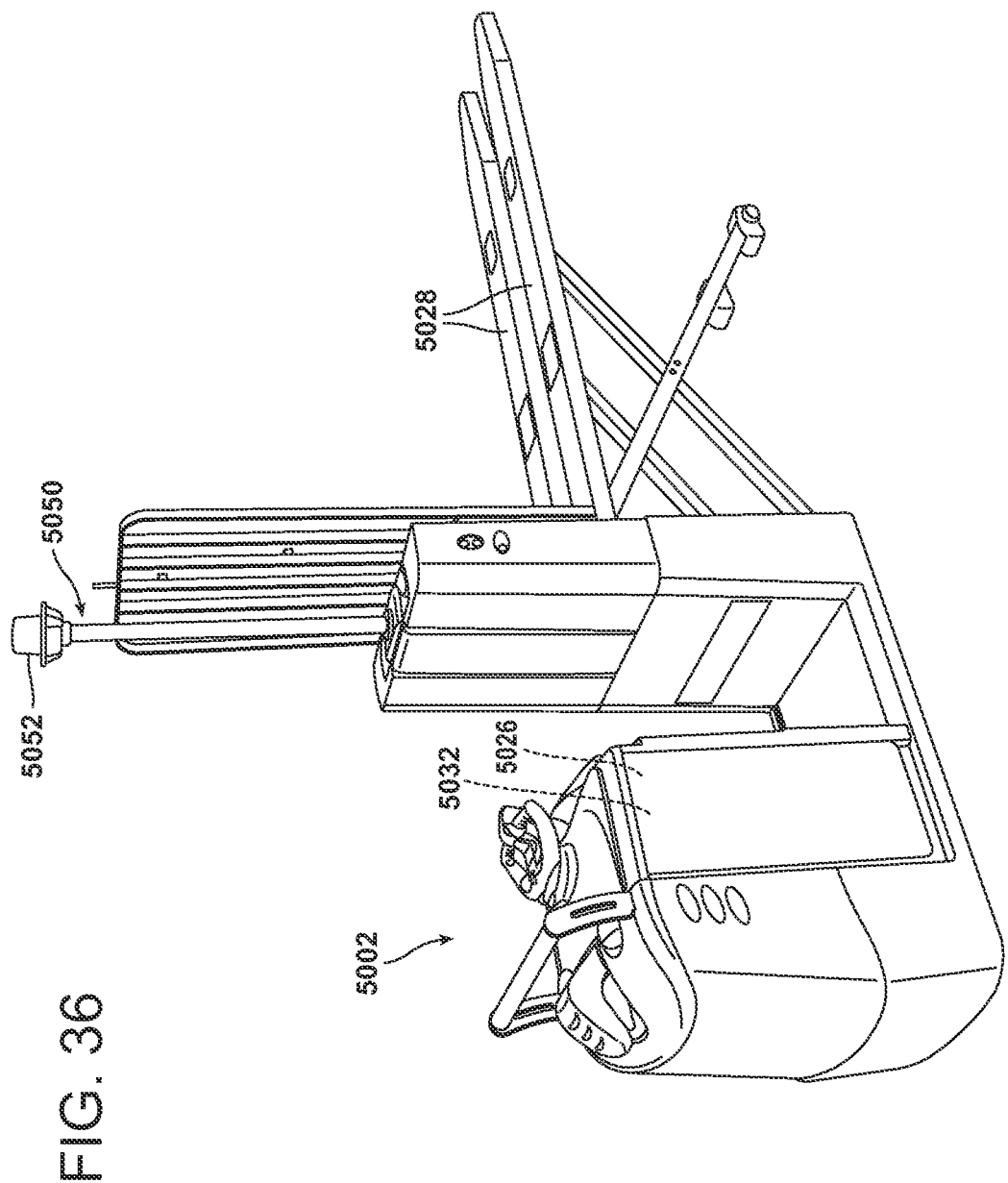
FIG. 36 is a perspective view of a materials handling vehicle according to various embodiments of the present invention.

Referring now to FIGS. 35-37, an exemplary wearable wireless remote control device 5000 (see FIG. 35) of a supplemental remote control system for a materials handling vehicle 5002 (see FIG. 36) according to another aspect of the invention is shown. The wireless remote control device 5000 according to this aspect of the invention comprises a garment 5004 in the form of a glove 5006 that is worn on an operator's hand 5008. The garment 5004 may be similar to the garment 3002 described above for FIGS. 31 and 32, including a docking area 5010 having the same exemplary working components as those of the docking area 254 described above.

The docking area 5010 supports a detachable communications device 5012 including a wireless transmitter $W_T$ and a power pack $P_P$, wherein the communications device 5012 docks to the docking area 5010 during use of the supplemental remote control system to control movement of the associated materials handling vehicle 5002. As described above, the communications device 5012 can optionally be removed from the docking area 5010 when not in use, e.g., to enable charging of the power pack $P_P$ at a charging station. The communications device 5012 may include the same working components as those of the communications device 264 described above.

The communications device 5012 is provided as a component of electrical hardware 5014 of the remote control device 5000, which electrical hardware 5014 also comprises a first input component comprising a travel control 5016 and a wire 5018 that provides communication, either direct or indirect, i.e., through one or more intermediate elements, between the travel control 5016 and the wireless transmitter $W_T$ of the communications device 5012. The communication between the travel control 5016 and the wireless transmitter $W_T$ in the embodiment shown is provided from the travel control 5016 through the wire 5018 to the docking area 5010, and through the docking area 5010 to the communications device 5012.

The travel control 5016 in the illustrated embodiment comprises a first button 5020 that is located on a finger portion 5022 of the garment 5004. The button 5020 may optionally be detachably mountable to the finger portion 5022 of the garment 5004 as described above for the garment 3002 of FIGS. 31 and 32. As shown in FIG. 35, the button 5020 is positioned such that it can be can be easily pressed by a thumb 5024 of the operator to cause the wireless transmitter $W_T$ of the communications device 5012 to wirelessly transmit a vehicle command to a controller on the vehicle 5002, such as a travel request as a first type signal requesting the vehicle 5002 to move across a floor surface in a first direction, as described in detail herein, or other signal(s) that may request a controller 5026 on the vehicle 5002 (see FIG. 36) to implement a second command other than to cause the vehicle 5002 to move across the floor surface, such as raising or lowering forks 5028 on the vehicle 5002 as will be described in greater detail herein. As described above, the hand gesture for actuating the button 5020 may be performed even while the operator concurrently performs other work operative tasks such as holding or carrying boxes, scanning devices, operating tools, etc.

As shown in FIG. 35 the wireless remote control device 5000 further comprises a second input component comprising a second button 5030 located on the communications device 5012 and communicably coupled to the wireless transmitter $W_T$. Actuation of the second button 5030 causes the wireless transmitter $W_T$ to wirelessly transmit a second type of request to the vehicle 5002, i.e., to a receiver 5032 on the vehicle 5002 in communication with the controller 5026 as described above. The second type of request according to this aspect of the invention requests the vehicle 5002 to perform a second vehicle function comprising a vehicle function other than to advance the vehicle 5002 across the floor surface. Exemplary vehicle functions requested by the second button 5030 are for the controller 5026 to: sound a vehicle horn; stop and power down the vehicle 5002, wherein a startup procedure may be required for continued vehicle operation as described in detail above; change an operation mode of the remote control device 5000 (as will be described in greater detail herein); implement a fork raise or lower operation to raise or lower the forks 5028 on the vehicle 5002 (as will be described in greater detail herein), etc.

The wireless remote control device 5000 further comprises a third input component comprising a third button 5036 located on the communications device 5012 and communicably coupled to the wireless transmitter $W_T$. Actuation of the third button 5036 causes the wireless transmitter $W_T$ to wirelessly transmit a third type of request to the vehicle 5002, i.e., to the receiver 5032 on the vehicle, requesting the vehicle 5002 to perform a third vehicle function, such as a function other than to advance the vehicle 5002 across the floor surface. The third vehicle function could be another one of the functions described above for the second vehicle function, or a different type of suitable vehicle function.

Referring now to FIG. 37 with additional reference to FIGS. 35 and 36, a flow chart is depicted illustrating an exemplary method 6000 for remotely controlling traction and fork raise/lower operations of a materials handling vehicle, such as the vehicle 5002 illustrated in FIG. 36 in response to receiving wireless remote commands from an associated remote control device, such as the device 5000 illustrated in FIG. 35. It is noted that the vehicle 5002 is assumed to be successfully paired/associated with the corresponding remote control device 5000 as described herein.

As shown in FIG. 37, the vehicle 5002 is capable of operation in two primary remote operation modes, namely, a travel request mode 6002 and a fork raise/lower request mode 6004.

Indication structure 5050 provided on the vehicle 5002 (see FIG. 36), may change audible and/or visual characteristics depending on which mode the vehicle 5002 is in. For example, the indication structure 5050 illustrated in FIG. 36 includes a light 5052 mounted on the vehicle 5002, which light 5052 may change illumination characteristics, e.g., color and/or an illumination pattern, to distinguish between the travel request mode 6002 and the fork raise/lower request mode 6004. In one exemplary implementation, the light 5052 may be a solid first color, e.g., green, while the vehicle 5002 is in travel request mode 6002, wherein the light may optionally blink in the first color when an object is detected in the path of travel of the vehicle 5002, e.g., using one or more of the obstacle detectors/sensors described in detail herein. While the vehicle 5002 is in fork raise/lower request mode 6004, the light 5052 may be a solid second color, e.g., amber, when a fork raise operation is being implemented, and the light 5052 may blink in the second color (or be a solid third color) when a fork lower operation is being implemented. There are many possibilities for audibly and/or visually distinguishing between operation modes in addition to those described herein.

First, the travel request mode 6002 of the vehicle 5002 will be described, with the fork raise/lower request mode 6004 of the vehicle 5002 to follow. Operation of the first button 5020 of the remote control device 5000 while the vehicle 5002 is in travel request mode 6002 according to FIG. 37 is used to control movement of the vehicle 5002 as described herein. For example, while the vehicle 5002 is stopped, a double click of the first button 5020 may result in the vehicle controller 5026 implementing a travel request to cause the vehicle 5002 to advance in a first direction at step 6010. The vehicle controller 5026 according to this embodiment may evaluate at least one vehicle condition to decide whether or not to implement the remote travel request as described herein. A single click of the first button 5020 while the vehicle is stopped may result in no action or an error condition at step 6012, wherein a travel request by the remote control device 5000 is not implemented.

Operation of the third button 5036 of the remote control device 5000 while in travel request mode 6002 may result in, for example, the vehicle controller 5026 implementing a shutdown procedure at step 6014, although the third button 5036 could cause the vehicle controller 5026 to implement other vehicle functions as described herein.

Operation of the second button 5030 of the remote control device 5000 while in travel request mode 6002 may result in different outcomes, depending on at least one of a pressing sequence or a pressing duration of the second button 5030. For example, if the second button 5030 is pressed and released quickly, e.g., shorter than 600 ms as shown in FIG. 37, the vehicle controller 5026 may sound the vehicle horn at step 6016, although shortly pressing the second button 5030 could cause the vehicle controller 5026 to implement other vehicle functions as described herein, or pressing the second button 5030 shortly could result in no action.

Continuing with the exemplary flowchart depicted in FIG. 37, an appropriate operation of the wireless remote control device 5000 comprising the operator implementing a predetermined command protocol on the wireless remote control device 5000 at step 6018 results in the vehicle 5002 switching between the travel request mode 6002 and the fork raise/lower request mode 6004. An exemplary command protocol may be, for example, a long press of the second button 5030, e.g., longer than 600 ms as shown in FIG. 37, or the operator implementing a predetermined button sequence. It is noted that other remote and/or vehicle operations could be used to transition the vehicle 5002 between the travel request mode 6002 and the fork raise/lower request mode 6004.

Referring now to the fork raise/lower request mode 6004 depicted in FIG. 37, while the vehicle 5002 is in the fork raise/lower request mode 6004 two operating modes are available, namely, a lift state, also referred to herein as a fork raise mode 6020, and a lower state, also referred to herein as a fork lower mode 6022.

While the vehicle 5002 is in the fork raise/lower mode 6004, operation of the first button 5020 of the remote control device 5000 may be used to control raising and lowering of the vehicle forks 5028. For example, while the vehicle 5002 is in the fork raise mode 6020, a double click of the first button 5020 may result in the vehicle controller 5026 implementing a fork raise operation to raise the vehicle forks 5028 at step 6030. A single click of the first button 5020 while the vehicle 5002 is in the fork raise mode 6020 may result in no action or an error condition at step 6032, wherein a fork raise operation request by the remote control device 5000 is not implemented. The controller 5026 may also evaluate at least one vehicle condition before implementing the fork raise operation, such as determining that an object is in the path of the forks 5028, determining that a weight of a load on the forks 5028 is too great, detecting that a hydraulic fluid line has a break, etc.

Operation of the third button 5036 of the remote control device 5000 while in the fork raise mode 6020 may result in, for example, the vehicle controller 5026 implementing a shutdown procedure at step 6034, although the third button 5036 could cause the vehicle controller 5026 to implement other vehicle functions as described herein.

Operation of the second button 5030 of the remote control device 5000 while in the fork raise mode 6020 may result in different outcomes, depending on at least one of a pressing sequence or a pressing duration of the second button 5030. For example, if the second button 5030 is pressed and released quickly, e.g., shorter than 600 ms as shown in FIG. 37, the vehicle controller 5026 may sound the vehicle horn at step 6036 or take no action.

An appropriate operation of the wireless remote control device 5000 comprising the operator implementing a predetermined command procedure on the wireless remote control device 5000 at step 6038 results in the vehicle 5002 switching between the fork raise mode 6020 and the fork lower mode 6022. An exemplary command protocol may be, for example, a double click of the second button 5030 as shown in FIG. 37. It is noted that other remote and/or vehicle operations could be used to transition the vehicle 5002 between the fork raise mode 6020 and the fork lower mode 6022.

While the vehicle 5002 is in the fork lower mode 6022, a double click of the first button 5020 may result in the vehicle controller 5026 implementing a fork lower operation to lower the vehicle forks 5028 at step 6040. A single click of the first button 5020 while the vehicle is in the fork lower mode 6022 may result in no action or an error condition at step 6042, wherein a fork lower operation request by the remote control device 5000 is not implemented. The controller 5026 may also evaluate at least one vehicle condition before implementing the fork lower operation, such as determining that an object is in the path of the forks 5028, determining that a weight of a load on the forks 5028 is too great, detecting that a hydraulic fluid line has a break, etc.

Operation of the third button 5036 of the remote control device 5000 while in the fork lower mode 6022 may result in, for example, the vehicle controller 5026 implementing a shutdown procedure at step 6044, although the third button 5036 could cause the vehicle controller 5026 to implement other vehicle functions as described herein.

Operation of the second button 5030 of the remote control device 5000 while in the fork lower mode 6022 may result in different outcomes, depending on at least one of a pressing sequence or a pressing duration of the second button 5030. For example, if the second button 5030 is pressed and released quickly, e.g., shorter than 600 ms as shown in FIG. 37, the vehicle controller 5026 may sound the vehicle horn at step 6046 or take no action.

The operator may also implement the predetermined command procedure, e.g., wherein the second button 5030 is double clicked by the operator, while in the fork lower mode 6022 to switch to the fork raise mode 6020.

Further, the operator may also implement the predetermined command protocol, e.g., wherein the second button 5030 is held down by the operator for greater than 600 ms in the exemplary embodiment shown, while in either the fork raise mode 6020 or the fork lower mode 6022 to switch to the travel request mode 6002.

As described herein, the first input component, i.e., the first button 5020, is actuated by the operator to request both a travel request (while the vehicle is in travel request mode 6002) and fork raise and lower requests (while the vehicle is in fork raise/lower request mode 6004). Hence, a complexity of the remote control device 5000 is improved by limiting the number of buttons on the device 5000, while also increasing operable usability.

It is understood that while the exemplary vehicle of FIG. 36 includes a pair of forks 5028, other types of materials handling vehicles including different types of load bearing structures that are capable of being raised/lowered could be used with the technology illustrated herein, such as counterbalance trucks, reach trucks, turret trucks, etc. Hence, the technology described herein is not intended to be limited to the specific types of vehicles depicted in the figures. It is also understood that the technology of the remote control device 5000 described above for FIGS. 35-37 could be used with other types of wireless remote control devices, such as a pendant worn around the neck, a wrist-mounted unit, a finger-mounted unit, a device worn on a shirt, belt, pants, vest, etc.

Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A supplemental remote control system for a materials handling vehicle that includes a power unit including at least one wheel and a load handling assembly comprising:
   a wireless remote control device that is useable by an operator interacting with said materials handling vehicle, said wireless remote control device comprising:
      a wireless transmitter; and
      a travel control communicably coupled to said wireless transmitter, wherein actuation of said travel control causes said wireless transmitter to wirelessly transmit a travel request as a first type signal requesting said vehicle to advance in a first direction;
   a receiver for receiving transmissions from said wireless transmitter at said vehicle;
   a controller that is communicably coupled to said receiver and to a traction control system of said vehicle, said controller being responsive to receipt of said first type signal by said receiver to evaluate at least one vehicle condition, to decide whether to implement said travel request based upon the evaluation of said at least one vehicle condition and to cause said fraction control system to advance said vehicle if said controller decides to implement said travel request based upon the evaluation of said at least one vehicle condition;
   wherein said wireless remote control device further comprises an input component communicably coupled to said wireless transmitter, wherein actuation of said input component causes said wireless transmitter to wirelessly transmit a second type of request to said receiver on said vehicle requesting said vehicle to perform a second vehicle function other than to advance said vehicle.

2. The supplemental remote control system according to claim 1, wherein said wireless remote control device further comprises:
   a wearable glove garment having a button on a finger thereof and a circuit that connects said button to a docking area on said garment; wherein:
   actuation of said button implements said travel control; and
   said wireless transmitter is provided on a communications device that docks to said docking area of said garment to couple said wireless transmitter to said button.

3. The supplemental remote control system according to claim 2, wherein an antenna is provided integral with said glove garment so as to connect to said wireless transmitter when said communications device is docked to said docking area of said glove garment.

4. The supplemental remote control system according to claim 1, wherein said wireless remote control device further comprises:
   a wearable garment including a portion that is secured to a finger of the operator and includes a button, wherein actuation of said button implements said travel control.

5. The supplemental remote control system according to claim 4, wherein said input component comprises one of said button on said garment portion and another button on said wireless remote control device, and said second vehicle function comprises the controller sounding a vehicle horn.

6. The supplemental remote control system according to claim 4, wherein said input component comprises one of said button on said garment portion and another button on said wireless remote control device, and said second vehicle function comprises the controller stopping and powering down said vehicle.

7. The supplemental remote control system according to claim 6, wherein after said controller stops and powers down said vehicle, said vehicle requires an operator to initiate a startup procedure to restart said vehicle.

8. The supplemental remote control system according to claim 4, wherein said input component comprises one of said button on said garment portion and another button on said wireless remote control device, and said second vehicle function comprises the controller implementing one of a fork raise and a fork lower operation to raise or lower forks on said vehicle.

9. The supplemental remote control system according to claim 8, wherein said input component must be double clicked by the operator for the controller to implement the one of the fork raise and the fork lower operation.

10. The supplemental remote control system according to claim 8, wherein said input component comprises said button on said garment portion such that the same button is usable to both request said controller to advance said vehicle and to request said controller to implement the one of the fork raise and the fork lower operation.

11. The supplemental remote control system according to claim 10, wherein switching between a travel request mode that is used to request said controller to advance said vehicle and a fork raise/lower request mode that is used to request said controller to implement the one of the fork raise and the fork lower operation is accomplished by an appropriate operation of said wireless remote control device.

12. The supplemental remote control system according to claim 11, wherein appropriate operation of said wireless remote control device comprises the operator implementing a predetermined command protocol on the wireless remote control device.

13. The supplemental remote control system according to claim 8, further comprising indication structure on said vehicle for at least one of audibly and visibly distinguishing when said vehicle is in a travel request mode that is used to request said controller to advance said vehicle from when said vehicle is in a fork raise/lower request mode that is used to request said controller to implement the one of the fork raise and the fork lower operation.

14. The supplemental remote control system according to claim 13, wherein said indication structure comprises a light positioned on said vehicle that changes illumination characteristics depending on whether said vehicle is in said travel request mode or said fork raise/lower request mode.

15. The supplemental remote control system according to claim 8, wherein said wireless remote control device is useable by the operator to switch between a fork raise mode and a fork lower mode when said vehicle is in a fork raise/lower request mode that is used to request said controller to implement the one of the fork raise and the fork lower operation.

16. The supplemental remote control system according to claim 15, wherein the operator switches between the fork raise mode and the fork lower mode by implementing a predetermined command procedure on the wireless remote control device.

17. The supplemental remote control system according to claim 1, further comprising at least one sensor communicably coupled to said controller, each said at least one sensor configured to detect the presence of an object located at a position either on a platform of said vehicle from which said vehicle may be operated or proximate to said vehicle, wherein said at least one vehicle condition evaluated by said controller comprises a status of each sensor and said controller is configured to decide to not implement said travel request if said status from at least one sensor is indicative of the presence of an object.

18. The supplemental remote control system according to claim 1, wherein said controller communicates with said traction control system to cause said vehicle to one of coast to a stop or brake to a stop upon detecting a predetermined stopping event associated with movement of said vehicle under wireless remote control in response to receipt of said first type signal.

19. The supplemental remote control system according to claim 18, wherein said predetermined stopping event comprises the operator releasing said travel control.

20. The supplemental remote control system according to claim 1, further comprising:
at least one sensor communicably coupled to said controller, each said at least one sensor configured to detect the presence of an object located proximate to said vehicle:
wherein said controller communicates with a brake control system associated with said vehicle to brake said vehicle to a stop if said vehicle is moving under wireless remote control in response to receipt of said first type signal and at least one sensor indicates the detection of an object in the travel path of said vehicle.

21. A method for operating a supplemental remote control system for a materials handling vehicle that includes a power unit including at least one wheel and a load handling assembly comprising:
providing a wireless remote control device that is useable by an operator interacting with said materials handling vehicle, said wireless remote control device having a wireless transmitter and a travel control communicably coupled to said wireless transmitter, wherein actuation of said travel control causes said wireless transmitter to wirelessly transmit a travel request as a first type signal requesting said vehicle to advance in a first direction;
providing a receiver for receiving transmissions from said wireless transmitter at said vehicle; and
providing a controller that is communicably coupled to said receiver and to a traction control system of said vehicle, said controller being responsive to receipt of said first type signal by said receiver to evaluate at least one vehicle condition, to decide whether to implement said travel request based upon the evaluation of said at least one vehicle condition, and to cause said traction control system to advance said vehicle if said controller decides to implement said travel request based upon the evaluation of said at least one vehicle condition;
wherein said wireless remote control device further comprises an input component communicably coupled to said wireless transmitter, wherein actuation of said input component causes said wireless transmitter to wirelessly transmit a second type of request to said receiver on said vehicle requesting said vehicle to perform a second vehicle function other than to advance said vehicle.

22. The method according to claim 21, wherein said controller is configured to cause said traction control system to advance said vehicle for as long as maintained actuation of said travel control on said wearable wireless remote control device is detected.

23. The method according to claim 21, wherein said providing a wireless remote control device further comprises:
providing a garment including a portion that is secured to a finger of the operator and includes a button, wherein actuation of said button implements said travel control.

24. The method according to claim 23, wherein said input component comprises one of said button on said garment portion and another button on said wireless remote control device, and said second vehicle function comprises the controller implementing one of a fork raise and a fork lower operation to raise or lower forks on said vehicle.

25. The method according to claim 24, further comprising requiring the operator to double click said input component for the controller to implement the one of the fork raise and the fork lower operation.

26. The method according to claim 24, wherein said input component comprises said button on said garment portion such that the same button is usable to both request said controller to advance said vehicle and to request said controller to implement the one of the fork raise and the fork lower operation.

27. The method according to claim 26, further comprising the operator implementing an appropriate operation of said wireless remote control device to switch between a travel request mode that is used to request said controller to advance said vehicle and a fork raise/lower request mode that is used to request said controller to implement the one of the fork raise and the fork lower operation.

28. The method according to claim 27, wherein appropriate operation of said wireless remote control device comprises the operator implementing a predetermined command protocol on the wireless remote control device.

29. The method according to claim 24, further comprising providing indication structure on said vehicle for at least one of audibly and visibly distinguishing when said vehicle is in a travel request mode that is used to request said controller to advance said vehicle from when said vehicle is in a fork raise/lower request mode that is used to request said controller to implement the one of the fork raise and the fork lower operation.

30. The method according to claim 24, wherein said wireless remote control device is useable by the operator to switch between a fork raise mode and a fork lower mode when said vehicle is in a fork raise/lower request mode that is used to request said controller to implement the one of the fork raise and the fork lower operation.

31. The supplemental remote control system according to claim 30, wherein the operator switches between the fork raise mode and the fork lower mode by implementing a predetermined command procedure on the wireless remote control device.

32. A supplemental remote control system for a materials handling vehicle that includes a power unit including at least one wheel and a load handling assembly comprising:
a wireless remote control device that is useable by an operator interacting with said materials handling vehicle, said wireless remote control device comprising:
a wireless transmitter; and
a travel control communicably coupled to said wireless transmitter, wherein actuation of said travel control causes said wireless transmitter to wirelessly transmit a travel request as a first type signal requesting said vehicle to advance in a first direction;
a receiver for receiving transmissions from said wireless transmitter at said vehicle; and
a controller that is communicably coupled to said receiver and to a traction control system of said vehicle, said controller being responsive to receipt of said first type signal by said receiver to evaluate at least one vehicle condition, to decide whether to implement said travel request based upon the evaluation of said at least one vehicle condition, and to implement said travel request to cause said vehicle to move in said first direction if said controller decides to implement said travel request based upon the evaluation of said at least one vehicle condition;
wherein said wireless remote control device further comprises an input component communicably coupled to said wireless transmitter, wherein actuation of said input component causes said wireless transmitter to wirelessly transmit a second type of request to said receiver on said vehicle requesting said controller to implement a second vehicle function other than to advance said vehicle.

33. The supplemental remote control system according to claim 32, wherein said wireless remote control device further comprises:
a wearable garment including a portion that is secured to a finger of the operator and includes a button, wherein actuation of said button implements said travel control.

34. The supplemental remote control system according to claim 33, wherein said input component comprises one of said button on said garment portion and another button on said wireless remote control device, and said second vehicle function comprises the controller implementing one of a fork raise and a fork lower operation to raise or lower forks on said vehicle.

35. The supplemental remote control system according to claim 34, wherein said input component must be double clicked by the operator for the controller to implement the one of the fork raise and the fork lower operation.

36. The supplemental remote control system according to claim 34, wherein said input component comprises said button on said garment portion such that the same button is usable to both request said controller to advance said vehicle and to request said controller to implement the one of the fork raise and the fork lower operation.

37. The supplemental remote control system according to claim 36, wherein switching between a travel request mode that is used to request said controller to advance said vehicle and a fork raise/lower request mode that is used to request said controller to implement the one of the fork raise and the fork lower operation is accomplished by an appropriate operation of said wireless remote control device.

38. The supplemental remote control system according to claim 37, wherein appropriate operation of said wireless remote control device comprises the operator implementing a predetermined command protocol on the wireless remote control device.

39. The supplemental remote control system according to claim 34, further comprising indication structure on said vehicle for at least one of audibly and visibly distinguishing when said vehicle is in a travel request mode that is used to request said controller to advance said vehicle from when said vehicle is in a fork raise/lower request mode that is used to request said controller to implement the one of the fork raise and the fork lower operation.

40. The supplemental remote control system according to claim 39, wherein said indication structure comprises a light positioned on said vehicle that changes illumination characteristics depending on whether said vehicle is in said travel request mode or said fork raise/lower request mode.

41. The supplemental remote control system according to claim 34, wherein said wireless remote control device is useable by the operator to switch between a fork raise mode and a fork lower mode when said vehicle is in a fork raise/lower request mode that is used to request said controller to implement the one of the fork raise and the fork lower operation.

42. The supplemental remote control system according to claim 41, wherein the operator switches between the fork raise mode and the fork lower mode by implementing a predetermined command procedure on the wireless remote control device.

43. The supplemental remote control system according to claim 32, further comprising at least one sensor communicably coupled to said controller, each said at least one sensor configured to detect the presence of an object located at a position either on a platform of said vehicle from which said vehicle may be operated or proximate to said vehicle, wherein said controller is configured to decide to not implement said travel request if a status from at least one sensor is indicative of the presence of an object.

44. The supplemental remote control system according to claim 32, wherein said controller communicates with said traction control system to cause said vehicle to one of coast to a stop or brake to a stop upon detecting a predetermined stopping event associated with movement of said vehicle under wireless remote control in response to receipt of said first type signal.

45. The supplemental remote control system according to claim 44, wherein said predetermined stopping event comprises the operator releasing said travel control.

46. The supplemental remote control system according to claim 32, further comprising:
- at least one sensor communicably coupled to said controller, each said at least one sensor configured to detect the presence of an object located proximate to said vehicle:
- wherein said controller communicates with a brake control system associated with said vehicle to brake said vehicle to a stop if said vehicle is moving under wireless remote control in response to receipt of said first type signal and at least one sensor indicates the detection of an object in the travel path of said vehicle.

* * * * *